(12) United States Patent
Takahashi et al.

(10) Patent No.: US 6,248,466 B1
(45) Date of Patent: Jun. 19, 2001

(54) GAS SEPARATOR FOR A FUEL CELL, AND FUEL CELL USING THE SAME GAS SEPARATOR FOR A FUEL CELL

(75) Inventors: Tsuyoshi Takahashi; Sogo Goto, both of Nishikamogun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/291,248

(22) Filed: Apr. 13, 1999

(30) Foreign Application Priority Data

Apr. 22, 1998 (JP) .................................... 10-129541
Dec. 8, 1998 (JP) .................................... 10-348642

(51) Int. Cl.⁷ ............................. H01M 8/04; H01M 8/02
(52) U.S. Cl. ............................. 429/38; 429/39; 429/34; 429/35; 429/36; 429/37
(58) Field of Search ................................ 429/38, 39, 34, 429/35, 36, 37

(56) References Cited

U.S. PATENT DOCUMENTS

| | | | |
|---|---|---|---|
| 5,419,980 | * | 5/1995 | Okamoto et al. ................ 429/38 |
| 5,776,625 | * | 7/1998 | Kaufman et al. ................ 429/39 |
| 6,066,408 | * | 5/2000 | Vitale et al. ................... 429/38 |

FOREIGN PATENT DOCUMENTS

| | | |
|---|---|---|
| 58-138268 | 9/1983 | (JP) . |
| 62-76260 | 4/1987 | (JP) . |
| 62-163263 | 7/1987 | (JP) . |
| 62-163264 | 7/1987 | (JP) . |
| 3-214568 | * 9/1991 | (JP) . |
| 7-211332 | 8/1995 | (JP) . |
| 7-263003 | 10/1995 | (JP) . |
| 9-35729 | * 2/1997 | (JP) . |

* cited by examiner

*Primary Examiner*—Mark F. Huff
*Assistant Examiner*—Daborah Chacko-Davis
(74) *Attorney, Agent, or Firm*—Kenyon & Kenyon

(57) ABSTRACT

A fuel cell enhancing the utility rate of supplied gas includes a separator having a plurality of holes extending therethrough and a plurality of ribs communicating between mutually confronting holes. Oxidizing gas supplied into the fuel cell passes through a first oxidizing gas feed manifold formed by a first hole, is distributed into a first unit cell inside oxidizing gas passage formed by a first rib, and is merged in an oxidizing gas exhaust manifold formed by a second hole. This oxidizing gas is guided into a return plate disposed at the end of the fuel cell, is further led into a second oxidizing gas feed manifold, and is distributed into a second unit cell inside gas passage. The oxidizing gas sequentially passes through plural unit cell inside oxidizing gas passages.

14 Claims, 28 Drawing Sheets

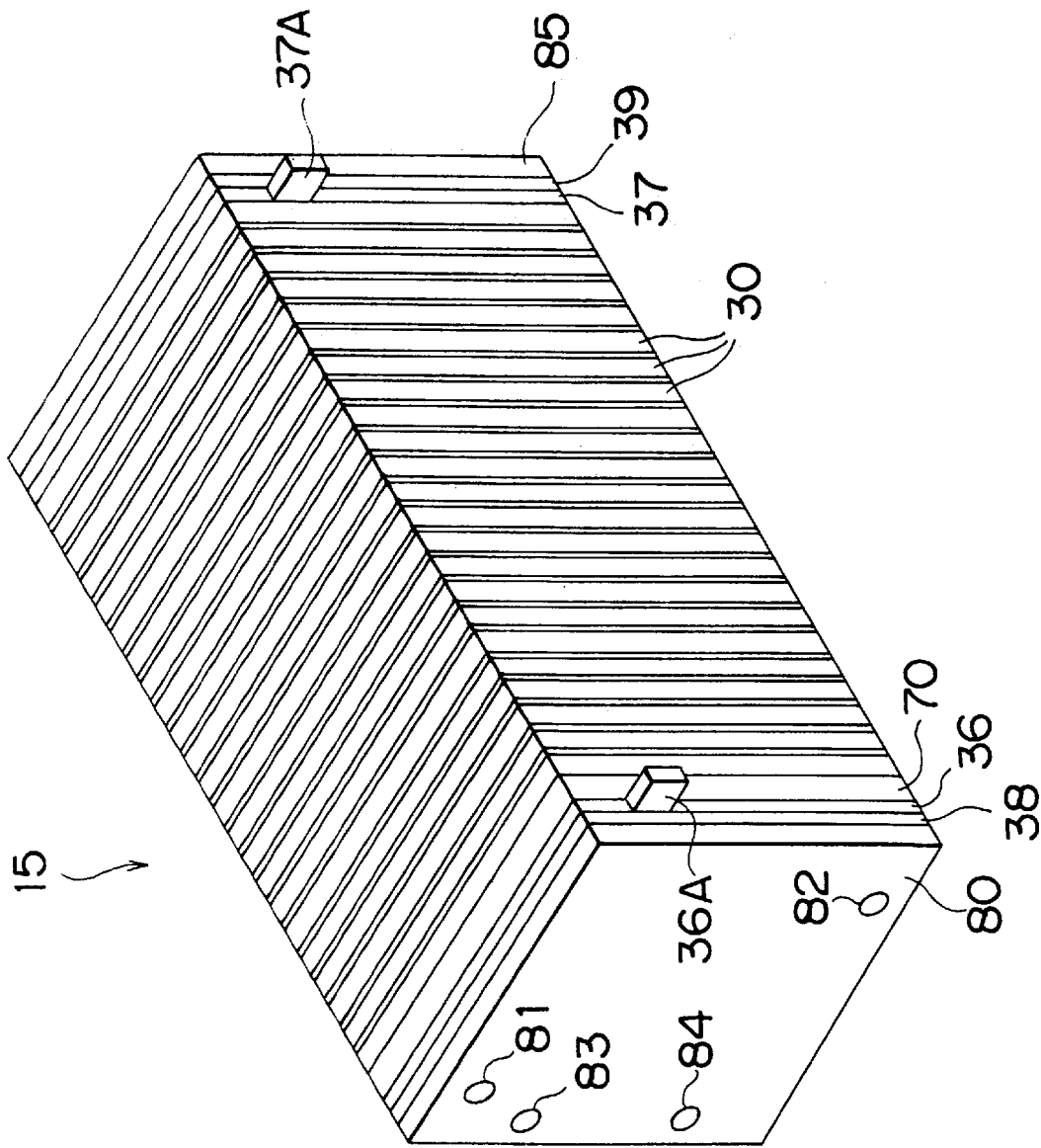

GAS SEPARATOR FOR A FUEL CELL, AND FUEL CELL USING THE SAME GAS SEPARATOR FOR A FUEL CELL

INCORPORATION BY REFERENCE

The disclosures of Japanese Patent Application Nos. HEI 10-129541 filed on Apr. 22, 1998, and HEI 10-348642 filed on Dec. 8, 1998 including the specifications, drawings and abstracts thereof are incorporated herein by reference in their entirety.

BACKGROUND OF THE INVENTION

1. Field of the Invention

The present invention relates to a gas separator for a fuel cell, and a fuel cell using the same gas separator for a fuel cell, and more particularly relates, in a fuel cell composed by laminating plural unit cells, to a separator for a fuel cell provided between adjacent unit cells for forming together with adjacent members a fuel gas passage and an oxidizing gas passage, and for separating fuel gas and oxidizing gas, and a fuel cell using such a separator.

2. Description of the Related Art

A gas separator for a fuel cell is a member for composing a fuel cell stack of laminated plural unit cells, and has a gas impermeability sufficient to prevent mixture of fuel gas and oxidizing gas supplied to adjacent unit cells. Such separator for a fuel cell usually has a surface which is ribbed or formed in another corrugated sectional structure, and which forms passages for fuel gas and oxidizing gas (gas separators having such structure are also called ribbed interconnectors). Such a separator for a fuel cell, when incorporated into a fuel cell stack, forms a passage for fuel gas or oxidizing gas (unit cell inside passage) between an adjacent member (gas diffusion layer) and this corrugated structure.

This gas separator for a fuel cell also has a specified hole aside from the corrugated structure for forming the gas passage. When this fuel cell stack is formed by laminating unit cells having gas separators, holes corresponding to adjacent gas separators overlap with each other to form a gas manifold penetrating the fuel cell stack in its laminating direction. Such a gas manifold is used for passing the fuel gas or oxidizing gas from the outside of the fuel cell to the inside thereof and for distributing the fuel and oxidizing gas into individual unit cells as well as for leading the fuel exhaust gas or oxide exhaust gas discharged after electrochemical reaction in each unit cell to the outside of the fuel cell. Therefore, the manifolds communicate with the unit cell inside passages formed in the laminated unit cells, so that the gas flows in and out between the gas manifolds and the unit cell inside passages.

FIG. 32 is a plan view explaining the structure of a separator 130 exemplary of gas separators of the related art. The separator 130 has four holes in four sides, that is, holes 140, 143 for air, and holes 150, 152 for fuel gas. These air holes 140, 143 and fuel holes 150, 152 form, when assembled into the fuel cell by laminating members including the separator 130, an oxidizing gas feed manifold, an oxidizing gas exhaust manifold, a fuel gas feed manifold, and a fuel gas exhaust manifold, respectively in the fuel cell.

At one surface of the separator 130, a rib 155 is formed for communicating between the air hole 140 and the air hole 143, and at the other surface of the separator 130 (back surface of the drawing), there is a rib (not shown) for communicating between the fuel hole 150 and the fuel hole 152. Herein, these ribs are groove structures formed in parallel. When composing the fuel cell by laminating the members including the separator 130, these ribs form unit cell inside gas passages between the members adjacent to the separator 130. That is, the rib 155 for communicating between the air hole 140 and the air hole 143 forms a unit cell inside oxidizing gas passage, and the rib communicating between the fuel hole 150 and the fuel hole 152 forms a unit cell inside fuel gas passage. The oxidizing gas supplied into the fuel cell passes through the oxidizing gas feed manifold formed by the air hole 140, is distributed into the unit cell inside oxidizing gas passages formed in the individual unit cells, is collected in the oxidizing gas exhaust manifold after electrochemical reaction, and is discharged to the outside of the fuel cell. Similarly, the fuel gas supplied into the fuel cell passes through the fuel gas feed manifold formed by the fuel hole 150, is distributed into the unit cell inside fuel gas passages formed in the individual unit cells, is collected in the fuel gas exhaust manifold after electrochemical reaction, and is discharged outside of the fuel cell.

In such a fuel cell for obtaining an electromotive force by presenting fuel gas and oxidizing gas for electrochemical reaction, it is desired to enhance the utility rate of the supplied gas. That is, in the fuel cell, gas (fuel gas or oxidizing gas) containing electrode active material (hydrogen or oxygen) is supplied, but all of the electrode active material in the gas is not utilized in electrochemical reaction, and in order to promote the electrochemical reaction sufficiently, gas containing the electrode active material exceeding the theoretically required amount is supplied into the fuel cell. It is therefore desired to increase the gas utility rate to suppress the amount of gas supplied into the fuel cell by presenting the electrode active material in the gas so as to be utilized sufficiently in the electrochemical reaction. Moreover, the oxidizing gas is desired to be capable of suppressing the amount of energy consumed in pressurizing the oxidizing gas (usually air), and capable of enhancing the energy efficiency of an entire system having such a fuel cell.

To enhance the gas utility rate by making the electrode active material in the gas more easily utilized in the electrochemical reaction, it is required that the gas be agitated and diffused sufficiently in the passage. As a result, contact between the catalyst provided in the electrode and the electrode active material is improved. In order to agitate the gas and diffuse it sufficiently in the passage, for example, it is known to increase the flow rate of gas passing through the passage in the unit cell inside passage, to accelerate the flow velocity. To realize such a method, the sectional area of the passage of the unit cell inside passage may be decreased. As such, a serpentine structure has been proposed for the shape of the corrugated structure that defines the unit cell inside passages formed on the gas separator (for example, Japanese Laid-open Patent No. 7-263003). Herein, the gas to be supplied into each unit cell is introduced into the fine passage formed continuously on the same plane. Therefore, if the volume of gas supplied from the outside into the fuel cell is equivalent, as compared with the structure shown in FIG. 32 in which the gas is passed simultaneously into a wider range on the same plane in each unit cell, the flow velocity of the gas passing through an arbitrary position in the passage is faster, so that the gas utility range is enhanced.

However, if the corrugated structure formed on the gas separator is of such serpentine structure, since the unit cell inside passage is folded into small pieces on the same plane, a pressure loss increases when the gas passes through the passage. Therefore, in order to maintain the flow rate of the gas passing through the passage at a specified rate, it is necessary to further pressurize the gas to be supplied into the fuel cell, and the energy consumed in pressurizing the gas increases, thereby lowering the energy efficiency of the entire system having this fuel cell.

Aside from the above related art, it has also been proposed to divide the gas passage formed on the separator into plural regions (for example, Japanese Utility Model No. 58-138268). In such a fuel cell, the gas passage divided into plural regions is formed on a gas separator (bipolar plate). The gas supplied from the gas feed hole into the unit cell passes sequentially through the plural regions and is discharged from the gas discharge port. In such a constitution, too, the flow velocity of the gas passing through the passage is accelerated, and the gas utility rate is enhanced. However, like the serpentine structure, since the gas flow is continuous in the unit cell, and the gas collecting holes are mutually connected through a diaphragm, it is difficult to solve the problem of pressure loss sufficiently. In the constitution of this related art, moreover, since the gas flow is continuous in the unit cell, the gas may not be distributed uniformly into each unit cell sufficiently.

Besides, when decreasing the sectional area of the unit cell inside passage as mentioned above, the corrugated structure formed on the gas separator must be much finer. That is, it is required to manufacture the gas separator at high precision. When manufacturing the gas separator, however, it is difficult to enhance the precision when forming the corrugated structure on the surface. If the precision is insufficient, it may lead to lowered manufacturing yield (increase of defectives), or fluctuations of cell performance due to deteriorated precision in forming the corrugated structure.

SUMMARY OF THE INVENTION

It is hence an object of the present invention to solve the above problems, and enhance the feed rate of gas supplied into a fuel cell, without lowering the energy efficiency of the entire system having the fuel cell.

A first aspect of the present invention relates to a separator for a fuel cell composing a fuel cell by laminating together with an electrolyte layer and an electrode forming member, and forming a gas passage inside of the fuel cell, comprising at least two holes penetrating through the separator in the thickness direction, and plural unit cell inside passage forming structures for communicating the two holes on one surface of the separator, having a concave section, in which the plural cell inside passage forming structures are formed so as not to communicate each other on the separator surface.

In the gas separator for a fuel cell according to this aspect, when composing the fuel cell by laminating this gas separator, by the two holes for composing the individual unit cell inside passage forming structures, gas passages (gas manifolds) for passing gas in the laminating direction of the gas separator are formed. On one surface of the gas separator, moreover, gas passages (unit cell inside gas passages) for supplying gas to the electrolyte layer and electrode are formed in a concave section for communicating two holes. At one surface of the gas separator, plural unit cell inside gas passages are formed independently so as not to communicate with each other, and when the gas supplied into the fuel cell is distributed into the gas passages formed on the gas separator surface, gas is not supplied at once from a single manifold on the entire surface of the specified gas separator. That is, the gas is supplied from the individual gas manifolds, in each one of the unit cell inside gas passages formed by the unit cell inside passage forming structures provided by dividing the surface of the gas separator.

Another aspect of the invention relates to a fuel cell for obtaining an electromotive force by electrochemical reaction with a supply of reaction gas. The fuel cell has a stack structure formed by laminating a plurality of unit cells composed of members including electrolyte, electrode and separator, and also includes plural dividing passage forming parts provided in the stack structure in the laminating direction for passing the supplied reaction gas therethrough. Each one of the plural dividing passage forming parts includes a gas feed manifold for distributing the reaction gas passing inside the stack structure into the individual unit cells, a gas exhaust manifold for collecting the reaction gas discharged from the individual unit cells, and a unit cell inside gas passage manifold, inside each individual unit cell, with a concave section for communicating between the gas feed manifold and the gas exhaust and supplying and discharging the reaction gas in at least part of the electrolyte layer and the electrode composing the individual unit cells. At the end portion of the stack structure, a passage linkage is provided for linking the end portion of the gas exhaust manifold provided in one of the plural dividing passage forming parts and the end portion of the gas feed manifold provided in the other one of the plural dividing passage forming parts, and wherein a plurality of the unit cell inside gas passages are provided without connecting to each other at least on one surface of the gas separator, corresponding to the dividing flow passage forming parts. In addition, the reaction gas passes sequentially through the plural dividing passage forming parts while passing through the passage linkage.

According to such fuel separator composed by using the separator for a fuel cell of the invention and the fuel cell of the invention, as compared with the case of gas supplied from one gas manifold into all unit cell inside gas passages formed on the gas separator surface, the flow rate of the gas passing per unit sectional area of each unit cell inside gas passage increases, and the flow velocity is faster, and hence the diffusion of gas in the passage is improved and the reaction matter in the gas more easily reaches the catalyst provided on the electrode. Therefore, the reaction matter will be utilized more efficiently in the electrochemical reaction and the gas utility efficiency will be enhanced, so that the amount of gas to be supplied into the fuel cell may be reduced.

Moreover, as the flow velocity of gas in the unit cell inside gas passage is faster, in particular, in the passage of oxidizing gas containing oxygen, the water discharge performance in the passage is improved. When the electrochemical reaction is promoted in the fuel cell, water is produced at the cathode surface to which oxidizing gas is supplied, and this water is vaporized in the oxidizing gas and is discharged to the outside of the fuel cell. But, if water stays inside the fuel cell without being vaporized into oxidizing gas, it may impede gas diffusion. By accelerating the flow velocity of oxidizing gas in the unit cell inside gas passage, vaporization of water into oxidizing gas is promoted, thereby preventing the water from staying to impede gas diffusion.

In addition, since the total amount of gas to be supplied into the fuel cell is decreased, the humidification of the oxidizing gas to be supplied into the fuel cell may also be reduced. In the polymer electrolyte fuel cell including the water produced at the cathode surface mentioned above, part of the moisture held by the electrolyte membrane is vaporized in the oxidizing gas and discharged to the outside of the fuel cell, and usually, by preliminarily humidifying the oxidizing gas to be supplied into the fuel cell, drying of electrolyte membrane is prevented. When the total amount of oxidizing gas to be supplied into the fuel cell is decreased as mentioned above, the amount of moisture taken outside of the fuel cell by the oxidizing gas is decreased, so that the humidification of the oxidizing gas to be supplied into the fuel cell is decreased. As a result, the amount of energy consumed in humidifying the oxidizing gas is curtailed. When reformed gas obtained by steam reforming of hydrocarbons is used as the fuel gas to be supplied into the fuel cell, no particular structure for humidifying the fuel gas is necessary. But, when hydrogen gas is used as the fuel gas, it must be humidified before being supplied into the fuel cell. In such a case, too, the total amount of gas to be supplied into the fuel cell is decreased, and the humidifying amount is reduced, and the amount of energy consumed in humidifying the gas can be saved.

Furthermore in any unit cell of a fuel cell including a gas separator according to the invention, the region for supplying oxidizing gas or fuel gas is divided, and gas is supplied from different gas manifolds in the individual regions and, if condensate remains at the junction of the gas manifold and unit cell inside passage, supply of gas into the unit cell is not shut off completely. That is, if condensate stays at the junction and supply of gas into specified unit cell is shut off, it is hardly possible that all junctions corresponding to plural unit cell inside gas passages formed on the same surface of the gas separator are closed simultaneously, thereby preventing a cut-off of the supply of gas to any one of the unit cells of the stack structure due to stagnant condensate.

In the separator of this aspect of the invention, the plural unit cell inside passage forming structures may be provided on both sides of the separator.

In such a constitution, the gas utility rate may be enhanced in both the passage of the fuel gas containing oxygen and the passage of the oxidizing gas.

In the separator of this aspect of the invention, plural cell inside passage forming structures may be arranged in a U-form in a plane shape, and U-forms may be disposed closely to each other facing the same direction, and two holes coupled by the cell inside passage forming structures may be disposed closely to each other, along the marginal portion of the separator.

Similarly, in the fuel cell of this aspect of the invention, plural cell inside passage forming structures formed on the surface of the separator are in the U-form, and the individual U-forms are disposed closely to each other facing the same direction, and each unit cell inside passage connects the gas feed manifold and the gas exhaust manifold at both ends of the U-form, and the gas feed manifold and the gas exhaust manifold may be disposed closely to each other along one surface of the stack structure.

According to such a fuel cell composed by using the gas separator for a fuel cell of the invention and the fuel cell of the invention, the gas feed manifold and gas exhaust manifold for passing the same kind of gas are disposed along one surface of the stack structure, and since strict gas sealing is not required between gas manifolds passing the same gas, the seal structure in the regions for forming the gas manifolds can be simplified. Besides, by shaping the cell inside passage forming structures for forming the unit cell inside gas passages in the U-form, as compared with the case of forming linearly and forming holes for gas manifolds at both ends, a wider region on the gas separator surface can be utilized for the unit cell inside gas passages, and the gas separator and the fuel cell using the same can be reduced in size.

The fuel cell of this aspect of the invention may further comprise a refrigerant passage provided inside the fuel cell for passing a refrigerant for suppressing the inside temperature of the fuel cell by heat exchange, and a refrigerant manifold formed in the laminating direction of the stack structure for distributing the refrigerant to the refrigerant passage or collecting the refrigerant passing through the refrigerant passage, in which the refrigerant manifold is provided closely to the gas feed manifold and the gas exhaust manifold, and is located at a position apart from the unit cell inside gas passage, more than the gas feed manifold and the gas exhaust manifold.

In this constitution, since the refrigerant manifold is located further from the unit cell inside gas passage than the gas feed manifold and the gas exhaust manifold, the fuel cell is effectively reduced in size in a specified direction (in the direction between the sides not disposing the gas feed manifold and the gas exhaust manifold).

In this separator, plural passage forming parts are provided at both sides of the separator, U-forms are disposed in reverse directions each at opposite sides of the separator, and two holes coupled by the cell inside passage forming structures are disposed at mutually confronting marginal portions at one surface and another of the separator.

Similarly, in the fuel cell of this aspect, the plural dividing passages are disposed at both sides of the separator and are disposed so that their U-forms face reverse directions, and the gas feed manifold and gas exhaust manifold formed on one surface and connected to the unit cell inside gas passage are disposed adjacently to each other, along a first surface of the stack structure, and moreover the gas feed manifold and gas exhaust manifold formed on the other surface and coupled to the unit cell inside gas passages are disposed adjacently to each other, along a second surface confronting the first surface of the stack structure.

In a fuel cell having a constitution as described above, the gas feed manifold and gas exhaust manifold for passing the same kind of gas are disposed along one surface of the stack structure, and therefore the seal structure in the regions for forming the gas manifolds can be simplified. Since a wider region on the gas separator surface can be utilized for the unit cell inside gas passages, the gas separator and the fuel cell using the same can be reduced in size. Still more, since the gas manifold communicating with the unit cell inside gas passage formed on one surface of the gas separator and the gas manifold communicating with the single cell inside gas passage formed on the other surface of the gas separator are formed along mutually confronting sides, the distance between the sides not disposing the gas manifolds in the fuel cell can be effectively decreased, and the entire fuel cell can be reduced in size.

In this fuel cell, the reaction gas is an oxidizing gas containing oxygen, and in each unit cell inside gas passage, the flowing direction of the oxidizing gas passing inside is formed to be the same as the working direction of gravity.

With such a constitution, water discharge performance is further enhanced in the unit cell inside gas passage through which the oxidizing gas passes. That is, if the water produced at the cathode surface with the progress of the electrochemical reaction in the fuel cell is condensed in the unit cell inside gas passage, the flow of oxidizing gas in the unit cell inside gas passage is directed from above to below, so that the condensate is discharged easily by gravity, thereby preventing the condensate from staying in the passage to impede passing of gas.

In this fuel cell, the gas feed manifold may be designed to feed the reaction gas simultaneously into all unit cell inside gas passages provided in the stack structure, and to discharge simultaneously the reaction gas discharged from all unit cell inside gas passages provided in the stack structure which may then be collected in the gas exhaust manifold.

In such a constitution, the structure of the gas manifolds can be simplified.

Also in the fuel cell of the aspect, the gas feed manifold and gas exhaust manifold may be formed in a tubular structure, each having a shielding part inside for shutting off the flow of the passing gas, and the tubular structure may be designed to invert the function as the gas feed manifold and gas exhaust manifold at the upstream surface and downstream surface of the gas flow at the shielding part.

In such a constitution, the gas supplied in the stack structure is simultaneously fed into the unit cell inside gas passages provided in the unit cells disposed at the upstream surface of flow of the gas from the shielding part. The gas discharged from the unit cells disposed at the upstream surface is supplied into the unit cell inside gas passages provided in the unit cells disposed at the downstream surface from the shielding part, as the tubular structure functioning as gas exhaust manifold at the upstream surface of the shielding part is utilized as the gas feed manifold. Therefore, as compared with the constitution of supplying gas simultaneously into unit cell inside gas passages provided in all unit cells composing the stack structure, the amount of gas supplied into each unit cell inside gas passage is increased, and the flow velocity of gas in the passage is accelerated. Thus, the effect of increasing the gas flow in the passage can be realized in a simple constitution of forming a shielding part in the tubular structure for composing the manifold.

In this fuel cell, the stack structure may be provided in a plurality, and the reaction gas supplied into the fuel cell may be preliminarily divided before being supplied into each one of the plural stack structures.

Besides, having a plurality of stack structures, the reaction gas supplied in a specified one of the plural stack structures may pass through plural dividing passage forming parts of the other stack structure, in the process of passing through plural dividing passage forming parts.

In such a case, too, since the individual stack structures have plural dividing passage forming parts as the passages for passing the gas inside, each stack structure has the effect of increasing the flow rate of the gas passing through the unit cell inside gas passage as mentioned above. Moreover, since the gas supplied into the fuel cell sequentially passes through the dividing passage forming pats provided in the plural stack structures, as compared with the case of supplying gas into individual stack structures after preliminarily dividing the gas flow, the number of divisions of the gas flow at the upstream surface can be decreased. As a result, the flow rate of the gas passing through the unit cell inside gas passages can be further increased, and the dividing precision of gas flow is enhanced. As the dividing precision of gas flow is improved, the amount of gas supplied into each stack structure is more uniform, and the output in each stack structure can be equalized.

BRIEF DESCRIPTION OF THE DRAWINGS

FIG. 3 is a perspective view showing an appearance of a stack structure.

FIG. 13 is an explanatory diagram showing a shape of return plate 170.

DESCRIPTION OF THE PREFERRED EMBODIMENTS

Figure 1:
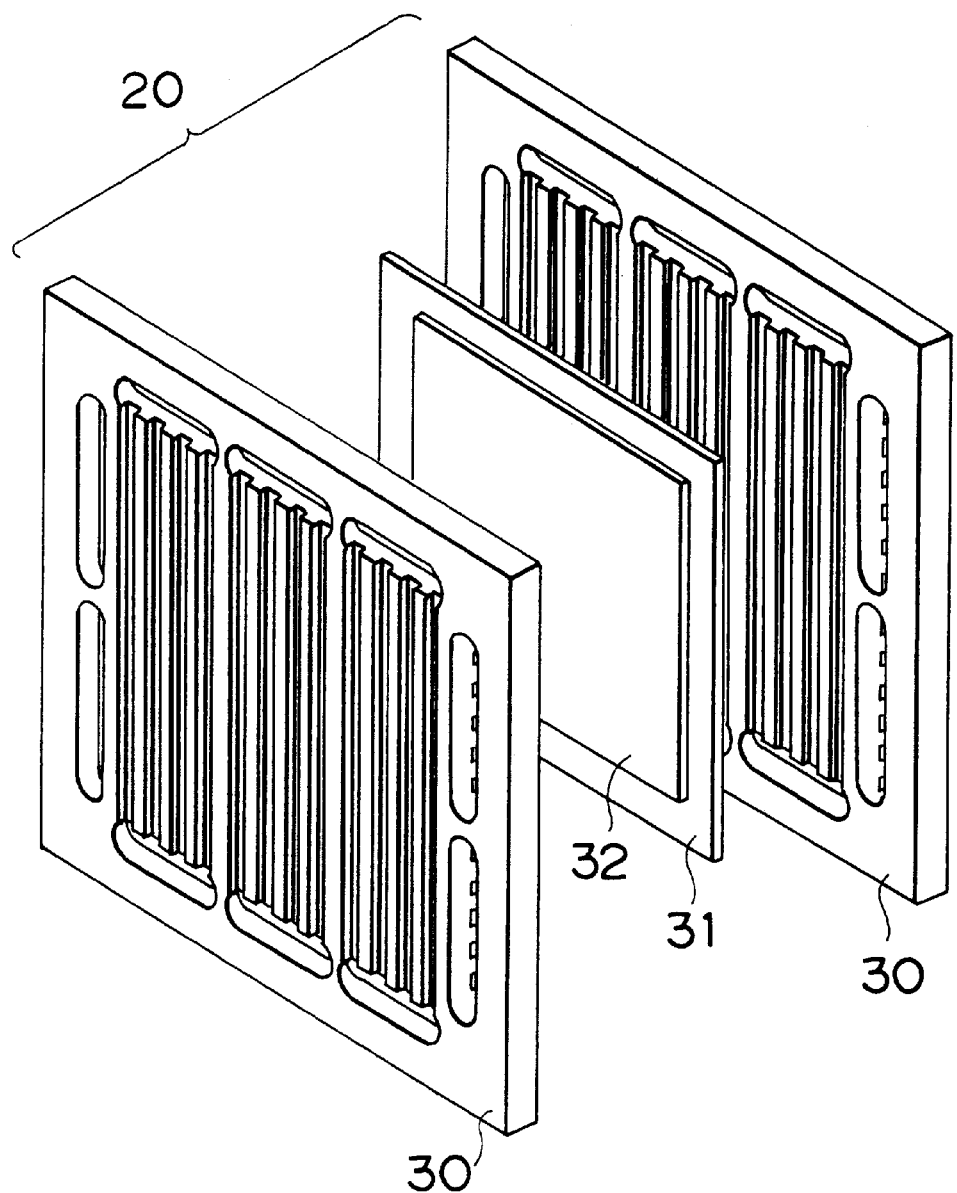
FIG. 1 is a perspective exploded view showing a constitution of a unit cell which is a basic unit of stack structure.

Referring now to the drawings, preferred embodiments of the invention are described below.

A fuel cell in a first embodiment of the invention is a polymer electrolyte fuel cell, which is formed in a stack structure by laminating plural unit cells. FIG. 1 is a perspective exploded view showing a constitution of a unit cell 20 which is a basic unit of a stack structure 15 for composing a fuel cell in the first embodiment. FIG. 2 is a plan view showing a constitution of a separator 30 provided in the fuel cell of the embodiment, and FIG. 3 is a perspective view showing an appearance of the stack structure 15.

As shown in FIG. 1, the unit cell 20 is composed of an electrolyte membrane 31, an anode 32, a cathode, and a separator 30. The cathode is not shown in the drawing because the electrolyte membrane 31 is interposed between the cathode and the anode 32 (that is, it is formed at the back surface of 31 in the drawing).

Herein, the electrolyte membrane 31 is a solid polymer material, for example, a proton conductive ion exchange film formed of fluoroplastic, and shows a good electric conductivity when wet. In this embodiment, an Nafion membrane (du Pont) is used. The surface of the electrolyte membrane 31 is coated with platinum, or an alloy of platinum and another metal as a catalyst. To apply the catalyst, carbon powder carrying platinum or an alloy of platinum and another metal was prepared, and this carbon powder carrying the catalyst was dispersed in a proper organic solvent, and a proper amount of electrolyte solution (for example, Nafion Solution produced by Aldrich Chemical Co.) was added to form a paste. This paste was then applied on the electrolyte membrane 31 by screen printing. Alternatively, it is also preferred to form a paste containing carbon powder carrying the catalyst into a sheet, and press this sheet onto the electrolyte membrane 31.

The anode 32 and cathode are both formed of carbon cloth by weaving carbon fibers. In this embodiment, the anode 32 and the cathode are formed of carbon cloth, but these may also be formed using carbon paper or carbon felt composed of carbon fibers.

Figure 2A:
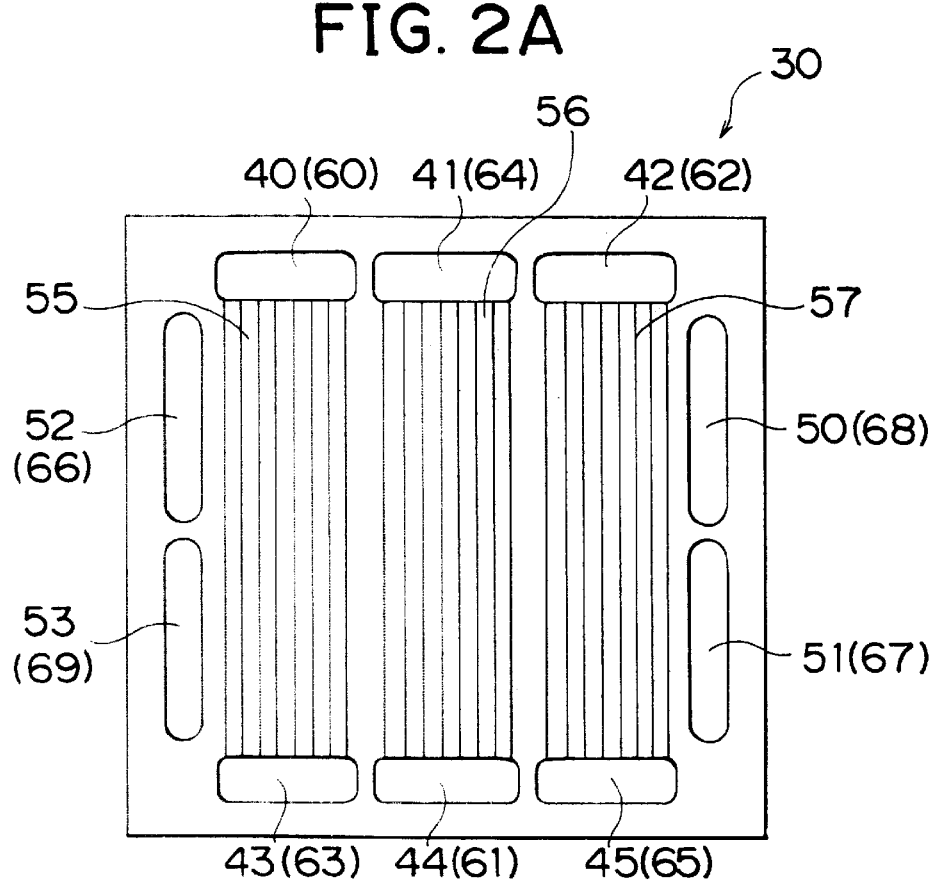
FIG. 2A and FIG. 2B are plan views showing a constitution of a separator.
Figure 2B:
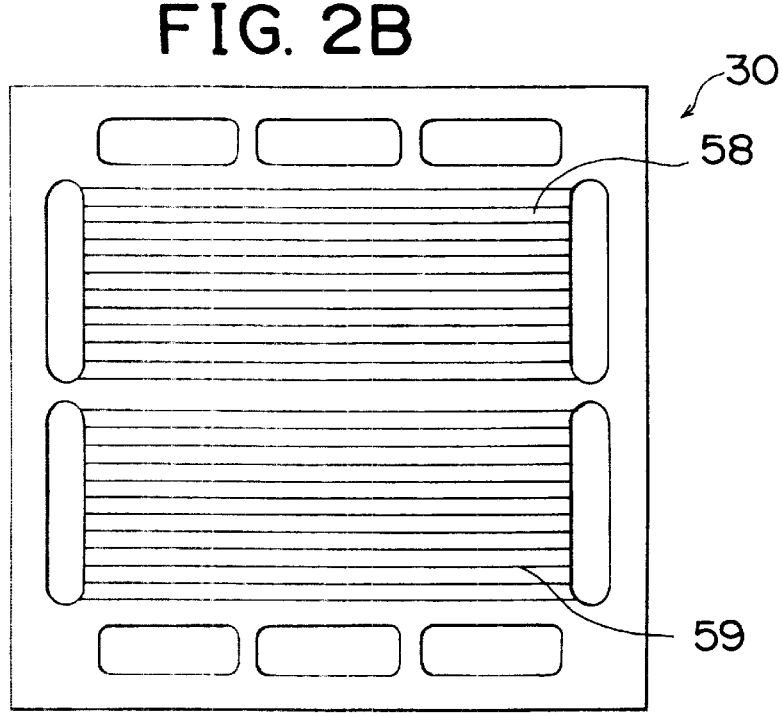

The separator is formed of a gas impermeable conductive member, for example, high density carbon made gas impermeable by compression. FIG. 2A and FIG. 2B are plan views of the separator 30 from both sides (face and back). The separator 30 has ten holes near the sides. That is, near a surface of the separator 30, holes 40, 41, 42 are provided adjacently along this side, and near a surface opposite to this side, holes 43, 44, 45 are provided adjacently. Near a third side, different from these two sides, two adjacent holes 50, 51 are provided and, near a surface opposite to this third side, similarly adjacent holes 52 and 53 are provided (see FIG. 2A). The separator 30 further has groove ribs formed parallel to both sides.

Herein, at one surface of the separator 30, a rib 55 for communicating the hole 40 and its confronting hole 43, a rib 56 for communicating the hole 41 and its confronting hole 44, and a rib 57 for communicating the hole 42 and its confronting hole 45 are provided. At the other surface of the separator 30, a rib 58 for communicating the hole 50 and its confronting hole 52, and a rib 59 for communicating the hole 51 and its confronting hole 53 are provided. These ribs are mutually parallel groove structures as mentioned above.

As shown in FIG. 1, the separator 30 is laminated together with the electrolyte membrane 31, anode 32 and cathode to form a unit cell 20, and further a stack structure 15 is formed, while the ribs form gas passages between the adjacent gas diffusion electrodes. That is, the ribs 55 to 57 fluidly connect two confronting holes of the holes 40 to 45 form unit cell inside oxidizing gas passages together with the surface of the adjacent cathode, and the ribs 58, 59 fluidly connect two confronting holes of the holes 50 to 53 form unit cell inside fuel gas passages together with the surface of the adjacent anode 32.

When the stack structure 15 is assembled by laminating unit cells 20, the holes 40, 44, 42 of each separator 30 form oxidizing gas feed manifolds 60, 61, 62 penetrating through the inside of the stack structure 15 in its laminating direction. The holes 43, 41, 45 similarly form oxidizing gas exhaust manifolds 63, 64, 65 penetrating through the inside of the stack structure 15 in its laminating direction. Further, the holes 52, 51 similarly form fuel gas feed manifolds 66, 67 penetrating through the inside of the stack structure in its laminating direction, and the holes 50, 53 form fuel gas exhaust manifolds 68, 69 respectively (see FIG. 2A). The flow of gas in these gas passages formed in the stack structure 15 is described in detail below (see FIG. 6 and FIG. 7).

When assembling the stack structure 15 having such members, the separator 30, anode 32, electrolyte membrane 31, cathode, and separator 30 are joined in this sequence, and a return plate 70 is disposed at one end of a specified number of unit cells 20 being laminated. Further, at both ends, current collectors 36, 37, insulating plates 38, 39, and end plates 80, 85 are sequentially disposed, and the stack structure 15 shown in FIG. 3 is completed.

Figure 4A:
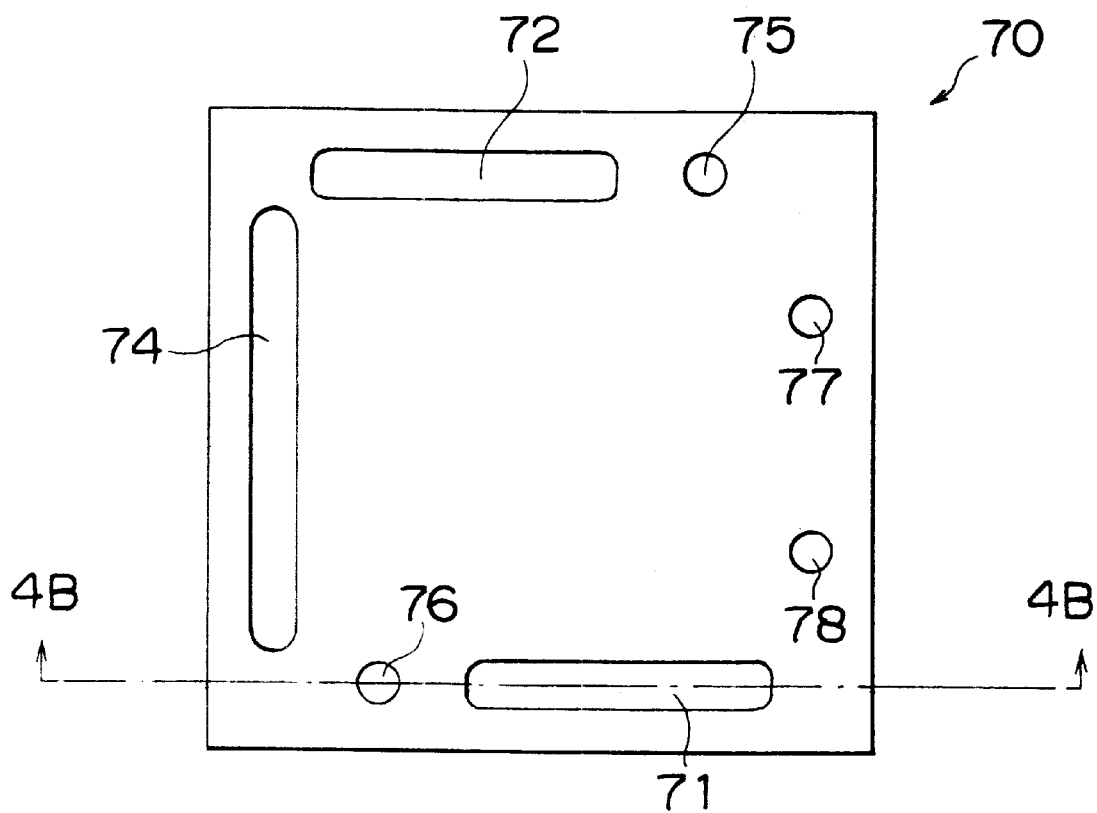
FIG. 4A and FIG. 4B are explanatory diagrams showing a shape of a return plate.
Figure 4B:
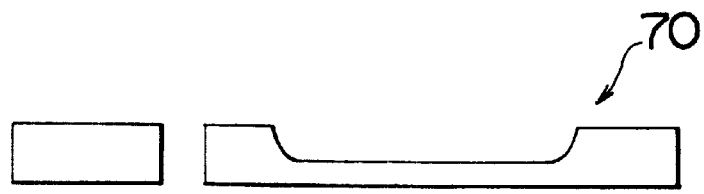

Like the separator 30, the return plate 70 is formed of high density carbon. FIG. 4 is an explanatory diagram showing the shape of the return plate 70. FIG. 4A shows the appearance of the plane, and FIG. 4B shows a mode of 4B—4B section in FIG. 4A. As shown in FIG. 4, the return plate 70 has recesses 71, 72, 74 and holes 75, 76, 77, 78 near the sides, and when composing the stack structure 15, the return plate 70 is disposed so that the adjacent separator 30 and the surface having the recesses 71, 72, 74 may contact with each other. The section of the recess 71 is shown in FIG. 4B, and the other recesses 72, 74 have a similar structure, and they are dent structures prepared by piercing the surface of the return plate 70. The holes 75 to 78 are holes penetrating through the return plate 70.

Herein, the recess 71 of the return plate 70 overlaps oppositely the hole 43 and hole 44 of the adjacent separator 30 when composing the stack structure 15, and communicates between the end of the oxidizing gas exhaust manifold 63 and the end of the oxidizing gas feed manifold 61. The recess 72 overlaps the hole 41 and hole 42 of the adjacent separator 30 when composing the stack structure 15, and communicates between the end of the oxidizing gas exhaust manifold 64 and the end of the oxidizing gas feed manifold 62. Similarly, the recess 74 overlaps the hole 50 and hole 51 of the adjacent separator 30 when composing the stack structure 15, and communicates between the end of the fuel gas exhaust manifold 68 and the end of the fuel gas feed manifold 67.

Further, the hole 75 overlaps the hole 40 of the separator 30 to open an end of the oxidizing gas feed manifold 60, and the hole 76 overlaps the hole 45 of the separator 30 to open an end of the oxidizing gas exhaust manifold 65. The hole 77 overlaps the hole 52 of the separator 30 to open an end of the fuel gas feed manifold 66, and the hole 78 overlaps the hole 53 of the separator 30 to open an end of the fuel gas exhaust manifold 69. The other ends of the oxidizing gas feed manifolds 60 to 62, oxidizing gas exhaust manifolds 63 to 65, fuel gas feed manifolds 66,67, and fuel gas exhaust manifolds 68, 69 are closed by the current collector 37.

The current collectors 36, 37 are formed of gas impermeable conductive members such as high density carbon and steel plate, the insulting plates 38,39 are formed of insulating members such as rubber and resin, and the end plates 80, 85 are formed of rigid steel or other metal.

The current collectors 36, 37 are respectively provided with output terminals 36A, 37A, and are designed to produce the electromotive force generated in the fuel cell composed of the stack structure 15. The current collector 36, insulating plate 38, and end plate 80 individually have four holes capable of forming gas passages by overlapping the holes 75 to 78, at positions corresponding to the holes 75 to 78 of the return plate 70, when the stack structure 15 is formed. For example, the end plate 80 is provided with holes 81 to 84 corresponding to each one of the holes 75 to 78 (see FIG. 3).

When operating the fuel cell composed of the stack structure 15, the hole 83 of the end plate 80 and a fuel gas feed device not shown in the drawing are connected, and a hydrogen-rich fuel gas is supplied into the fuel cell. Similarly, the hole 81 and an oxidizing gas feed device not shown in the drawing are connected, and oxidizing gas containing oxygen (air) is supplied into the fuel cell. Herein, the fuel gas feed device and oxidizing gas feed device are devices for humidifying and pressurizing each gas by a specified amount, and supplying into the fuel cell. Moreover, a fuel gas feed device not shown in the drawing is connected to the hole 84, and an oxidizing gas discharge device not shown in the drawing is connected to the hole 82.

The laminating sequence of the members when composing the stack structure 15 is as mentioned above, and in the periphery of the electrolyte membrane 31, a specified seal member is provided in a region contacting with the separator 30. This seal member serves to prevent leak of fuel gas and oxide gas from each unit cell, and prevent mixing of fuel gas and oxidizing gas in the stack structure 15.

The stack structure 15 composed of such members is held in a state of a specified pressing force applied in its laminating direction, and the fuel cell is completed. The structure for pressing the stack structure 15 is omitted in the drawing. In order to hold the stack structure 15 while pressing, the stack structure 15 may be tightened by using bolts and nuts, or a stack accommodating member in a specified shape may be prepared, and the stack structure 15 may be contained in this stack accommodating member, and both ends of the stack accommodating member may be folded to apply a pressing force on the stack structure 15.

In the above explanation, the separator 30 and the return plate 70 are formed of gas impermeable high density carbon obtained by compressing carbon, but they may be also formed of different materials. For example, they may be formed of sinter carbon or metal member. When forming of metal member, it is preferred to select a metal having a sufficient corrosion resistance. Or the surface of metal member may be coated with a material having a sufficient corrosion resistance.

Although not shown in FIG. 2, the separator 30 in the embodiment also has a hole for forming a cooling water manifold for passing cooling water, in addition to the holes 40 to 45 for forming gas manifolds for passing oxidizing gas, and holes 50 to 53 for forming gas manifolds for passing fuel gas. In the electrochemical reaction promoted in the fuel cell, the chemical energy in the fuel supplied in the fuel cell is converted into an electric energy, but this conversion is not perfect, but the residual energy not converted into electric energy is released as heat. Thus, the fuel cell continues heat generation along with power generation. Accordingly, in order to keep the operating temperature of the fuel cell in a desired range, usually, a passage for cooling water is provided in the fuel cell, and cooling water is circulated in the fuel cell to get rid of excess heat.

When composing such stack structure 15, the hole for forming the cooling manifold provided in the separator 30 penetrates through the stack structure 15, and supplies and discharges cooling water in the cooling water passage between unit cells as mentioned below. In every specified number of laminated unit cells, instead of the ordinary separator 30, a cooling water passage separator (not shown) for forming a corrugated structure serving as a cooling water passage on the surface is provided. The corrugated structure formed on this cooling water passage separator constitutes a cooling water passage between unit cells between the cooling water passage separator and the adjacent member. This cooling water passage in the stack disposed in every specified number of unit cells receives supply and discharge of cooling water from the cooling water manifold formed in the hole mentioned above, and this cooling water removes excess heat generated by heat generation from the fuel cell.

Figure 6:
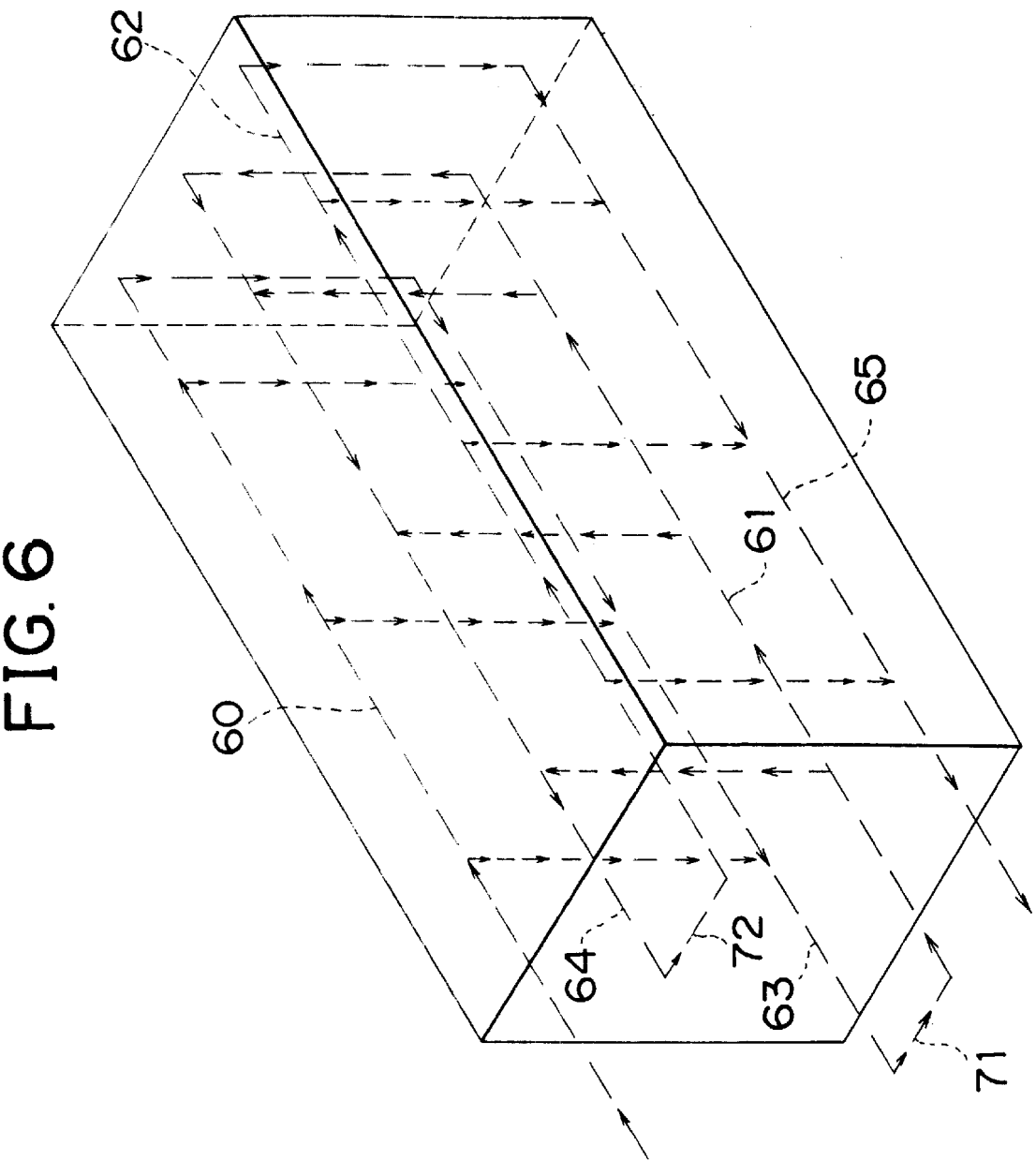
FIG. 6 is a solid explanatory diagram of flow of oxide gas in a stack structure.
Figure 7:
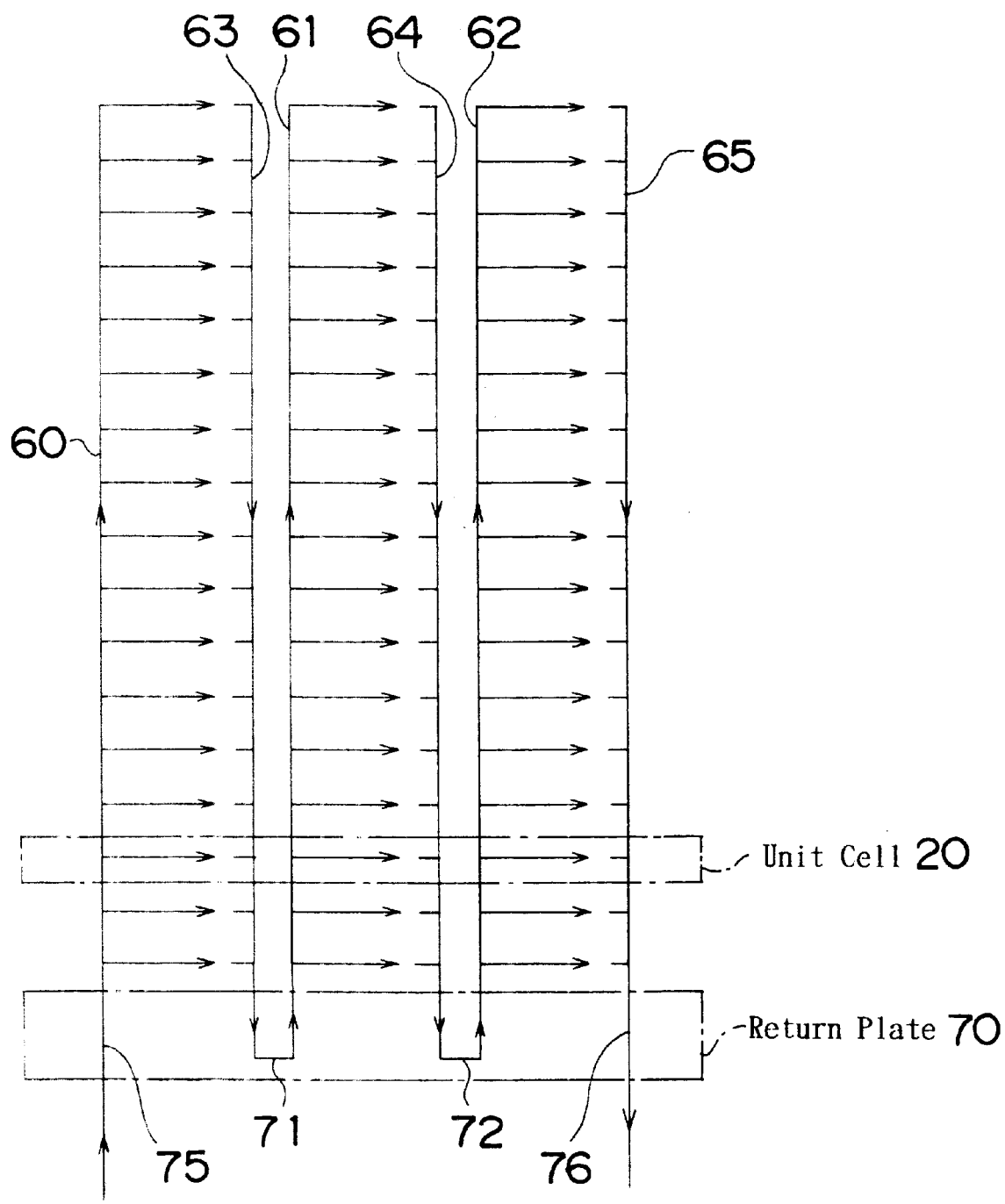
FIG. 7 and FIG. 8 are plane explanatory diagrams of flow of oxidizing gas in a stack structure.

In thus constituted fuel cell, the flow of fuel gas and oxidizing gas is described below. First, the oxidizing gas is explained. FIG. 6 is a solid explanatory diagram showing the flow of oxidizing gas in the stack structure 15, and FIG. 7 is a plane explanatory diagram showing the flow of the same oxidizing gas. As mentioned above, the oxidizing gas (pressuring air) supplied from the oxidizing gas feed device connected to the hole 81 provided in the end plate 80 is introduced into the oxidizing gas feed manifold 60 through the hole provided in the position corresponding to the insulating plate 38 and current collector 36, and the hole 75 provided in the return plate 70. The oxidizing gas passing in the oxidizing gas feed manifold 60 is introduced into the gas passage (unit cell inside oxidizing gas passage) formed between the rib 55 in each separator 30 and the adjacent cathode in each unit cell 20. The introduced oxidizing gas is presented for electrochemical reaction, but the residual oxidizing gas not spent in reaction is discharged into the oxidizing gas exhaust manifold 63 formed in the hole 43 provided in the separator 30. In the oxidizing gas exhaust manifold 63, while the oxidizing gas is passing in the reverse direction in the oxidizing gas feed manifold 60, it is merged with the oxidizing gas discharged from the unit cell inside oxidizing gas passage formed in each unit cell.

Such oxidizing gas, when reaching the return plate 70 at the end of the stack structure 15, is further guided into the oxidizing gas feed manifold 61 through the recess 71. The oxidizing gas guided into the oxidizing gas feed manifold 61 passes through the oxidizing gas feed manifold 61, and is distributed into individual unit cell inside oxidizing gas passages formed between the rib 56 of each separator 30 and the adjacent cathode, and is presented for electrochemical reaction while passing through the unit cell inside oxidizing gas passages. The oxidizing gas thus passing through the unit cell inside oxidizing gas passage is discharged into the oxidizing gas exhaust manifold 64, and is merged while flowing in the reverse direction in the oxidizing gas feed manifold 61, and reaches again the return plate 70.

In the return plate 70, the oxidizing gas is led into the recess 72, and is introduced into the oxidizing gas feed manifold 62. Similarly in the oxidizing gas feed manifold 62, the oxidizing gas passes through the oxidizing gas feed manifold 62, and is distributed into each unit cell inside oxidizing gas passage formed between the rib 57 in each separator 30 and the adjacent cathode, and is presented for electrochemical reaction while passing through the unit cell inside oxidizing gas passage. The oxidizing gas thus passing through the unit cell inside oxidizing gas passage is discharged into the oxidizing gas exhaust manifold 65, and is merged, and flows in the reverse direction in the oxidizing gas feed manifold 62, and reaches again the return plate 70. Reaching the return plate 70, the oxidizing gas is discharged into the oxidizing gas discharge device connected to the hole 82, through the hole 76 in the return plate 70, the hole provided at the position corresponding to the current collector 36 and insulating plate 38, and the hole 82 provided in the end plate 80.

Figure 8:
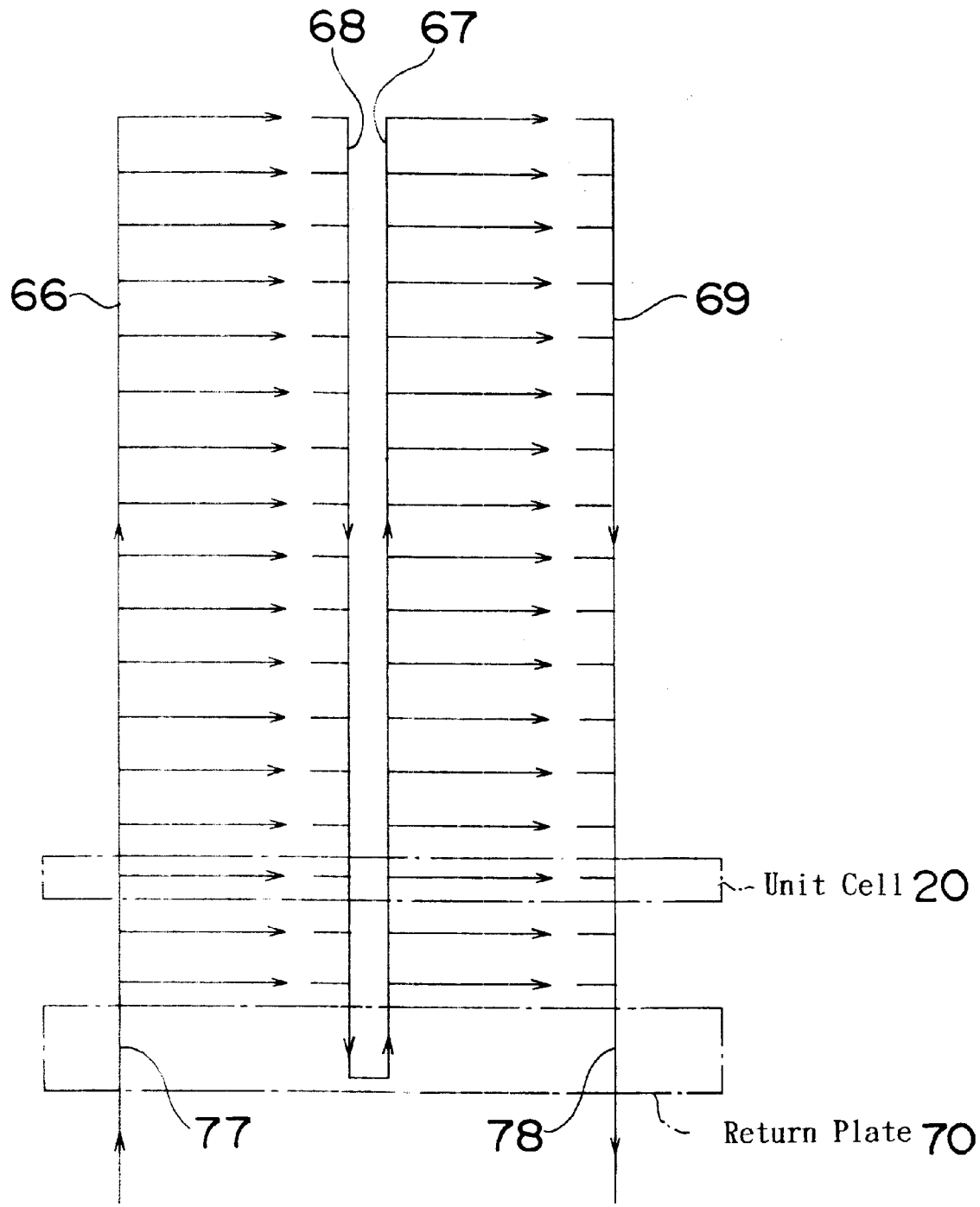

So far is explained the flow of oxidizing gas in the stack structure 15, and the flow of fuel gas in the stack structure 15 is similar. FIG. 8 is a plane explanatory diagram showing the flow of the fuel gas in the stack structure 15. As mentioned above, the fuel gas supplied from the fuel gas feed device connected to the hole 83 provided in the end plate 80 is introduced into the fuel gas feed manifold 66 through the hole provided in the position corresponding to the insulating plate 38 and current collector 36, and the hole 77 provided in the return plate 70. The fuel gas passing in the fuel gas feed manifold 66 is introduced into the gas passage (unit cell inside fuel gas passage) formed between the rib 58 in each separator 30 and the adjacent anode 32 in each unit cell 20. The introduced fuel gas is presented for electrochemical reaction, but the residual fuel gas not spent in reaction is discharged into the fuel gas exhaust manifold 68 through the hole 50 provided in the separator 30. In the fuel gas exhaust manifold 68, while the fuel gas is passing in the reverse direction in the fuel gas feed manifold 68, it is merged with the fuel gas discharged from the unit cell inside fuel gas passage formed in each unit cell.

Such fuel gas, when reaching the return plate 70 at the end of the stack structure 15, is further guided into the fuel gas feed manifold 67 through the recess 74. The fuel gas guided into the fuel gas feed manifold 67 passes through the fuel gas feed manifold 67, and is distributed into individual unit cell inside fuel gas passages formed between the rib 59 of each separator 30 and the adjacent anode 32, and is presented for electrochemical reaction while passing through the unit cell inside fuel gas passages. The fuel gas thus passing through the unit cell inside fuel gas passage is discharged into the fuel gas exhaust manifold 69, and is merged while flowing in the reverse direction in the fuel gas feed manifold 67, and reaches again the return plate 70. Reaching the return plate 70, the fuel gas is discharged into the fuel gas discharge device connected to the hole 84, through the hole 78 in the return plate 70, the hole provided at the position corresponding to the current collector 36 and insulating plate 38, and the hole 84 provided in the end plate 80.

According to thus constituted fuel cell of the embodiment, on the surface of each separator 30, the region forming the passages of oxidizing gas and fuel gas is divided into three and two sections, respectively and corresponding to each one of the divided regions, the gas feed manifold and gas exhaust manifold are provided independently, and therefore if the gas flow rate supplied in the entire fuel cell is the same, as compared with the constitution not dividing the region for forming the passages, the gas flow rate per unit sectional area in the unit cell inside gas passage is increased, and the gas flow velocity can be raised. For example, in the separator 30, if the ribs 55, 56, 57 divide the region capable of forming the unit cell inside oxidizing gas passages into three equal sections respectively, if the flow rate of oxidizing gas to be supplied from the oxidizing gas feed device into the fuel cell, and the total area of forming the ribs on the separator surface are the same, as compared with the case of using the separator 130 in the related art shown in FIG. 32, the flow rate of the oxidizing gas passing through the unit cell inside oxidizing gas passage is three times as much.

Therefore, by dividing the gas passage forming region, the gas is agitated and diffused sufficiently in the gas passage. As a result, the contact between the catalyst provided in the electrode and the electrode active material is improved, and the electrode active material in the gas is smoothly utilized in electrochemical reaction, so that the gas utility rate may be enhanced. As the gas utility rate is enhanced, if the total volume of gas supplied into the fuel cell from the fuel gas feed device or oxidizing gas feed device is decreased, the electrochemical reaction can be promoted sufficiently. Therefore, as for the fuel gas, the consumption of the fuel is suppressed. In particular, it is effective when using reformed gas obtained by steam reformation of hydrocarbon as the fuel gas. The reformed gas contains many components, aside from hydrogen, not contributing to electrochemical reaction. Hence, in order to promote the electrochemical reaction sufficiently, as compared with the case of using hydrogen gas as fuel gas, it is required to supply a larger amount of reformed gas as fuel gas. However, when the gas utility rate is improved by the constitution of the embodiment, the fuel consumption can be saved while suppressing the amount of reformed gas supplied into the fuel cell.

Moreover, since the total amount of gas to be supplied into the fuel gas can be suppressed, as for oxidizing gas, when supplying oxidizing gas into the fuel cell, the amount of energy consumed for pressurizing the oxidizing gas is suppressed, and the energy efficiency of the entire system having the fuel cell can be kept in a high state. In the constitution of the aforementioned related art in the serpentine structure of the shape of the gas passage formed in the separator surface in order to increase the gas flow rate passing through the unit cell inside gas passage, it is required to fold the shape of the unit cell inside gas passage. Accordingly, the pressure loss is large when the gas passes through the gas passage, and although the total amount of gas supplied in the fuel cell is not increased, the amount of energy consumed for pressurizing more the gas supplied into the fuel cell is increased. By contrast, in the constitution of the embodiment, it is not necessary to fold the unit cell inside gas passage, there is no such problem as the increase in pressure loss.

By accelerating the flow velocity of the gas passing through the gas passage, it is effective to enhance the water discharge performance in the fuel cell. Herein, the problem of water produced in the fuel cell is described. When the fuel cell promotes electrochemical reaction by receiving supply of fuel gas containing hydrogen and oxidizing gas containing oxygen, water is produced. The electrochemical reaction promoted in the fuel cell is shown in the following formulas.

$$H_2O \rightarrow 2H^+ + 2e^- \qquad (1)$$

$$\tfrac{1}{2}O_2 + 2H^+ + 2e^- \rightarrow H_2O \qquad (2)$$

$$H_2 + \tfrac{1}{2}O_2 \rightarrow H_2O \qquad (3)$$

Formula (1) shows the reaction taking place at the anode side, and formula (2) relates to the reaction at the cathode side, and on the whole the reaction expressed in formula (3) proceeds. As shown in formula (2), along with the progress of electrochemical reaction, water is produced at the cathode side, but this water is usually vaporized in the oxidizing gas, and is discharged together with the oxidizing gas. At this time, if too much water is produced, it cannot be sufficiently vaporized, but stays in the gas diffusion electrode, and may impede gas diffusion near the catalyst on the electrolyte membrane. In the fuel cell having the separator 30 of the embodiment, since the flow velocity of the oxidizing gas passing through the unit cell inside gas passage is accelerated as mentioned above, the water produced at the cathode surface is efficiently vaporized into the oxidizing gas and discharged, thereby preventing the produced water from staying in the fuel cell to impede the gas diffusion.

Moreover, by decreasing the total amount of gas supplied into the fuel cell, the humidifying amount of the oxidizing gas to be supplied into the fuel cell is decreased. As stated above, the water produced at the cathode surface is vaporized into the oxidizing gas. At this time, part of the moisture held by the electrolyte membrane is vaporized into the oxidizing gas, and discharged outside of the fuel cell. To progress the electrochemical reaction sufficiently in the fuel cell, usually, the oxidizing gas containing oxygen more than the theoretically required oxygen quantity is supplied into the fuel cell, but as the amount of oxidizing gas supplied into the fuel cell increases, the moisture taken out of the fuel cell by the oxidizing gas increases, and hitherto drying of electrolyte membrane was prevented by preliminarily humidifying the oxidizing gas to be supplied into the fuel cell. By contrast, in the fuel cell having the separator 30 of the embodiment, since the total amount of gas supplied into the fuel cell can be decreased, and the moisture taken out of the fuel cell by the oxidizing gas is decreased, and the humidifying amount of oxidizing gas to be supplied into the fuel cell is decreased. Besides, by decreasing the humidifying amount, the energy required for humidifying can be saved. The moisture removed by the oxidizing gas from the electrolyte membrane varies with the operating temperature of the fuel cell or pressure or flow velocity of oxidizing gas, but if the electrolyte membrane is maintained in a sufficiently wet state without humidifying the fuel cell, the structure for humidifying the oxidizing gas is not needed. At the anode side, the proton produced in the reaction of formula (1) moves in the electrolyte membrane in a state hydrated with water molecules, and therefore if hydrogen gas is used as the fuel gas, it is necessary to humidify prior to supply into the fuel cell, but according to the embodiment, since the fuel gas amount supplied to the fuel cell is suppressed, the humidifying amount of the fuel gas is saved.

Herein, by decreasing the total amount of gas supplied to the fuel cell and saving the moisture removed from the electrolyte membrane by the gas, the operating temperature of the fuel cell can be set higher. That is, even at high temperature of high saturated vapor pressure, the fuel cell can be operated without drying the electrolyte membrane too much. Moreover, by setting the operating temperature of the fuel cell higher, the electrochemical reaction can be activated further. Still more, by setting the operating temperature of the fuel cell higher, in particular, when the reformed gas is used as the fuel gas, poisoning of the catalyst on the electrolyte membrane by carbon monoxide in the reformed gas can be suppressed, and the cell performance may be further enhanced. When producing hydrogen-rich reformed gas by steam reforming of hydrocarbon, traces of carbon monoxide may be produced. Such carbon monoxide is adsorbed on the catalyst on the electrolyte membrane, and may lower the catalyst performance. The degree of poisoning by carbon monoxide depends on the temperature, and the effect of poisoning may be suppressed by setting the operating temperature of the fuel cell higher.

In the fuel cell having the separator 30 of the embodiment, in an arbitrary unit cell 20, the region of supplying oxidizing gas or fuel gas (the region of forming the unit cell inside gas passage) is divided, and gas feed manifold and gas exhaust manifold are independently provided in each divided region, and therefore if produced water stays at the junction of a specific manifold and specific unit cell inside passage, supply of gas to this unit cell is not completely cut off, and the power generation efficiency is not lowered in the entire unit cells. As mentioned above, when the electrochemical reaction is progress in the fuel cell, water is produced at the cathode side, and the water is vaporized into the oxidizing gas and is discharged, but in the region of a relatively low temperature distribution state in the fuel cell, if the steam exists more than the steam amount corresponding to the saturated vapor pressure, the produced water may condense. In the event of such condensation of the produced water, if the condensate stays in the junction of the manifold and unit cell inside passage, supply of gas to this unit cell inside passage is cut off. As in the separator 130 shown in FIG. 32, when the manifold for supplying gas into the unit cell inside gas passage formed on the separator is available at one position only, if the junction is closed by the produced water, supply of gas into the unit cell corresponding to this junction is completely cut off. By contrast, in the fuel cell having the separator 30 of the embodiment, three manifolds are provided independently to supply oxidizing gas into the unit cell inside gas passage formed on the separator. Since the possibility of simultaneous closure of all three manifolds is very low, it is possible to prevent complete stop of supply of oxidizing gas to any unit cell having the stack structure due to produced water.

Figure 32:
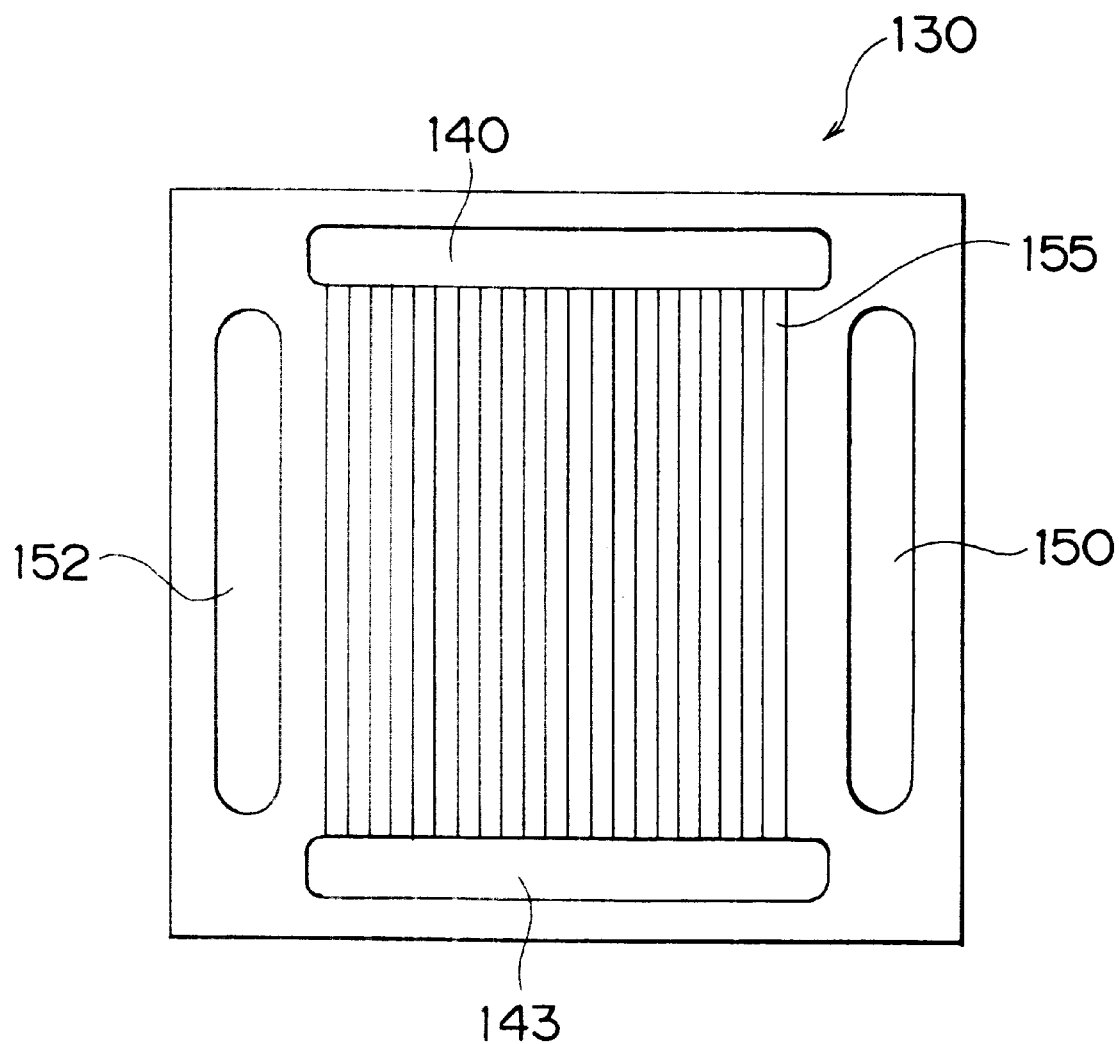
FIG. 32 is an explanatory diagram showing a constitution of a separator in a related art.

Furthermore, since the region forming the unit cell inside gas passages is divided, the amount of gas supplied into individual unit cells 20 composing the stack structure 15 is equalized in the entire fuel cell. Usually, the amount of gas distributed from the gas feed manifolds into individual unit cell inside gas passages varies in each unit cell. Moreover, the distribution of gas flow rate fluctuates in the unit cell inside gas passages in each unit cell. That is, in the fuel cell composed by using the separator 130 as shown in FIG. 32, since the gas is supplied at once into a wide region, the gas flow rate is hardly uniform in the entire unit cell inside gas passages formed by the ribs 155. In particular, regions of low gas flow rate tend to be formed at both ends of the ribs 155 (the ribs near the right end surface (150 side) in the drawing and near the left end surface (152 side) in the drawing). Thus, since the gas flow rate fluctuates within the unit cell inside gas passage or in each unit cell inside gas passage, in order to promote the electrochemical reaction sufficiently also in the region corresponding to passages of low gas flow rate, usually, the amount of gas to be supplied to the entire fuel cell was set in an excessive quantity to keep sufficiently the amount of gas supplied to the individual unit cell inside gas passages.

In the fuel cell of the embodiment, since the region for forming the unit cell inside gas passages is divided, although the gas flow rate fluctuates in the individual divided regions (in the unit cell inside gas passages formed by plural ribs on the same surface of the separator 30, for example, 55, 56, 57 in FIG. 2A), effects of fluctuations of gas flow rate may be reduced in the entire unit cell inside gas passages formed on a specified surface. That is, fluctuations of gas flow rate in the individual divided regions occur independently, and gas is supplied into individual regions independently, and therefore it is hardly possible that the gas flow rate is low as compared with other unit cell inside gas passages in all of the individual divided regions. That is, the risk of extremely low gas flow rate in a unit cell gas passage in a specific unit cell is very low. Therefore, in the individual unit cell inside gas passages, the regions decreased in gas flow rate can be further reduced. Thus, since the fluctuations of flow rate of gas passing through the unit cell inside gas passages are decreased and a sufficient gas flow rate is maintained, it is not necessary to supply an excessive gas to the fuel cell in order to promote sufficiently the electrochemical reaction in the regions decreased in gas flow rate due to fluctuations of gas flow rate, and the gas consumption is suppressed, and the amount of energy spent for supplying gas into the fuel cell can be saved.

The electrode active material contained in the gas supplied in the fuel cell is spent in the electrochemical reaction in the process of passing through the fuel cell, and is gradually lowered in concentration, but in the fuel cell of the embodiment, the gas passages having the divided unit cell inside gas passages are connected sequentially, so that gas low in concentration of electrode active material is not supplied into a specific unit cell alone. Herein, instead of dividing the region for forming the unit cell inside gas passage, the stack structure for composing the fuel cell may be divided into a plurality of units, and the divided stack structures may be connected in series, so that the amount of gas passing through the unit cell inside gas passage may be increased in the condition of constant gas amount supplied to the fuel cell. In this case, however, the power generation efficiency may differ in the individual divided unit cells. That is, instead of forming the stack structure by laminating 100 unit cells, when each of two stack structures laminating 50 unit cells is connected in series, the specified amount of gas supplied into the fuel cell is divided into 50, instead of 100, and is supplied into the individual unit cell inside gas passages, and hence it is effective to increase the gas flow rate and enhance the gas utility rate. However, the downstream surface stack structure is lower in the concentration of electrode active material in the supplied gas as compared with the upstream side, and is smaller in the entire gas amount, and therefore the voltage is lower in the downstream surface stack structure as compared with the upstream surface and hence the performance may fluctuate. It is hard to improve the fluctuation in performance between the upstream stack structure and downstream stack structure if the number of unit cells of the upstream stack structure is increased as compared with the downstream side. In the fuel cell of the embodiment, gas of low concentration of electrode active material is not supplied or the gas flow rate is not lowered in a specific unit cell, and therefore the cell performance is not partially lowered and varied.

The following examples have actually proved the effects obtained by the constitution of the fuel cell in this embodiment in which the region for forming the unit cell inside gas passages is divided into a plurality of regions in each unit cell, and gas manifolds are provided independently to supply gas into each region.

Figure 9A:
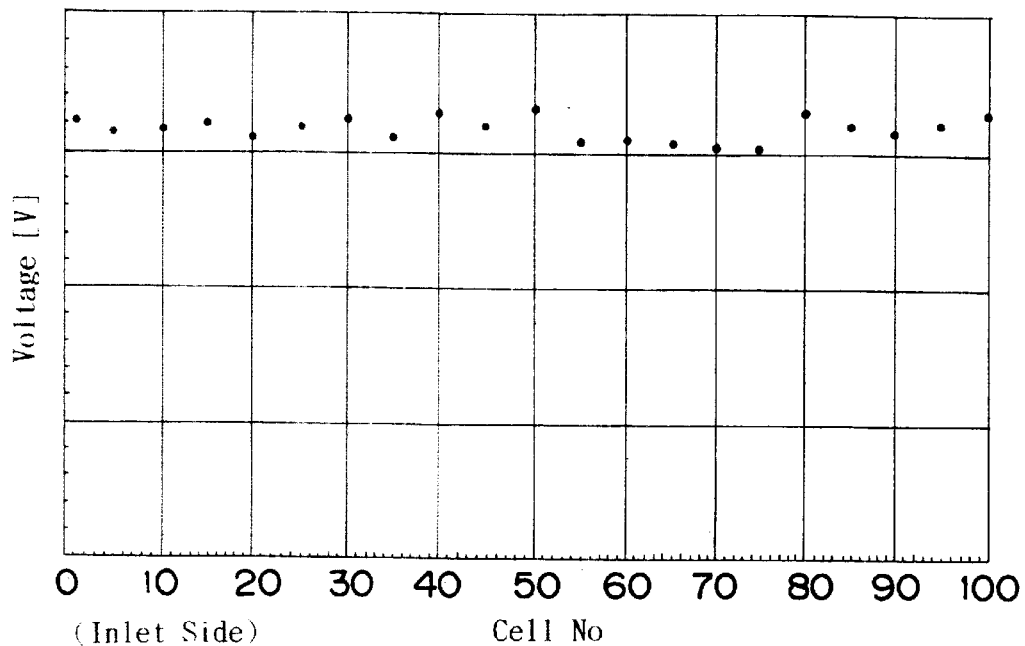
FIG. 9A and FIG. 9B are explanatory diagrams showing fluctuations of voltage in each unit cell for composing a fuel cell.
Figure 9B:
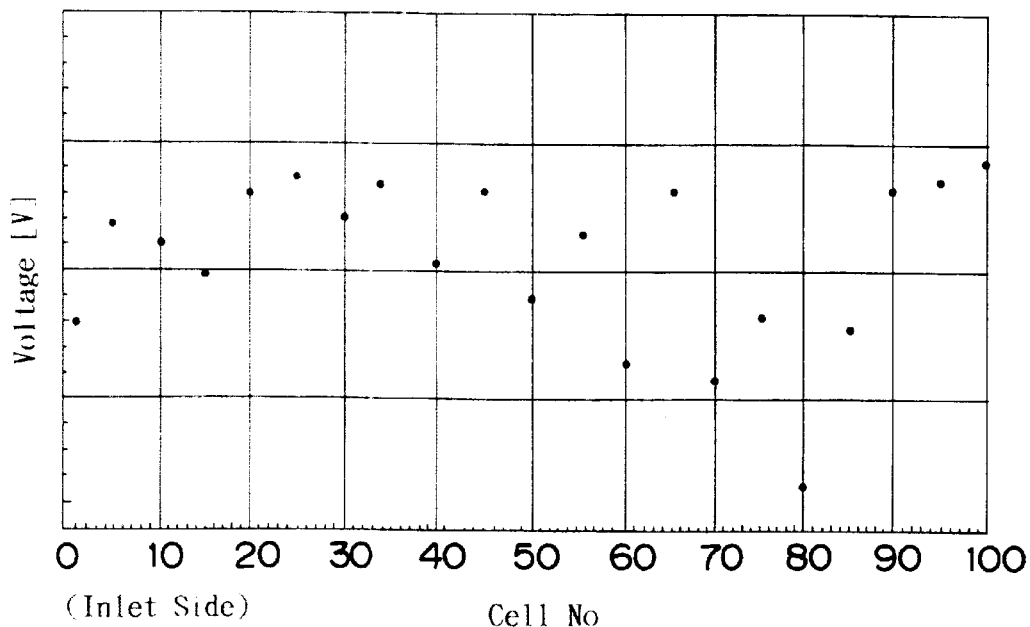

FIG. 9A and FIG. 9B are explanatory diagrams showing fluctuations of voltage in individual unit cells for composing the fuel cell in which the output current density from the fuel cell is constant. FIG. 9A shows voltage fluctuations in the fuel cell composed by using the separator 30 of the embodiment, and FIG. 9B shows voltage fluctuations in the fuel cell composed by using the separator 130 shown in FIG. 32. In the diagram, the left surface (inlet side) is the connection surface with the gas feed device, and unit cell voltages are shown sequentially to the right side, along the unit cell laminating direction.

As shown in FIG. 9A, according to the fuel cell using the separator 30 of the embodiment, a stable voltage is obtained in each unit cell in the entire fuel cell. FIG. 9A shows the result of operating the fuel cell at 75° C., and FIG. 9B shows the result of operating the fuel cell at 67° C. Thus, in the fuel cell using the separator 30 of the embodiment, if the operating temperature is raised, the cell performance is not lowered due to drying of electrolyte membrane.

Figure 10A:
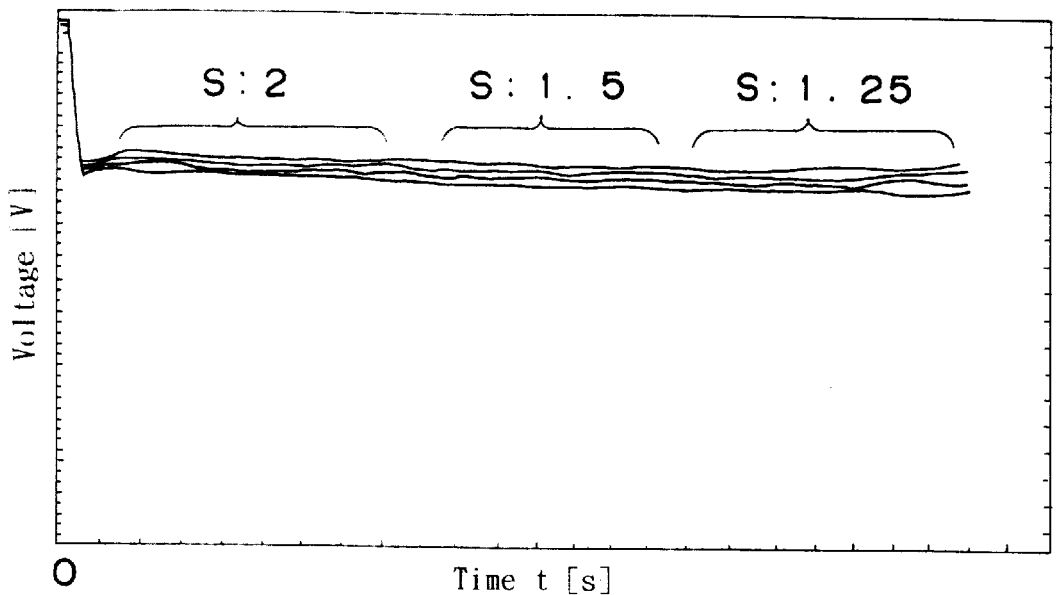
FIG. 10A and FIG. 10B are explanatory diagrams showing time-course changes of output voltage by gradual changes of amount of oxidizing gas (pressurizing air) to be supplied into a fuel cell.
Figure 10B:
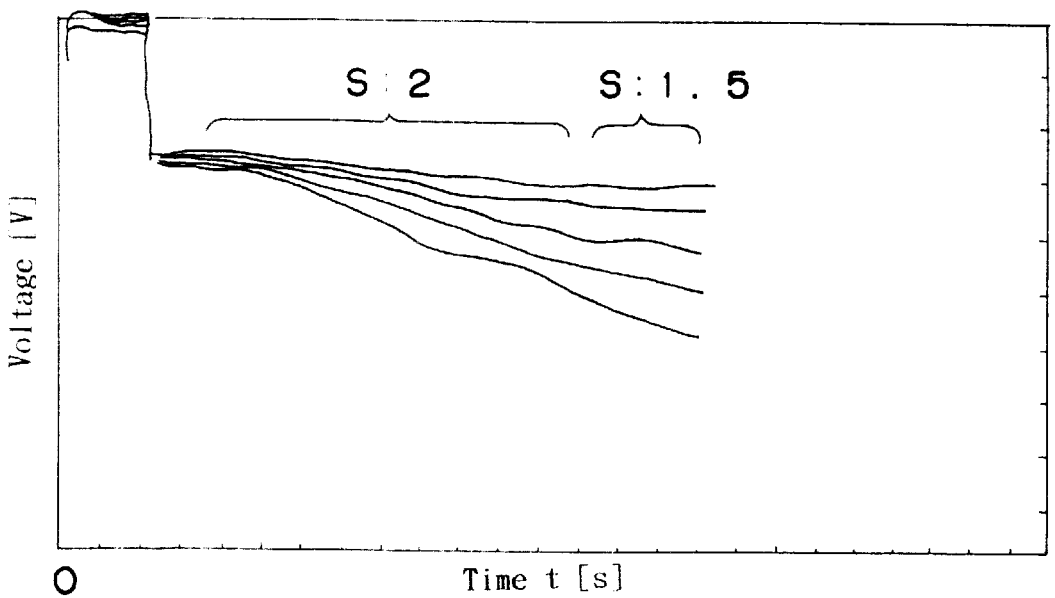

FIG. 10A and FIG. 10B show time-course changes of output voltage in each unit cell for composing the fuel cell, by varying the amount of oxidizing gas (pressurizing air) to be supplied in the fuel cell in which the output current density from the fuel cell is constant. FIG. 10A shows voltage changes in the fuel cell composed by using the separator 30 of the embodiment, and FIG. 10B shows voltage changes in the fuel cell composed by using the separator 130 shown in FIG. 32. Upon start of measurement, the air containing a double amount of oxygen of the theoretically required oxygen amount (shown S:2 in the diagram) was supplied on the gas is of the output current density from the fuel cell, and after a specified time, the oxygen amount in the oxidizing gas supplied in the fuel cell was decreased to 1.5 times the theoretical amount (S:1.5), and after a further specified time, the oxygen amount in the oxidizing gas supplied in the fuel cell was further decreased to 1.25 times the theoretical amount.

As shown in FIG. 10A, according to the fuel cell using the separator 30 of the embodiment, the output voltage from each unit cell composing the fuel cell was stable even if the oxygen amount in the oxidizing gas supplied in the fuel cell was changed from 2 times the theoretically required amount to 1.25 times. By contrast, in the fuel cell using the separator 130 shown in FIG. 32, if the oxygen amount in the oxidizing gas supplied in the fuel cell is twice the theoretically required amount, the output voltages of unit cells composing the fuel cell fluctuated largely, and if the oxygen amount was decreased to 1.5 times theoretical amount, the voltage dropped suddenly due to drying of electrolyte membrane, and power generation could not be continued.

Thus, by composing the fuel cell by using the separator 30 of the embodiment, it is possible to curtail substantially the oxygen amount in the oxidizing gas supplied in the fuel cell, that is, the amount of oxidizing gas to be supplied into the fuel cell. In the fuel cell using the separator 130 shown in FIG. 32, in order to stabilize the output voltage in the unit cells composing the fuel cell, the oxygen amount in the oxidizing gas supplied in the fuel cell must be increased to 4 to 5 times of the theoretically required oxygen amount. FIG. 10A shows the result of operating the fuel cell having the separator 30 at 75° C., and FIG. 10B shows the result of operating the fuel cell having the separator 130 at 67° C. Thus, in the fuel cell using the separator 30 of the embodiment, if the operating temperature is set higher and the oxygen amount in the oxidizing gas supplied in the fuel cell, that is, the flow rate of oxidizing gas being supplied is decreased, a stable output voltage is obtained from the unit cells.

In the separator 30, in an arbitrary unit cell 20, the region for forming the unit cell inside gas passage is divided into three sections, and the region for forming the unit cell inside fuel gas passage is divided into two sections, but not limited to this, it may be divided into a different number of sections. The region for forming the unit cell inside gas passage may be divided into plural sections, and manifolds for feeding and discharging gas may be individually provided in the divided regions. By accelerating the flow velocity of the gas passing through the unit cell inside gas passage, the electrode active material in the gas may easily reach the catalyst on the electrolyte membrane, so that the same effects may be obtained. Herein, by increasing the number of divisions of the region for forming the unit cell inside passage, the flow velocity of the gas passing through the unit cell inside passage may be faster, but as the number of divisions is increased, the pressure loss increases when the gas passes through the passage. If the pressure loss increases when the gas passes through the passage, in order to maintain a specified amount of gas to be supplied in the fuel cell, it is necessary to increase the amount of energy consumed for pressurizing the gas to be supplied to the fuel cell. Therefore, considering the effect by increasing the number of divisions of the region for forming the unit cell inside passage, and the increment of the energy amount consumed for pressurizing the gas to be supplied into the fuel cell, it is desired to set the number of divisions so that the entire energy efficiency may not be lowered. In FIG. 1 and FIG. 2, the region for forming the unit cell inside passage is divided equally into two or three sections, but it may also be divided into different areas.

Figure 5:
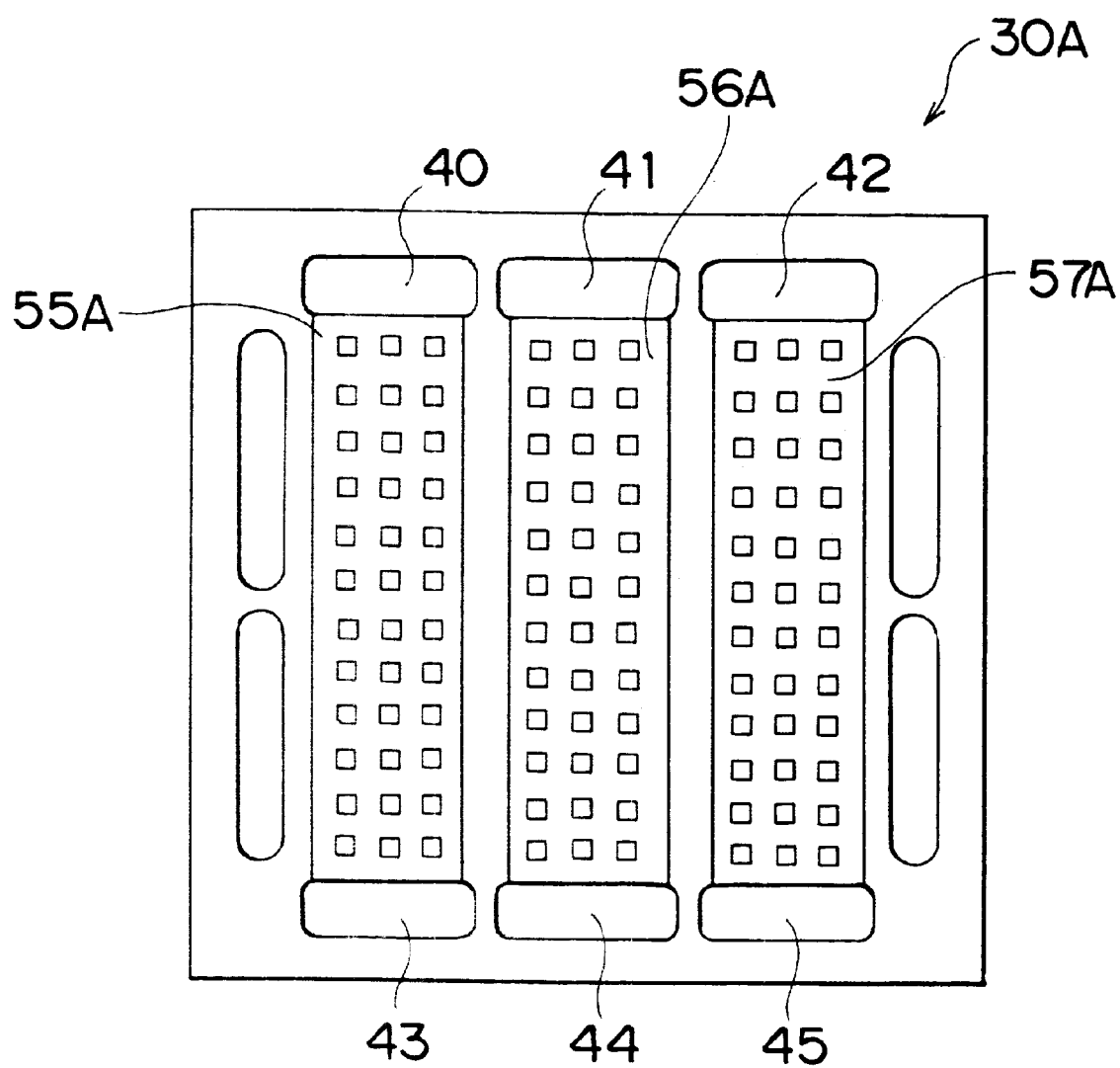
FIG. 5 is a plan view showing a constitution of a separator.

In the separator 30, the ribs 55 to 59 are grooves formed in parallel, but they may also be formed in different shapes. For example, FIG. 5 shows a constitution of one surface of separator 30A which is a modified example of the separator 30. Herein, the separator 30A has a structure common to the separator 30 except for the shape of the structure corresponding to ribs 55 to 57, and common components are identified with same reference numerals. The separator 30A is provided with corrugated parts 55A, 56A, 57A as the structure for connecting the mutually confronting holes. In these corrugated parts 55A to 57A, convex parts of square section are disposed longitudinally and laterally on concave parts formed by communicating the mutually confronting holes. Besides, as the corrugated structure for communicating mutually confronting holes, when the stack structure is formed, unit cell inside gas passages for allowing the gas to pass toward the confronting holes from the specified holes may be formed between adjacent gas diffusion layers.

Figure 11:
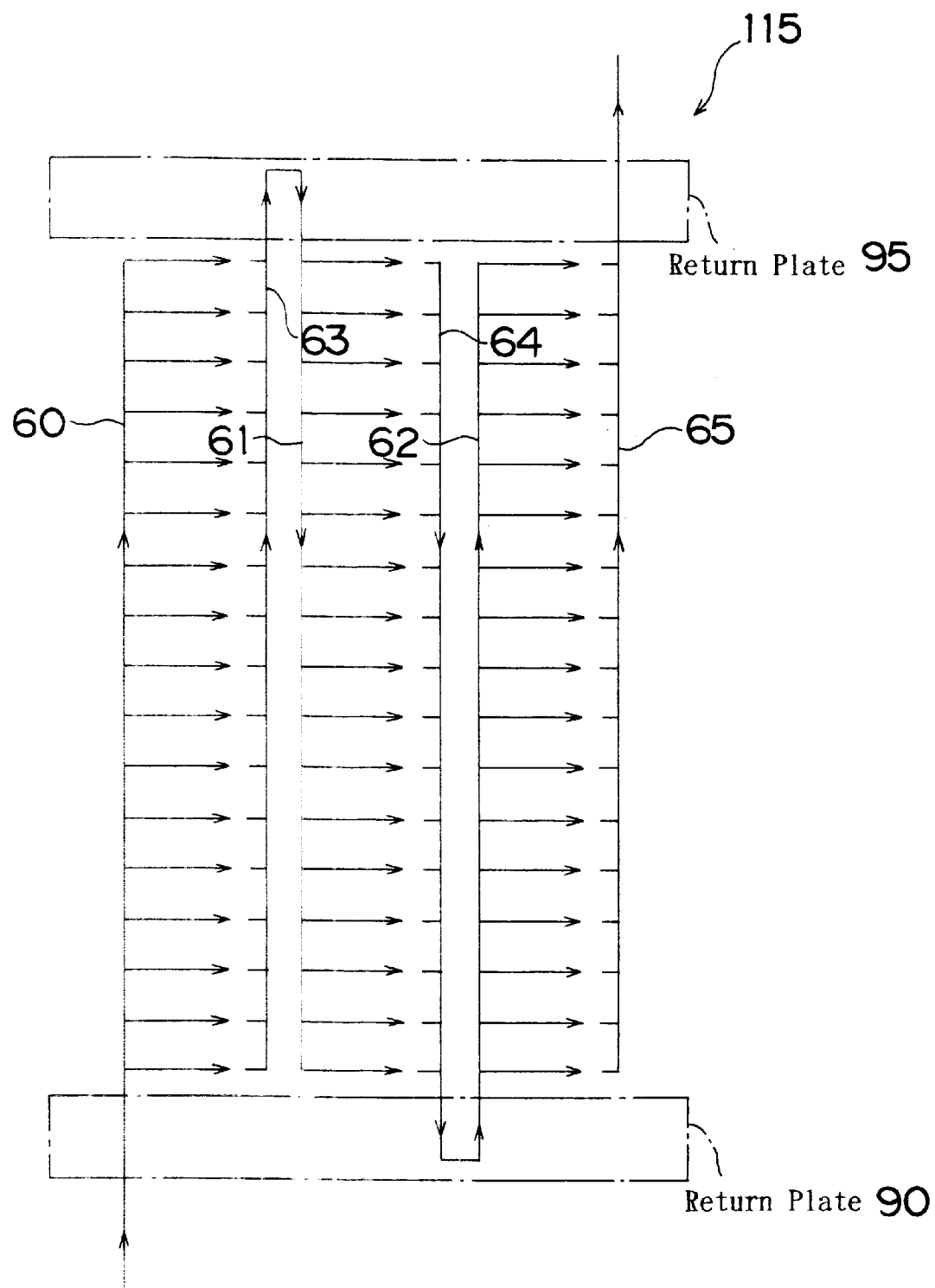
FIG. 11 is a plane explanatory diagram of constitution of a fuel cell so that the gas flow may be same when passing through an oxidizing gas feed manifold and a corresponding oxidizing gas exhaust manifold.

In the embodiment, as shown in FIG. 6 to FIG. 8, between the specified oxide (fuel) gas feed manifold and the corresponding oxide (fuel) gas exhaust manifold, the gas flow directions passing inside are mutually opposite, but the flow direction may be designed to be same in all manifolds. Such constitution is shown below. FIG. 11 is a plane explanatory diagram showing flow of oxidizing gas when a stack structure 115 is formed, by using the separator 30, so that the flow of gas passing inside may be identical in the oxide (fuel) gas feed manifold and the corresponding oxide (fuel) gas exhaust manifold.

Figure 12A:
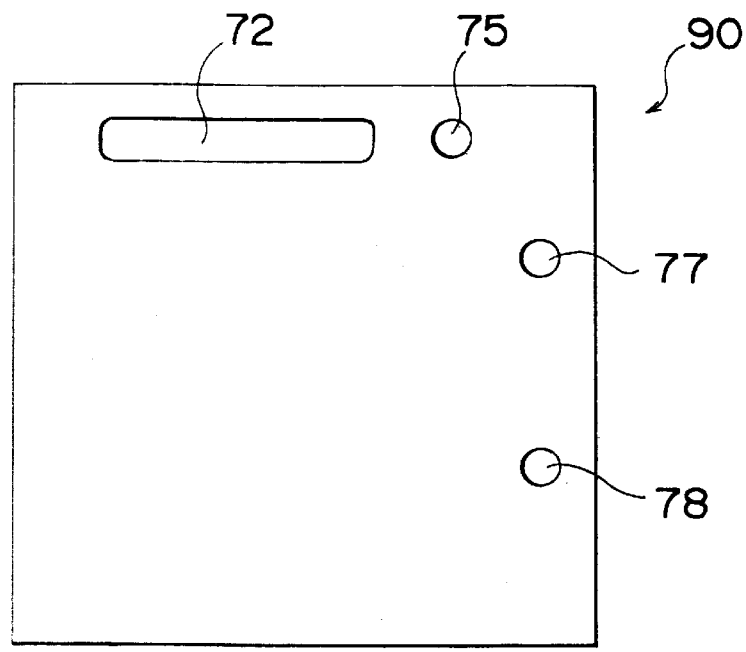
FIG. 12A, 12B and FIG. 13 are explanatory diagrams showing a shape of a return plane.
Figure 12B:
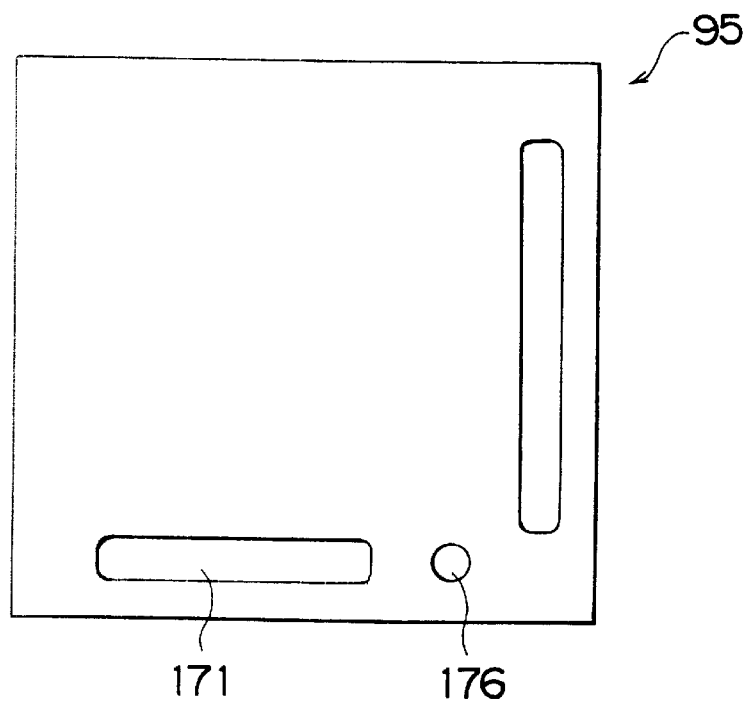

The stack structure 115 is similar to the stack structure 15 in the first embodiment except for the return plate, and common members are identified with same reference numerals, and detailed description is omitted. In the stack structure 115, a return plate 90 is disposed at one end, and a return plate 95 at other end. Plan views of these return plates 90,95 are shown in FIG. 12A and FIG. 12B. FIG. 12A shows the return plate 90, and FIG. 12B shows the return plate 95.

The oxidizing gas supplied from the oxidizing gas supply device provided outside the fuel cell is introduced into the stack structure 115 through a hole 75 provided in the return plate 90. This oxidizing gas passes through an oxidizing gas feed manifold 60 formed by the hole 40 in the separator 30, and is distributed into individual unit cell inside oxidizing gas passages formed by the ribs 55 of the separator 30. The oxidizing gas discharged from the unit cell inside oxidizing gas passages is merged in an oxidizing gas exhaust manifold 63 formed by the hole 43, and flows in the same direction as the oxidizing gas feed manifold 60, and reaches the return plate 95.

The return plate 95 has a recess 171 for connecting the end of the oxidizing gas exhaust manifold 63 and the end of the oxidizing gas feed manifold 61 formed by the hole 44, and the oxidizing gas is fed into the oxidizing gas feed manifold 61. This oxidizing gas passes through the oxidizing gas feed manifold 61 toward the return plate 90, and is distributed into the individual unit cell inside oxidizing gas passages formed by the ribs 56 of each separator 30. The oxidizing gas discharged from the unit cell inside oxidizing gas passages is merged in an oxidizing gas exhaust manifold 64 formed by the hole 41, and flows in the same direction as the oxidizing gas feed manifold 61, and reaches the return plate 90.

The return plate 90 has a recess 72 for connecting the end of the oxidizing gas exhaust manifold 64 and the end of the oxidizing gas feed manifold 62 formed by the hole 42, and the oxidizing gas is fed into the oxidizing gas feed manifold 62. This oxidizing gas passes through the oxidizing gas feed manifold 62 toward the return plate 95, and is distributed into the individual unit cell inside oxidizing gas passages formed by the ribs 57 of each separator 30. The oxidizing gas discharged from the unit cell inside oxidizing gas passages is merged in an oxidizing gas exhaust manifold 65 formed by the hole 45, and flows in the same direction as the oxidizing gas feed manifold 62, and reaches the return plate 95. In the return plate 95, at the position corresponding to the hole 45 of the separator 30, a hole 176 is provided to connect to an outside oxidizing gas discharge side, and the oxidizing gas is discharged from this hole 176.

Thus, if the gas flow direction is designed to be the same in the oxidizing gas feed manifold and the corresponding oxidizing gas exhaust manifold, the same effects as in the first embodiment are obtained. In the foregoing embodiment, the flow direction of the oxidizing gas in the unit cell inside gas passage is alternately changed over between the downward direction and upward direction, but it is also preferred to compose to flow always in the downward direction. Such constitution is shown below as a second embodiment.

Figure 13:
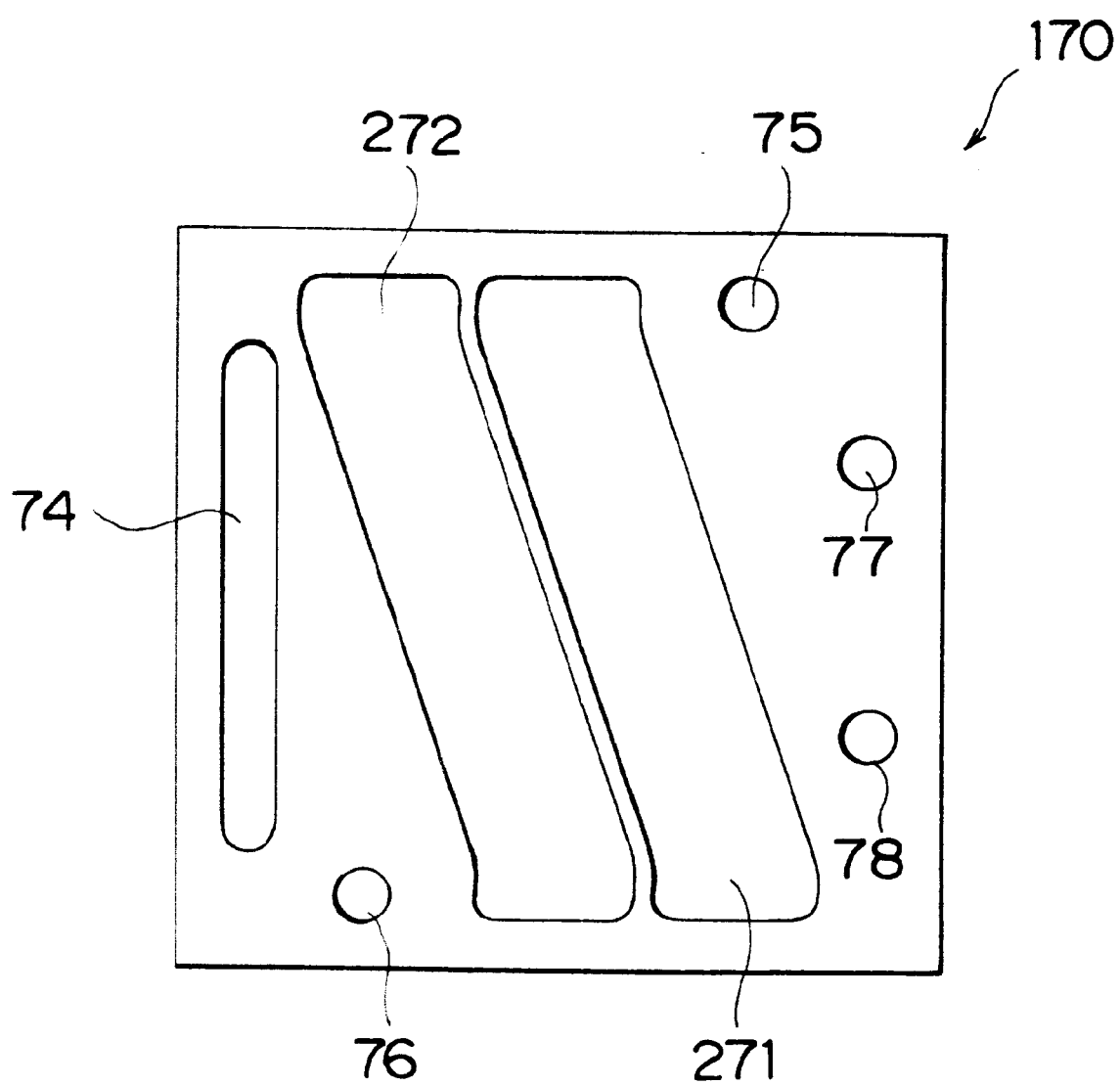

The fuel cell of the second embodiment is composed by using the same separator 30 as in the foregoing embodiment, and a return plate 170 is disposed at one end of the return plate 170. In this stack structure 15, like the one in the first embodiment, the direction is opposite when the oxidizing gas passes between the oxidizing gas feed manifold and the corresponding oxidizing gas exhaust manifold. FIG. 13 is an explanatory diagram showing the return plate 170 as seen from the surface contacting with the laminated unit cells. Herein, the members common with the return plate 70 in the first embodiment are designated as the same reference numerals.

The fuel cell in the second embodiment, like the first embodiment, receives supply of oxidizing gas from the oxidizing gas feed device through the hole 75 in the return plate 170. This oxidizing gas is supplied from the oxidizing gas feed manifold formed by the hole 40 in the separator 30, and is distributed into the individual unit cell inside oxidizing gas passages formed by the ribs 55, and is merged in an oxidizing gas exhaust manifold formed by the hole 43 in the separator 30, and returns to the return plate 170. The return plate 170 has a recess 271 to communicate between the hole 43 and hole 41 of the separator 30, and the oxidizing gas is led into an oxidizing gas feed manifold formed by the hole 41 in the separator 30.

This oxidizing gas is supplied from the oxidizing gas feed manifold formed by the hole 41, and is distributed into the individual unit cell inside oxidizing gas passages formed by the ribs 56, and is merged in an oxidizing gas exhaust manifold formed by the hole 44 in the separator 30, and returns to the return plate 170. The return plate 170 has a recess 272 to communicate between the hole 44 and hole 42 of the separator 30, and the oxidizing gas is introduced into an oxidizing gas feed manifold formed by the hole 42 in the separator 30.

This oxidizing gas is supplied from the oxidizing gas feed manifold formed by the hole 42, and is distributed into the individual unit cell inside oxidizing gas passages formed by the ribs 57, and is merged in an oxidizing gas exhaust manifold formed by the hole 45 in the separator 30, and returns to the return plate 170. The return plate 170 has a hole 76 at a position corresponding to the hole 45, and the oxidizing gas is discharged into an outside oxidizing gas discharge device through this hole 76.

Thus, in the fuel cell of the second embodiment, the manifold formed by the holes 40, 41, 42 formed at the upper surface in the separator 30 disposed therein is the manifold at the surface of feeding oxidizing gas into the unit cell inside oxidizing gas passages, and the manifold formed by the holes 43, 44, 45 formed at the lower surface is the manifold at the surface of discharging oxidizing gas from the unit cell inside oxidizing gas passages. Therefore, in the unit cell inside oxidizing gas passages formed by the ribs 55, 56, 57, the oxidizing gas always flows in the downward direction.

According to thus constituted fuel cell of the second embodiment, since the oxidizing gas always flows downward in the unit cell inside oxidizing gas passages, the water discharge performance in the unit cell inside oxidizing gas passages can be improved. As mentioned above, when the electrochemical reaction proceeds in the fuel cell, water is produced at the cathode side, and the produced water is vaporized into the oxidizing gas and is discharged outside, but the produced water may condense in the unit cell inside oxidizing gas passages. When the condensed water forms drops and stays in the passages, the unit cell inside oxidizing gas passages may be closed and passing of gas may be impeded, but since the flow direction of the gas in the unit cell inside oxidizing gas passages is always in the downward direction, the condensate is easily discharged by gravity, thereby preventing the inconvenience due to stay in the passages.

Further, a drain port for discharging the condensed water to outside may be provided at a specified position of the stack structure, for example, in the return plate or the like. Accordingly, the water not discharged in the vaporized state in the oxidizing gas can be discharged outside of the fuel cell, and impedance of flow of oxidizing gas by condensed water may be prevented.

In the embodiment, the gas feed manifold and gas exhaust manifold formed by the holes of the separator are formed throughout from one end to other end along the laminating direction of the stack structure, and in such manifolds, by forming shielding parts on the way, the flow direction of the gas in the unit cell inside gas passages may be changed. Such constitution is described below as a third embodiment.

Figure 14:
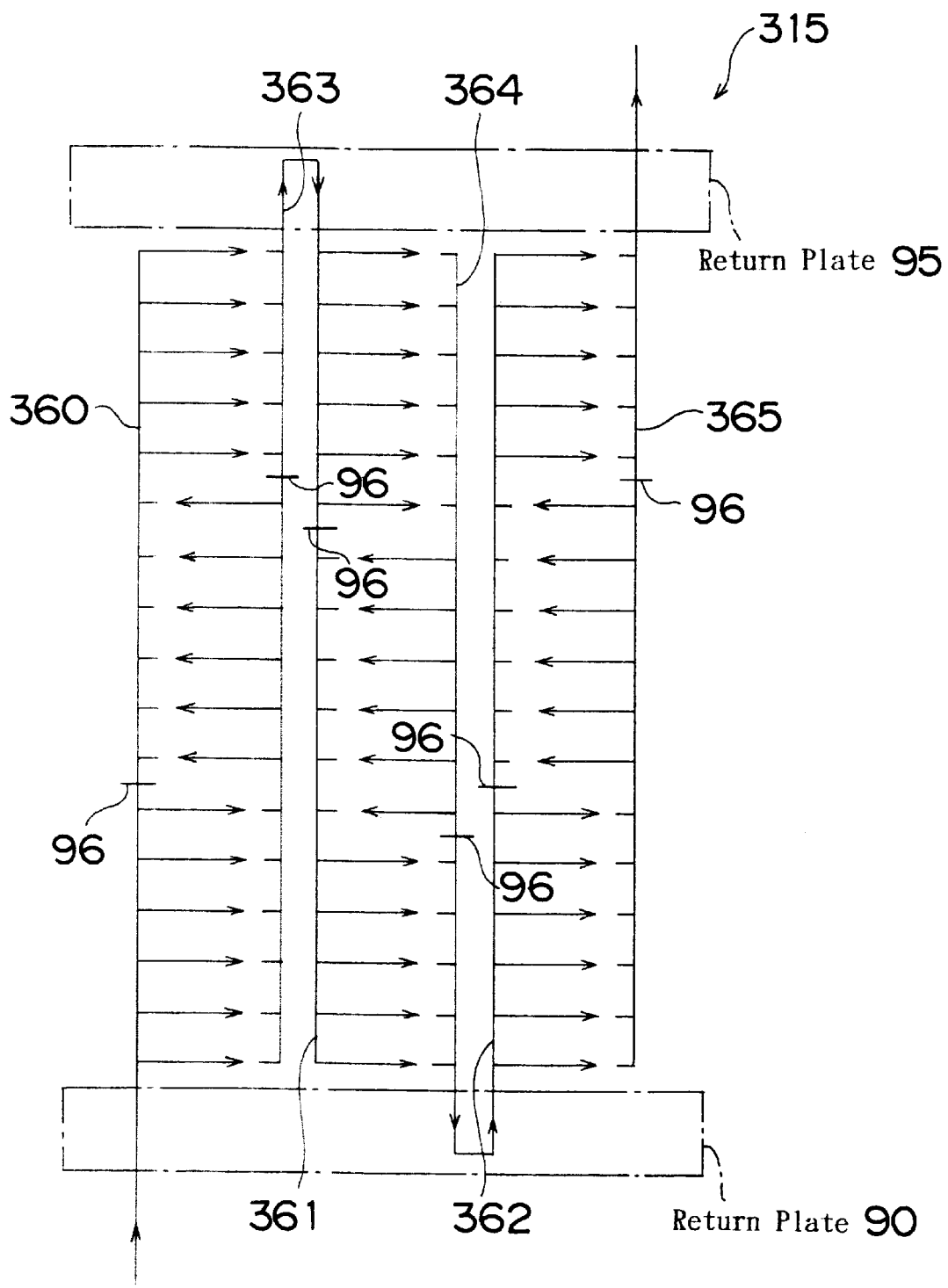
FIG. 14 is a flat explanatory diagram of flow of oxidizing gas in a stack structure.

FIG. 14 is a plane explanatory diagram showing the flow of oxidizing gas in a stack structure 315 for composing the fuel cell of the third embodiment. The stack structure 315 for composing the fuel cell of the third embodiment is similar to the stack structure 115, and common members are designated with the same reference numerals, and detailed description is omitted. The stack structure 315 of the third embodiment is composed by laminating the separators 30 like the foregoing embodiments, except that shielding parts are provided on the way in the oxidizing gas feed manifold and oxidizing gas exhaust manifold. That is, in the specified separators 30 for composing the stack structure 315, specified holes of the holes 40 to 45 are closed, thus shielding the flow of gas passing through the manifolds.

As shown in FIG. 14, the holes 40 to 45 of the separator 30 respectively form manifolds 360, 363, 361, 364, 362 and 365 in the stack structure 315. As mentioned above, in the specified separators 30 for composing the stack structure 315, since the specified holes are closed, shielding parts 96 are formed individually in the manifolds 360, 363, 361, 364, 362, and 365.

Since the manifold 360 is connected to the outside oxidizing gas feed device through a return plate 90, at the return plate 90 from the shielding part 96, the manifold 360 functions as an oxidizing gas feed manifold, and the manifold 363 functions as an oxidizing gas exhaust manifold. When the flow of the gas passing through the manifold 360 is shut off by the shielding part 96, the flow direction of the gas is changed in the manifolds at the downstream surface of this shielding part 96 and in the unit cell inside oxidizing gas passages communicating with these manifolds. That is, the manifold 360 functions as the oxidizing gas exhaust manifold, and the manifold 363 functions as the oxidizing gas feed manifold, and the flow direction of the gas in the unit cell inside oxidizing gas passages formed by the ribs 55 is reverse to the flow direction of oxidizing gas in the unit cell inside oxidizing gas passages (the passages formed by the ribs 55) formed in the unit cells disposed at the upstream surface of the shielding part 96.

Likewise the manifold 363 is provided with the shielding part 96, and the flow direction of the gas is changed in the manifolds 363 at the downstream surface of this shielding part 96 and in the unit cell inside oxidizing gas passages communicating with these manifolds. That is, the manifold 360 functions as the oxidizing gas feed manifold, and the manifold 363 functions as the oxidizing gas exhaust manifold, and the flow direction of the gas in the unit cell inside oxidizing gas passages formed by the ribs 55 returns to the same direction as the flow direction of gas in the unit cell inside oxidizing gas passages (the passages formed by the ribs 55) formed in the unit cells disposed in the region adjacent to the return plate 90.

The shielding parts 96 provided in the manifolds 361, 364, 362, and 365 also function in the similar way. That is, when the flow of the oxidizing gas passing through the manifold functioning as the oxidizing gas feed manifold is cut off by the shielding part 96, at the downstream surface of this shielding part 96, the oxidizing gas feed manifold and oxidizing gas exhaust manifold are exchanged, and the flow direction of the oxidizing gas in the unit cell inside oxidizing gas passages formed by the corresponding ribs are inverted.

According to thus constituted fuel cell of the third embodiment, like the foregoing embodiments, in addition to the effect of increasing the gas flow rate in the passage by dividing the unit cell inside gas passage in the same plane, the following effects are obtained. That is, by disposing the shielding part in the manifold functioning as gas feed manifold, the gas flow rate passing through each unit cell inside gas passage is further increased, and the gas utility rate is increased. For example, when feeding oxidizing gas in the manifold formed by the hole 40 of the separator 30, in this embodiment, the oxidizing gas is distributed in the unit cell inside oxidizing gas passages (the passages formed by the ribs 55) formed in the individual unit cells disposed from the end of supply of oxidizing gas to the position of the shielding part, but in the fuel cell not having shielding part in the manifold, the oxidizing gas is distributed into the unit cell inside gas passages (the passages formed by the ribs 55) formed in each one of all unit cells for composing the stack structure. Therefore, by disposing the shielding parts in the manifolds, if the amount of gas supplied from the outside is constant, the amount of gas passing through the unit cell inside gas passages can be further increased, and the above effects are obtained.

As mentioned above, by dividing the stack structure for composing the fuel cell into plural sections and connecting the divided stack structures in series, the flow rate of the gas passing through the unit cell inside gas flow passages may be increased, but in the fuel cell of the third embodiment, by a simple constitution of forming shielding parts in the gas manifolds (closing specified holes in specified separators), the gas flow rate passing through the unit cell inside gas passages can be increased, and it is not necessary to complicate the gas piping for increasing the gas flow rate. In such a fuel cell, by adjusting the position and number of shielding parts to be disposed in the gas manifolds, the degree of increasing the gas amount passing through each unit cell inside gas passage can be adjusted. Besides, as in the embodiment, by disposing a shielding part on the way of a manifold, the passage resistance increases in the gas passage formed in the stack structure. Therefore, by adjusting the number of shielding parts or the position of shielding parts, the passage resistance can be set freely in the entire stack structure. In the embodiment, shielding parts are provided in the manifolds through which the oxidizing gas passes, or similar shielding parts may be provided in the manifolds through which the fuel gas passes.

In the embodiment, the unit cell inside gas passages are formed to communicate with the manifolds provided at confronting positions, and the gas passing through the unit cell inside gas passages flows in a specific direction, but a different constitution may be composed. A fuel cell of such constitution is shown below as a fourth embodiment.

Figure 15:
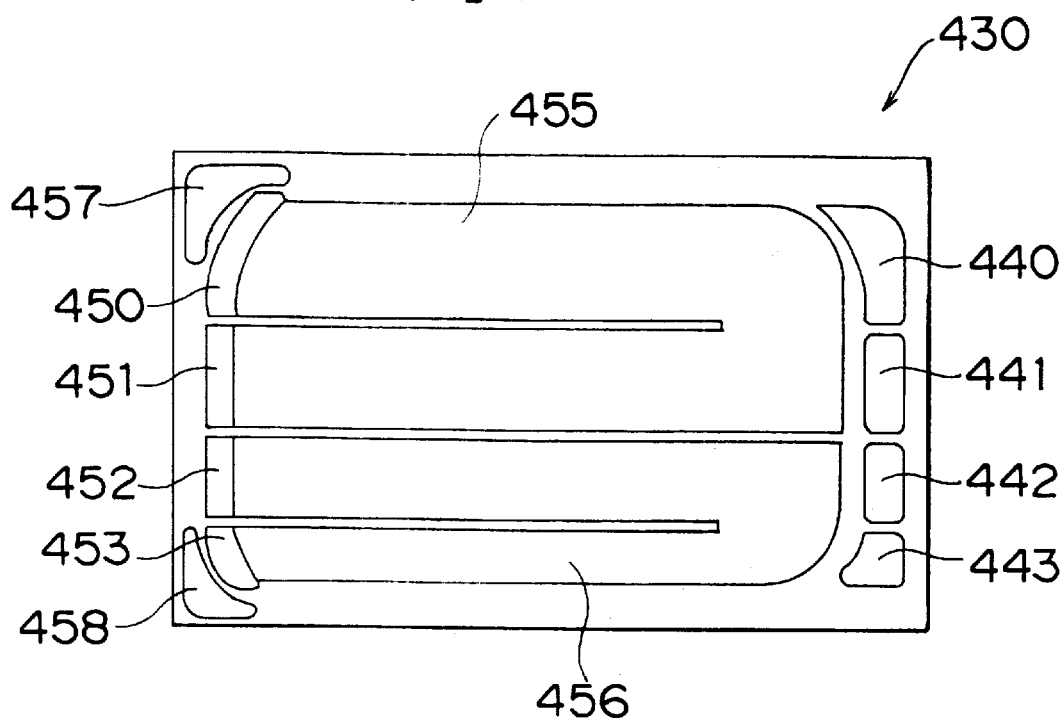
FIG. 15 is a plan view showing a constitution of a separator.
Figure 16:
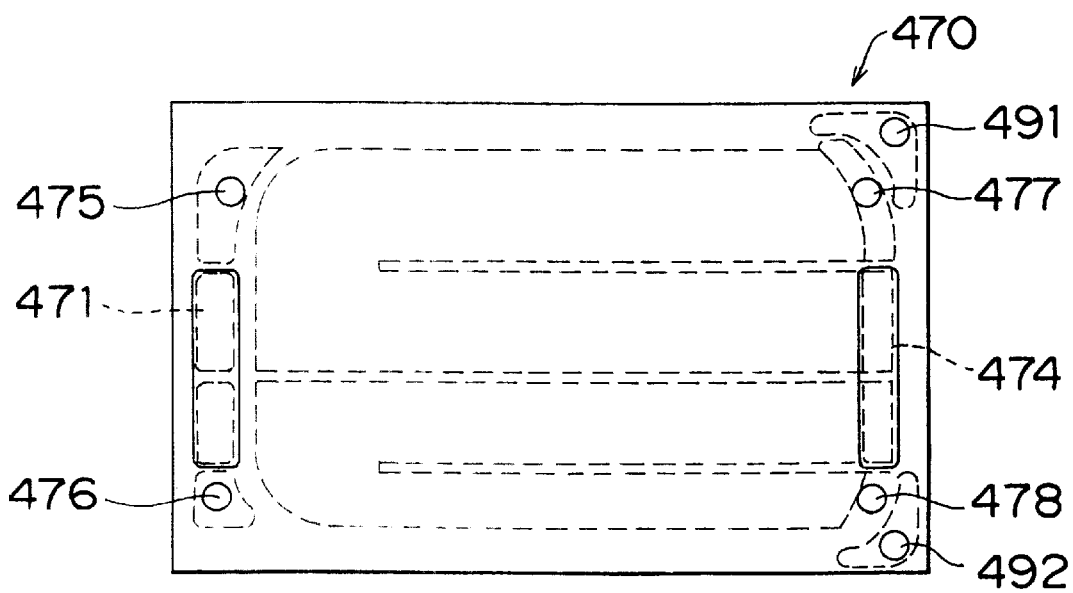
FIG. 16 is an explanatory diagram of a shape of a return plate.

FIG. 15 is a plan view showing a constitution of a separator 430 for composing the fuel cell of the fourth embodiment, and FIG. 16 is a plan view showing a constitution of a return plate 470 of the fuel cell of the fourth embodiment. The stack structure for composing the fuel cell of the fourth embodiment is similar to the stack structure 15 of the first embodiment except that it has a separator 430 instead of the separator 30, and has a return plate 470 instead of the return plate 70, and hence detailed description of common components is omitted herein.

The separator 430 has holes 440 to 443, 450 to 453 on its periphery. Herein, the holes 440 to 443 are disposed sequentially and adjacently along a specified surface of the separator 430, and the holes 450 to 453 are disposed sequentially and adjacently along a surface confronting the surface of the holes 440 to 443. On one surface of the separator 430, recesses 455 and 456 are formed. The recesses 455 and 456 are formed in mutually parallel U-forms in the lateral direction. The recess 455 communicates with the hole 450 and hole 451 at both its ends. The recess 456 communicates with the hole 452 and hole 453 at both its ends. In the separator 430, moreover, at the surface opposite the surface shown in FIG. 15, two recesses similar to the recesses 455, 456 are formed in U-forms reverse that of the recesses 455, 456 (not shown). One of the two recesses formed at the back surface communicates at both its ends with the holes 440 and 441, and the other recess communicates at both its ends with the holes 442 and 443.

In the fuel cell composed by using such a separator 430, the recesses 455 and 456 form unit cell inside fuel gas passages together with the adjacent anode 32, and the two recesses formed on the back surface form the unit cell inside oxidizing gas passages together with the adjacent cathode. The holes 450 and 452 form fuel gas feed manifolds for distributing fuel gas into unit cell inside fuel gas passages, in the stack structure formed by laminating the separators 430, and the holes 451 and 453 form fuel gas exhaust manifolds for collecting the fuel gas discharged from the unit cell inside fuel gas passages, similarly in the stack structure. Likewise the holes 440 and 442 form oxidizing gas feed manifolds for distributing oxidizing gas into unit cell inside fuel gas passages, in the stack structure, and the holes 441 and 443 form oxidizing gas exhaust manifolds for collecting the oxidizing gas discharged from the unit cell inside oxidizing gas passages, similarly in the stack structure.

Moreover, in the peripheral area of the separator 430, near the hole 450 and hole 453, the hole 457 and hole 458 are formed. These holes 457, 458 form cooling water manifolds in the stack structure formed by laminating the separators 430. The cooling water supplied from outside of the fuel cell is distributed into the cooling water passages between unit cells through cooling water manifolds formed by the hole 457, and the cooling water discharged from the cooling water passage between unit cells is guided outside of the fuel cell through the cooling water manifolds formed by the hole 458.

In FIG. 15, the recess of the separator 430 is shown to have a flat concave surface, but each recess of the actual separator 430 has a plurality of specified convex parts projecting from the concave surface, such as the corrugated parts of the separator 30A shown in FIG. 5. By such convex parts, the gas passing through the unit cell inside gas passages formed by concave parts is agitated, and as the convex parts contact with the gas diffusion electrode adjacent to the separator 430, a sufficient conductivity is held with the gas diffusion electrode.

The return plate 470 has holes 475 to 478, holes 491, 492, and recesses 471, 474. This return plate 470 is disposed at one end of the stack structure, like the return plate 70 in the stack structure 15 of the first embodiment showing the plan view of flow of gas in FIG. 7 and FIG. 8. When forming the stack structure by using the return plate 470, the return plate 470 is disposed so that the surface shown in FIG. 16 may contact with the structure laminating the unit cells. In FIG. 16, to clarify the configuration of the holes 475 to 478, holes 491, 492, and recesses 471, 474 of this return plate 470, and the holes 440 to 443, 450 to 453, 457, 458, and recesses 455, 456 of the separator 430 (the configuration of holes and recesses in the stack structure laminating the members including the return plate 470 and separator 430), the positions of the holes and recesses of the separator 430 are indicated by dotted lines on the return plate 470.

In the formed stack structure, the hole 477 communicates with the hole 450 in the separator 480, the hole 478 with the hole 453 in the adjacent separator 430, the hole 475 with the hole 440 in the separator 430, the hole 476 with the hole 443 in the separator 430, the hole 491 with the hole 457 in the separator 430, and the hole 492 with the hole 458 in the separator 430, respectively. The recess 474 is formed by covering the region of forming the holes 451, 452 in the separator 430, and the gas manifolds formed by the holed 451, 452 in the stack structure communicate with each other at the end portion of the stack structure. Similarly, the recess 471 is formed by covering the region of forming the holes 441, 442 in the separator 430, and the gas manifolds formed by the holes 441, 442 in the stack structure communicate with each other at the end portion of the stack structure.

In the fuel cell having the separator 430 and return plate 470, the flow of gas is explained below. The stack structure for composing the fuel cell of the embodiment, similar to the stack structure 15 shown in FIG. 3, includes the current collectors, insulating plates and end plates. In these current collectors, insulating plates and end plates, holes are provided at positions corresponding to the holes of the separator 430, and by connecting the holes of the end plate and the external devices, same as in the foregoing embodiments, the fluid can be supplied in and discharged from the fuel cell. The hole 477 in the return plate 470 is connected to the fuel gas feed device through the holes provided in the current collectors, insulating plates and end plates disposed adjacently to this return plate 470 (holes provided at positions corresponding to the position of the holes 477). The supplied fuel gas is distributed into one of the unit cell inside fuel gas passage (the passage formed by the recess 455) formed in each unit cell, through the fuel gas feed manifold formed by the hole 450 provided in the separator 430. The fuel gas passing through the unit cell inside fuel gas passage is collected in the fuel gas exhaust manifold formed by the hole 451, and is guided into the fuel gas feed manifold formed by the hole 452, by the recess 474 of the return plate 470. Further from this fuel gas feed manifold, the fuel gas is distributed into other unit cell inside fuel gas passage (the passage formed by the recess 456) formed in each unit cell, and the fuel gas passing through this unit cell inside fuel gas passage is collected in the fuel gas exhaust manifold formed by the hole 453. The current collectors, insulating plates, and end plates have holes provided at positions corresponding to the holes 478 of the return plate 470, and the fuel gas collected in the fuel gas exhaust manifolds is discharged to an outside fuel gas discharge device through these holes.

The passage of the oxidizing gas is formed similarly, and oxidizing gas is supplied from the outside into the oxidizing gas feed manifold formed by the hole 440 of the separator 430, and is distributed into one of the unit cell inside oxidizing gas passages formed in each unit cell. The oxidizing gas passing through these unit cell inside oxidizing gas passages is collected in the oxidizing gas exhaust manifold formed by the hole 441, and is guided into the oxidizing gas feed manifold formed by the hole 442, through the recess 471 provided in the return plate 470. The oxidizing gas distributed from this oxidizing gas feed manifold into other unit cell inside oxidizing gas feed passage formed in each cell is collected in the oxidizing gas exhaust manifold formed by the hole 443 and is guided outside.

In the current collectors, insulating plates, and end plates, holes are also provided at positions corresponding to the holes 491, 492 of the return plate 470. Among them, to the hole corresponding to the hole 491, a specified cooling water feed device is connected, and the cooling water is supplied into the cooling water manifold formed by the hole 457 provided in the separator 430, and the supplied cooling water is distributed from this cooling water manifold into cooling water passage between the unit cells mentioned above. The cooling water passing through the cooling water passage between the unit cells is collected in the cooling water manifold formed by the hole 458, and is discharge into a specified cooling water discharge device through the hole corresponding to the hole 492.

According to such a fuel cell of the fourth embodiment, by dividing the unit cell inside gas passage into a plurality on the same surface and decreasing the sectional area of the unit cell inside gas passage, the flow rate and flow velocity of the gas in the unit cell inside passage are raised, and the utility rate of the gas in the fuel gas is improved, and in addition to these effects like the foregoing embodiments, the following effects are further obtained. That is, by forming each one of the plurality of unit cell inside gas passages divided on the same surface into U-forms, the rate of the area of the regions contributing to electrochemical reaction (hereinafter called current collectors) is increased in the entire sectional area of the stack structure, so that the entire fuel cell can be reduced in size.

In the fuel cell having unit cell inside gas passages divided linearly as in the first embodiment, if the entire current collectors are divided parallel into four sections, or in the case of the fuel cell composed by using the separator 430 for forming U-form unit cell inside passages as in this embodiment, the effect of decreasing the sectional area of passages is similarly obtained, and four holes (for forming manifolds) have to be formed along a specified surface of the separator, but in the fuel cell of this embodiment, it is not necessary to form holes in the region along a surface opposite to the one side, and this region can be utilized as current collectors. In other words, in the separator for forming divided linear unit cell inside gas passages, one region out of the regions for forming the holes (the region close to the region for forming the surface opposite to the one side) is not necessary. Besides, part of the holes for forming the manifolds is not needed, and the seal structure provided near the hole (the structure for keeping airtight in the manifold) is not necessary, and the structure of the separator and seal can be simplified. Therefore, the fuel cell may be smaller in size, that is, the sectional area of the fuel cell may be smaller. As a result, the constituent members such as separator can be reduced in side, and the material cost may be saved. In addition, since the fuel cell is reduced in size, when mounting the fuel cell in an electric vehicle as the vehicle power source, the degree of freedom of design of the vehicle is enhanced.

In particular, in the fuel cell of the embodiment, the divided unit cell inside gas passages are formed in mutually opposite U-forms at the fuel gas surface and the oxidizing gas side. In such a constitution, when the holes are provided in the separator for forming manifolds for feeding and discharging one gas along a specified side, the holes for feeding and discharging other gas are formed along the surface opposite to the one side, and holes for forming manifolds are not needed near the other two sides. Therefore, in the shape of the fuel cell, the specified direction may be shortened. When the recesses for forming the unit cell inside gas passages are formed in lateral U-forms as in the separator 430 shown in FIG. 15, the fuel cell may be shortened in length in the longitudinal direction. When the shape of the fuel cell is shorter in the longitudinal direction, it is particularly advantageous for disposing the fuel cells beneath the seat when mounting the fuel cells in an electric vehicle as power source for vehicle.

In the separator for composing such a fuel cell, as mentioned above, manifolds for feeding and discharging cooling water are provided aside from the manifolds for feeding and discharging gas, but since the cooling water manifolds can be provided at positions remote from the current collectors farther than the gas manifolds, by disposing the cooling water manifolds, the effect of shortening the length of the fuel cell in the longitudinal direction is not sacrificed. That is, in order to supply the gas directly contributing to the electrochemical reaction into the unit cells at a sufficient efficiency, the gas manifolds are preferred to be disposed in a region close to the current collectors, but the manifolds of cooling water not directly contributing to the electrochemical reaction may be disposed in a region remote from the current collectors, and therefore the cooling water manifolds may be disposed further from the current collectors than the gas manifolds, and it is not required to extend the length of the fuel cell in the longitudinal direction. In particular, in the elliptical sectional shape of the current collectors by cutting off corners, as in the fuel cell composed by using the separator 430 shown in FIG. 15, the extension of the fuel cell in the lateral direction can be suppressed. That is, when the gas manifolds are provided along the elliptical current collectors, if the sectional shape of the stack structure is square, a dead space is caused in the corners, and the cooling water manifolds may be disposed in this space, and the extension of the fuel cell in the lateral direction is suppressed while maintaining the shortness of the fuel cell in the longitudinal direction, so that the entire fuel cell can be reduced in size. Incidentally, if the sectional shape of the entire current collectors is square, instead of elliptical, and the gas passages are formed in U-forms, the gas flow tends to be insufficient at the corners in the bottom of the U-forms, and electrochemical reaction may not proceed sufficiently. Therefore, if the current collectors are formed in an elliptical section as mentioned above and the area of the current collectors corresponding to the corners is decreased, there is no practical effect on the cell performance.

In the separator 430 for composing the fuel cell of the embodiment, the downstream surface region of the recess 455 (the linear region closer to the hole 451) is formed in a narrower width as compared with the upstream surface region (the linear region closer to the hole 450), and similarly the downstream surface region of the recess 456 (the linear region closer to the hole 453) is formed in a narrower width as compared with the upstream surface region (the linear region closer to the hole 452) (see FIG. 15). In the unit cell inside gas passages of the fuel cell having such separator 430, the passage sectional area is smaller at the downstream side. In the fuel cell, as the electrode active material in the supplied gas is consumed in the electrochemical reaction, the gas flow rate and the concentration of electrode active material in the gas are decreased. Therefore, as reducing the passage sectional area at the downstream side, compensating for decrease of gas flow rate, a uniform reaction is expected in the entire fuel cell, and a sufficient voltage may be maintained.

Furthermore, in the fuel cell of the embodiment, since the unit cell inside gas passages are formed in U-forms, as compared with the linear shape of the unit cell inside gas passages, the gas utility rate can be further enhanced. That is, when the gas is guided by the shape of the passage and the flow direction is changed to reverse direction, a turbulent flow is likely to occur in the region in the bottom of the U-form, and the gas is agitated more, so that the gas utility rate is improved.

In the fuel cell of the embodiment, since the shape of the unit cell inside gas passages is lateral U-form at both fuel gas surface and oxidizing gas side, and the gas is passed downward, the drain mechanism of the water produced in the gas flow passages can be simplified. For example, as in the first embodiment, when the unit cell inside oxidizing gas passages are formed in the vertical direction, the produced water is guided by the unit cell inside oxidizing gas passages and falls down, and collected in three manifolds positioned downward (oxidizing gas exhaust manifolds 63, 65, and oxidizing gas feed manifold 61). In such a fuel cell, it was required to remove the water by furnishing the manifolds with drain valves or the like. In the fuel cell of the embodiment, since all unit cell inside gas passages are in lateral U-forms, the produced water is gradually guided to the downstream surface in the unit cell inside gas passages by the pressure and gravity of flow of gas. Thus, the produced water is finally guided into the manifold formed by the hole 453 or hole 443 of the separator 430, and the drain mechanism may be provided only in the manifold located at the lowest position. Or if the produced water guided into these manifolds is sufficiently discharged outside of the fuel cell by the gas pressure, drain mechanism is not needed in the fuel cell, and the constitution may further be simplified.

In the separator 430 for composing the fuel cell of the embodiment, U-form recesses for forming unit cell inside gas passages are formed at two positions each on each side, but the unit cell inside gas passage may be divided into two or more sections (the number of recesses formed on one side). By increasing the number of divisions, the passage sectional area is smaller and the gas flow velocity is faster, and moreover by considering the degree of increase in the energy required for pressurizing the gas when feeding the gas by increasing the number of divisions and increasing the passage resistance, the number of divisions may be properly determined. In the separator 430, the peripheral regions for forming the manifolds, and the region for forming the current collectors may be formed either integrally or separately.

In the fuel cell of the present embodiment and also in the fuel cell of the first embodiment, the gas passing through the gas exhaust manifolds is guided into the gas feed manifolds provided adjacently to the gas exhaust manifolds in the return plate. Accordingly, the recesses provided in the return plate for guiding the gas may be smaller (shorter), and the volume of the concave parts may be suppressed. While passing through the recesses, the gas does not contribute to power generation, and by suppressing the volume of gas not contributing to reaction, while the size of fuel cell and feed gas volume are constant, the power generation efficiency may be sufficiently maintained.

As mentioned above, when the gas passing through the specified gas manifold is guided into the adjacent gas manifold by the recesses of the return plate, the gas seal structure near the recesses of the return plate may be simplified. That is, near the region forming inlet and outlet of the same gas adjacently, strict air tightness is not required as in the case of adjacent inlets and outlets of different gases (oxygen and hydrogen).

In the aforementioned embodiment, in a single stack structure, the gas passages are divided parallel in the laminating direction of the stack structure, and the gas supplied into the stack structure is designed to pass sequentially these divided passages, but the fuel cell may be composed by connecting a plurality of such stack structures, a greater electric power may be obtained. A constitution of a fuel cell composed of plural stack structures is explained below as a fifth embodiment.

Figure 17:
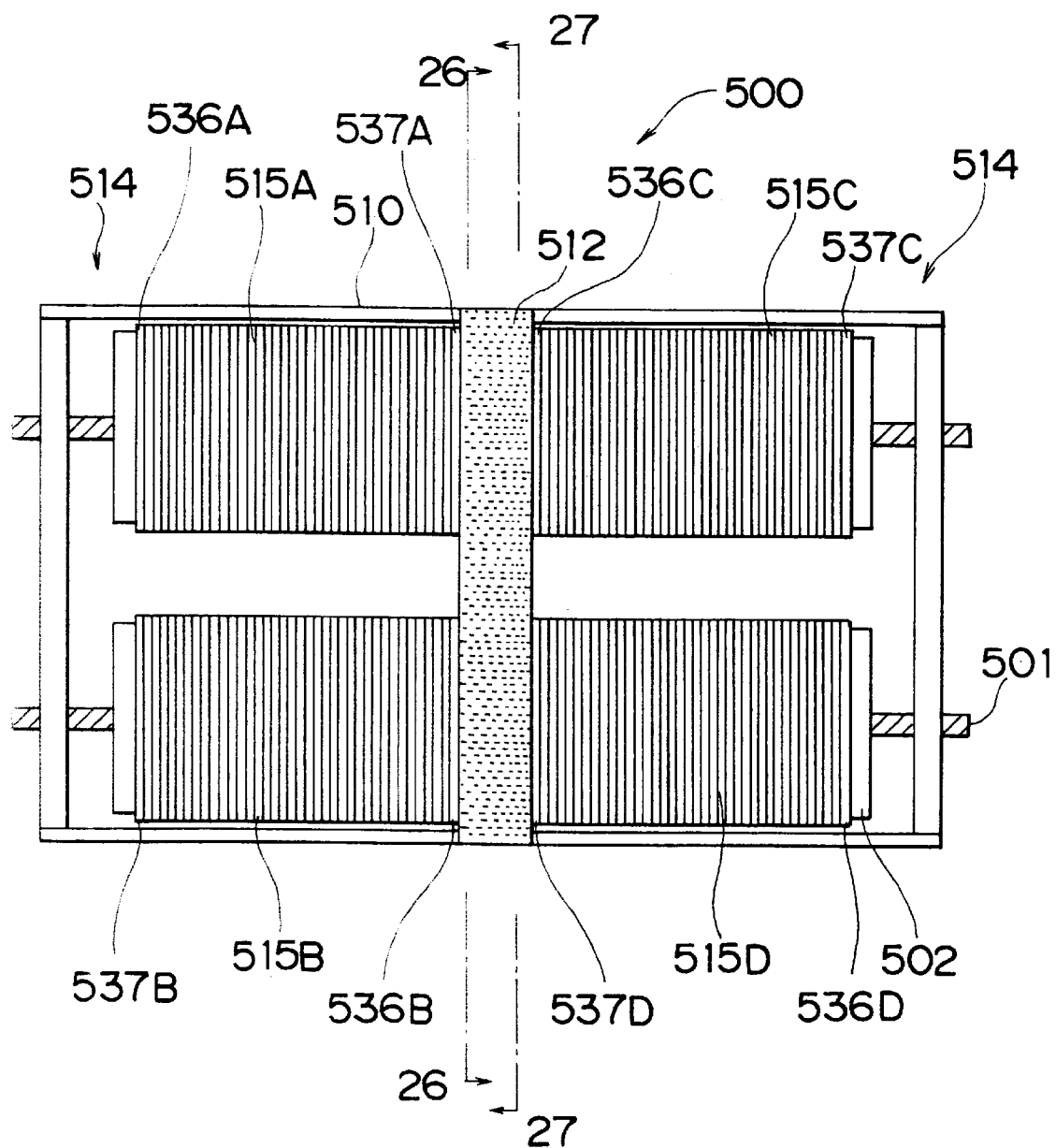
FIG. 17 is an explanatory diagram showing a constitution of a fuel cell having four stack structures.

FIG. 17 is an explanatory diagram showing the constitution of a fuel cell 500 in the fifth embodiment having four stack structures, and FIG. 18 is a plan view showing a constitution of a separator 530 provided in each one of the stack structures of the fuel cell 500. The fuel cell 500 has four stack structures 515A, 515B, 515C, 515D, and these stack structures are mutually connected through a feed and discharge box 512, and these structures are contained in a case 510. The case 510 covers all of the four stack structures, but FIG. 17 is a partially cut-out view showing the inside of the case 510 by removing the largest surface of the case 510. Each stack structure of the fuel cell 500 has a structure common to the foregoing embodiments, except the structure of its separator and the flow of gas in the inside, and detailed description of individual stack structures is omitted herein.

The feed and discharge box 512 is a box member disposed in the center of the fuel cell 500, and it is made of a material having a specified rigidity, for example, aluminum. At one surface of this feed and discharge box 512, the stack structures 515A, 515B are disposed, and at other side, the stack structures 515C, 515D are disposed. The feed and discharge box 512 are connected to external fuel gas feed device, fuel gas discharge device, oxidizing gas feed device, and oxidizing gas discharge device. Inside the feed and discharge box 512, passages of specified shape are formed, and the fuel gas and oxidizing gas supplied from outside are distributed into the stack structures of the fuel cell 500 through these passages, and the gas discharged through the stack structure is also guided outside, or the gas is exchanged between stack structures.

The fuel cell 500 has pressure holding mechanisms 514 provided at its both ends, and by the pressure holding mechanisms 514, pressing force is applied to each stack structure from the end surface toward the feed and discharge box 512, so that each stack structure is held in the case 510. The pressure holding mechanism 514 in this embodiment has a pressurizing shaft 501, and this pressurizing shaft 501 is screwed into the specified hole (not shown) provided at the end of the case 510, and by screwing into the hole, the pressing force for each stack structure is held. At one end of each stack structure (the end surface of the case 510), a pressure plate 502 is provided. The pressing force applied from the pressurizing shaft 501 is transmitted to the stack structure through this pressure plate 502, and the entire stack structure in the case is pressurized (see FIG. 17).

Figure 18A:
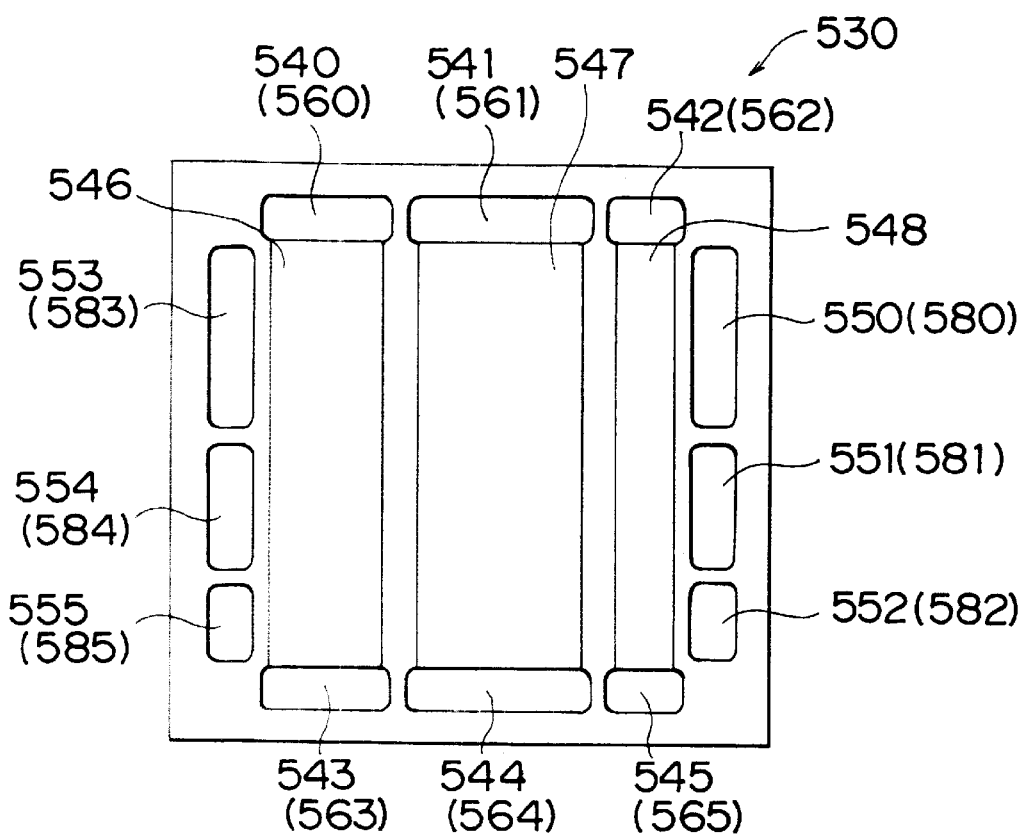
FIG. 18A and FIG. 18B are plan views showing a constitution of a separator.
Figure 18B:
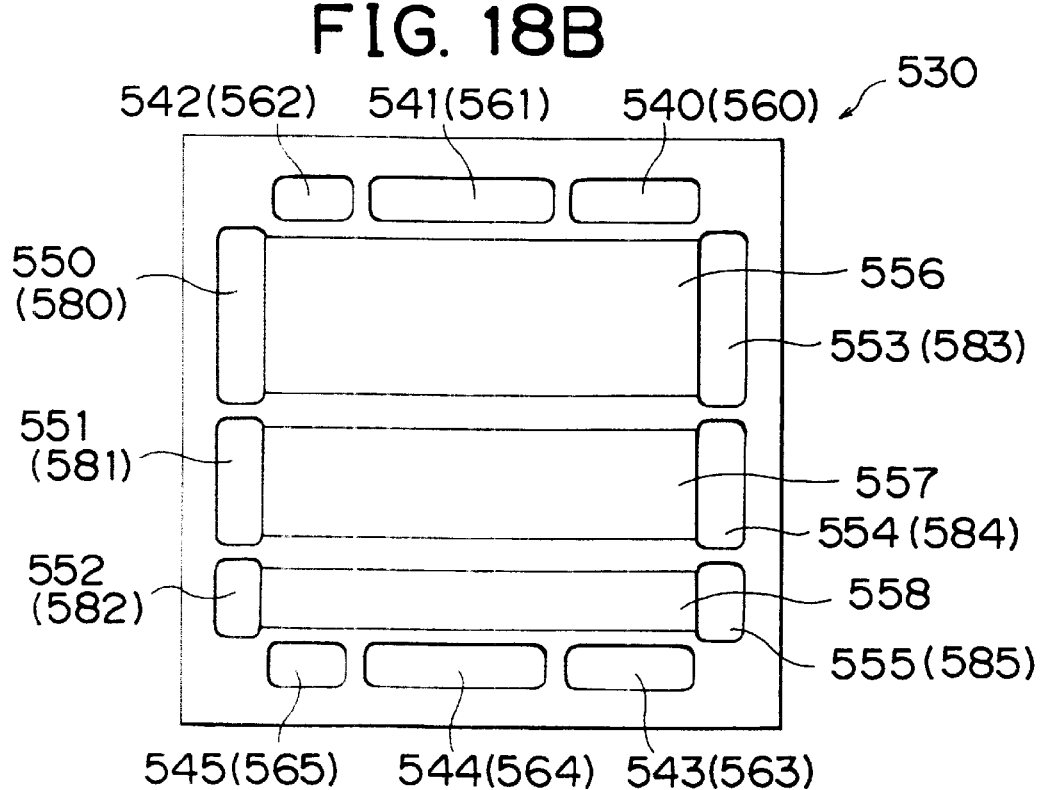
Figure 19:
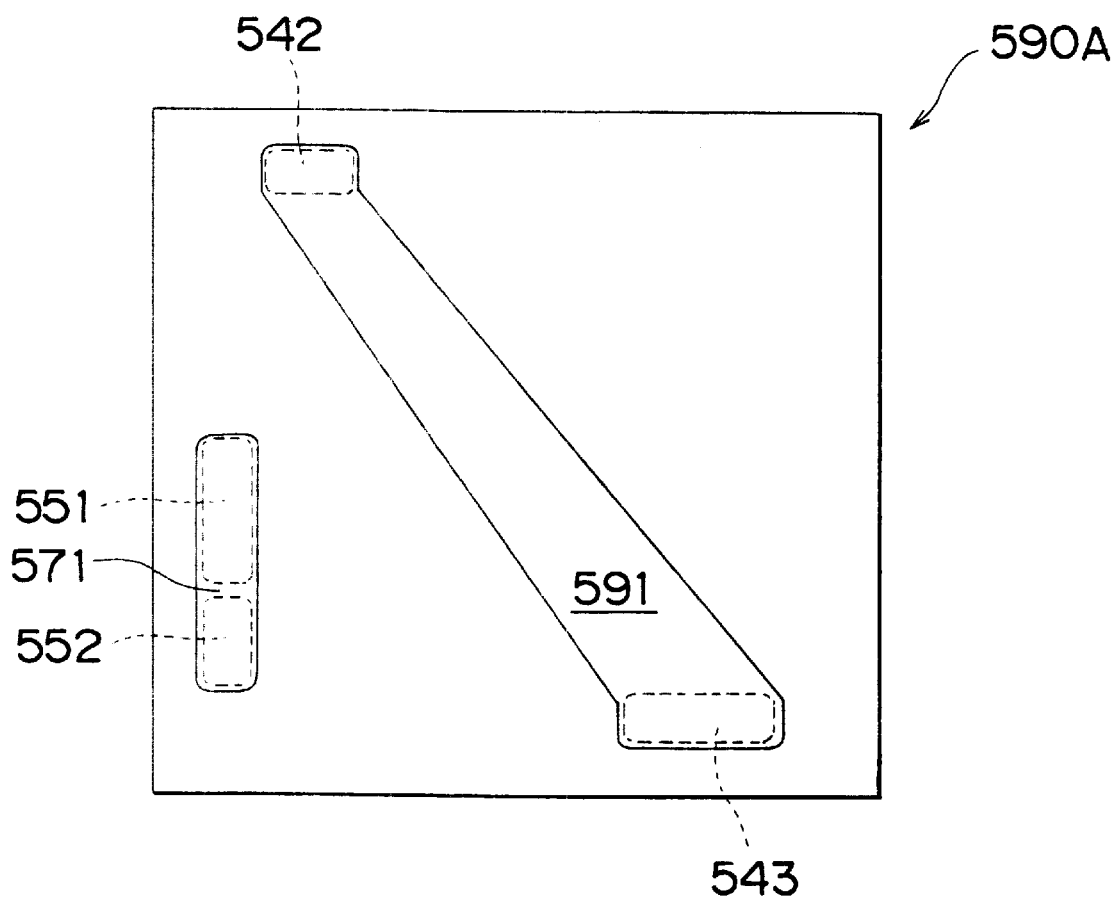
FIG. 19 to FIG. 22 are plan views showing a constitution of a return plate.
Figure 20:
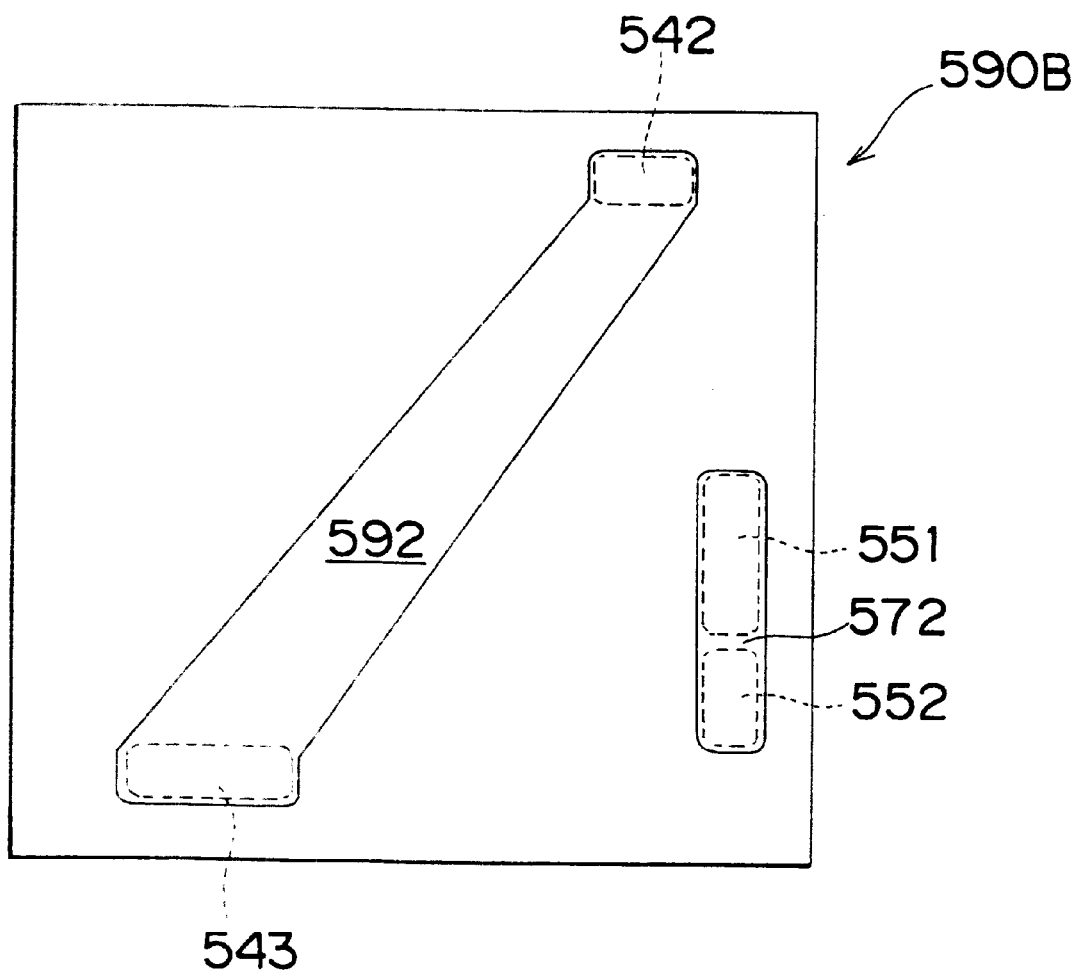
Figure 21:
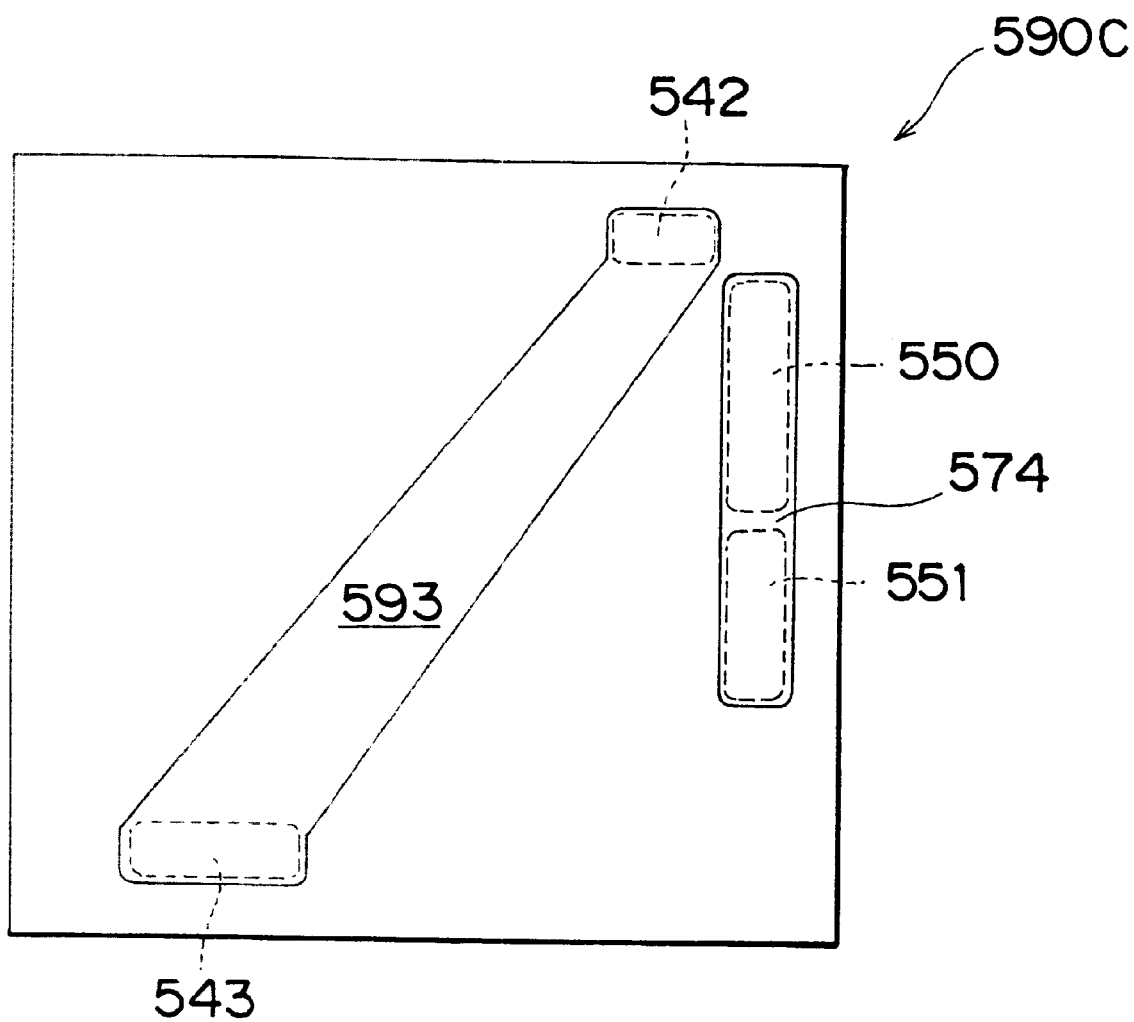
Figure 22:
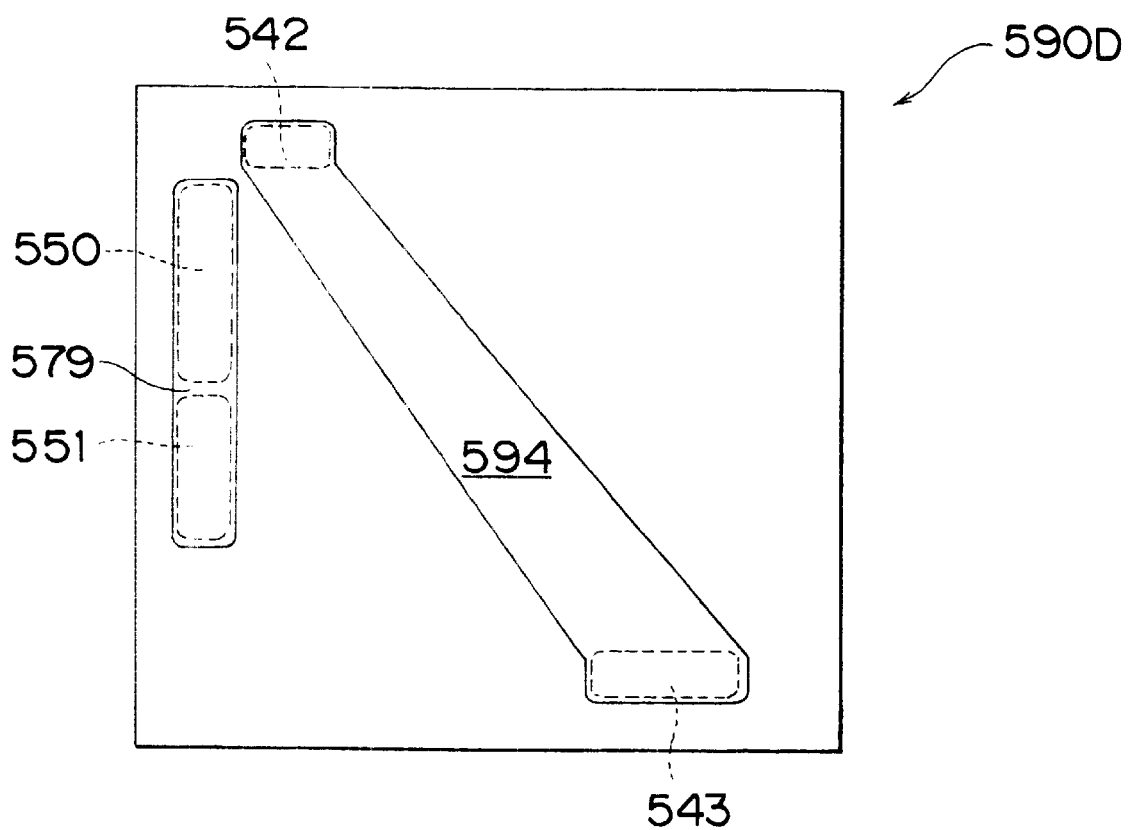

As shown in FIGS. 18A and 18B, the separator 530 has holes 540 to 545, and holes 550 to 555, and a recess 546 for communicating between holes 540 and 543, a recess 547 between holes 541 and 544, and a recess 548 between holes 542 and 545 are provided on one surface (see FIG. 18A). On other side, a recess 556 for communicating between holes 550 and 553, a recess 557 between holes 551 and 554, and a recess 558 between holes 552 and 555 are provided on one surface (see FIG. 18B). The holes 540 to 545 form oxidizing gas manifolds 560 to 565 for feeding and discharging oxidizing gas in the stack structure, and the holes 550 to 555 form fuel gas manifolds 580 to 585 for feeding and discharging fuel gas. The recesses 546 to 548 form unit cell inside oxidizing gas passages in the stack structure, and the recesses 556 to 558 form unit cell inside fuel gas passages. Although omitted in FIGS. 18A and 18B, the recesses 546 to 548, 556 to 558 of the separator 530 have, like the separator 480, bumps of specified shape for agitating the gas passing through the unit cell inside gas passages, and maintaining the conductivity with the adjacent gas diffusion electrodes.

The fuel cell 500 has one return plate responsible for the passage of fuel gas, each at the end of each stack structure (at the end of the surface disposing the pressure holding mechanism 514). A return plate 590A is disposed at the end of the stack structure 515A, a return plate 590B at the end of the stack structure 515B, a return plate 590C at the end of the stack structure 515C, and a return plate 590D at the end of the stack structure 515D. FIGS. 19 to 22 are plan views showing the constitution of these return plates, each as seen from the surface contacting with the laminated unit cells 20 (from the feed and discharge box 512 surface to the pressure plate 502 side). The return plate 590A has a recess 571 and a recess 591, the return plate 590B has a recess 572 and a recess 592, the return plate 590C has a recess 574 and a recess 593, and the return plate 590D has a recess 579 and a recess 594, on the surface respectively. Herein, the recesses 571, 572, 574, 579 are structures for forming passages for fuel gas, and the recesses 591 to 594 are structures for forming passages for oxidizing gas.

In FIGS. 19 to 22, plane constitutions of the return plates 590A to 590D are shown, and for the convenience of explaining the gas flow in the fuel cell 500, the configuration of part of the holes provided in the separator 530 laminated in the same stack structure and the recesses of each return plate is also shown. Herein, in each stack structure, the holes of the separator 530 positioned corresponding to the recesses of each return plate are indicated by dotted line on each return plate in FIGS. 19 to 22. That is, in the stack structure 515A, the recess 571 of the return plate 590A communicates between the fuel gas manifolds 581, 582 formed by the holes 551, 552 of the separator 530, and the recess 591 communicates between the oxidizing gas manifolds 562, 563 formed by the holes 542, 543 of the separator 530 (see FIG. 19). Likewise in the stack structure 515B, the recess 572 of the return plate 590B communicates between the fuel gas manifolds 581, 582 formed by the holes 551, 552 of the separator 530, and the recess 592 communicates between the oxidizing gas manifolds 562, 563 formed by the holes 542, 543 of the separator 530 (see FIG. 20). In the stack structure 515C, the recess 574 of the return plate 590C communicates between the fuel gas manifolds 580, 581 formed by the holes 550, 551 of the separator 530, and the recess 598 communicates between the oxidizing gas manifolds 562, 563 formed by the holes 542, 543 of the separator 530 (see FIG. 21). Similarly, in the stack structure 515D, the recess 579 of the return plate 590D communicates between the fuel gas manifolds 580, 581 formed by the holes 550, 551 of the separator 530, and the recess 594 communicates between the oxidizing gas manifolds 562, 563 formed by the holes 542, 543 of the separator 530 (see FIG. 22). The direction of lamination of members in the fuel cell 500, and the flow of gas are described in detail below.

Of the four stack structures of the fuel cell 500, the stack structure 515A and 515C are the same in the direction of lamination of unit cells 20, and the direction of lamination in the stack structures 515B and 515D is in reverse direction. The stack structures 515A to 515D for composing the fuel cell 500 have same current collectors as in the foregoing embodiments at the both ends thereof. That is, current collectors 536A, 537A are disposed at both ends of the stack structure 515A, current collectors 536B, 537B at both ends of the stack structure 515B, current collectors 536C, 537C at both ends of the stack structure 515C, and current collectors 536D, 537D at both ends of the stack structure 515D, respectively (see FIG. 17). Although not shown in FIG. 17, like the foregoing embodiments, these current collectors have terminals for taking out electric power from each stack structure. Explained below is a mode of connection of terminals provided in the current collectors of the stack structures 515A to 515D.

The terminal of the current collector 587A provided at the end of the feed and discharge box 512 surface in the stack structure 515A is connected to the terminal of the current collector 536C provided at the end of the feed and discharge box 512 in the stack structure 515C confronting across the feed and discharge box 512. The terminal of the current collector 537A provided at the end of the pressure holding mechanism 514 in the stack structure 515C is connected to the terminal of the current collector 536D provided at the end of the pressure holding mechanism 514 surface in the adjacent stack structure 515D. The terminal of the current collector 537D provided at the end of the feed and discharge box 512 surface in the stack structure 515D is connected to the terminal of the current collector 536B provided at the end of the feed and discharge box 512 surface in the stack structure 515B confronting across the feed and discharge box 512.

Herein, as mentioned above, since the stack structures 515A, 515C, and the stack structures 515B, 515D are reverse in the direction of lamination of the unit cells 20, by connecting the connecting terminals at the end of each stack structure as mentioned above, the stack structures 515A to 515D are connected in series in the sequence of the stack structures 515A, 515C, 515D, and 515B. When the stack structures 515A to 515D are thus connected in series, the terminal of the current collector 586A provided at the end of the pressure holding mechanism 514 surface in the stack structure, and the terminal of the current collector 537B provided at the end of the pressure holding mechanism 514 surface in the stack structure 515B are output terminals of the fuel cell 500, so that the electric power can be picked up from these terminals.

Figure 23:
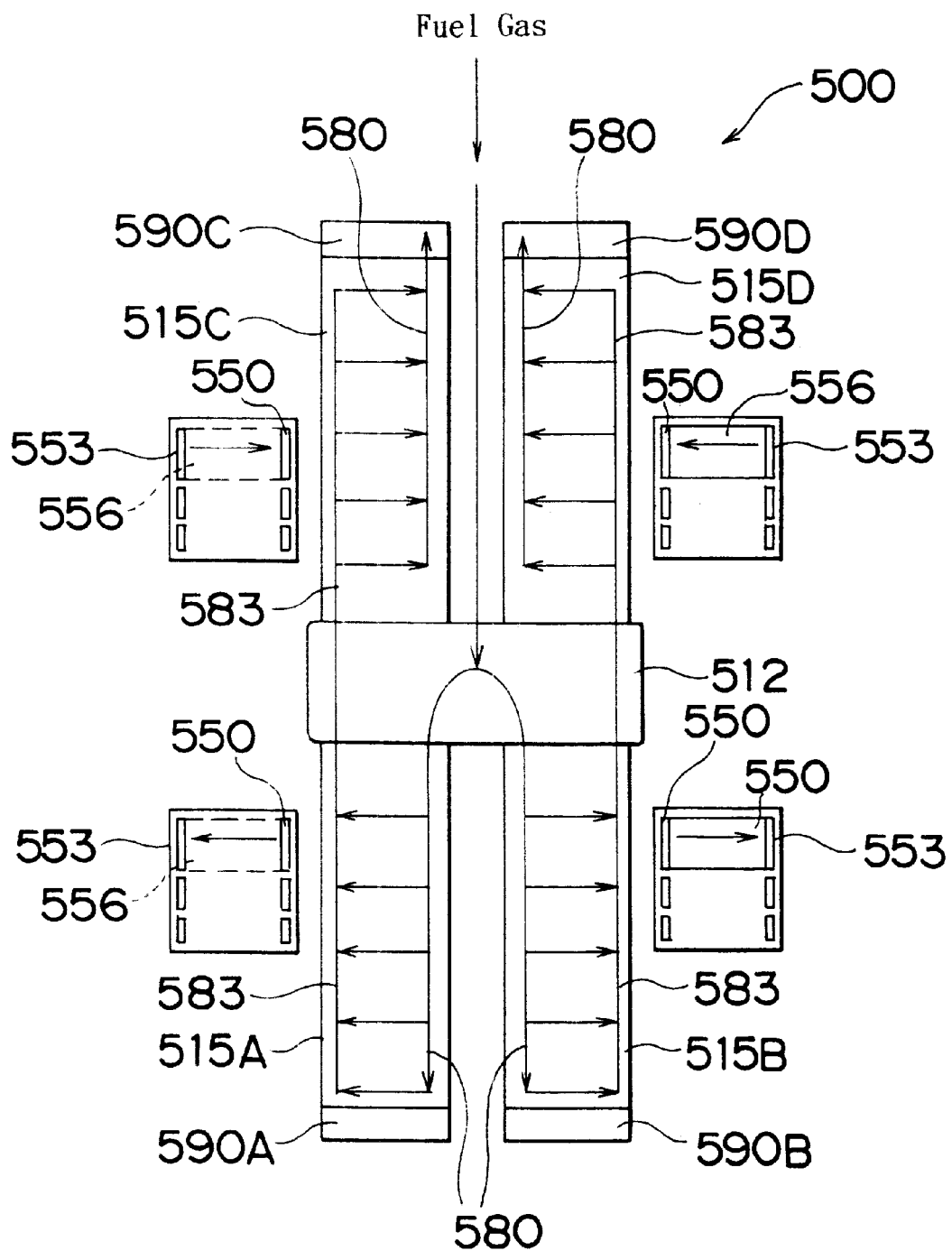
FIG. 23 to FIG. 25 are explanatory diagrams showing a flow mode of fuel gas in a fuel cell.
Figure 24:
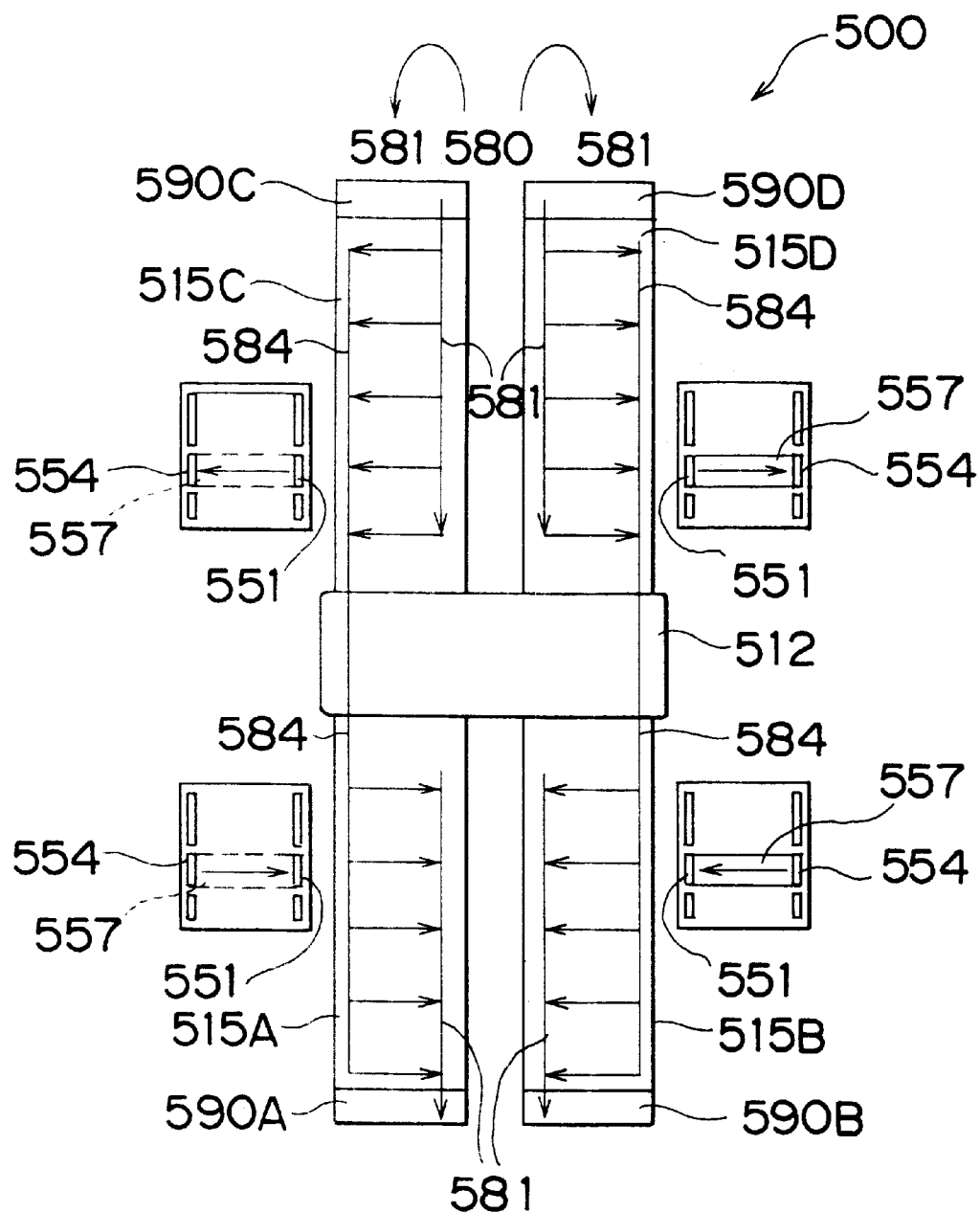
Figure 25:
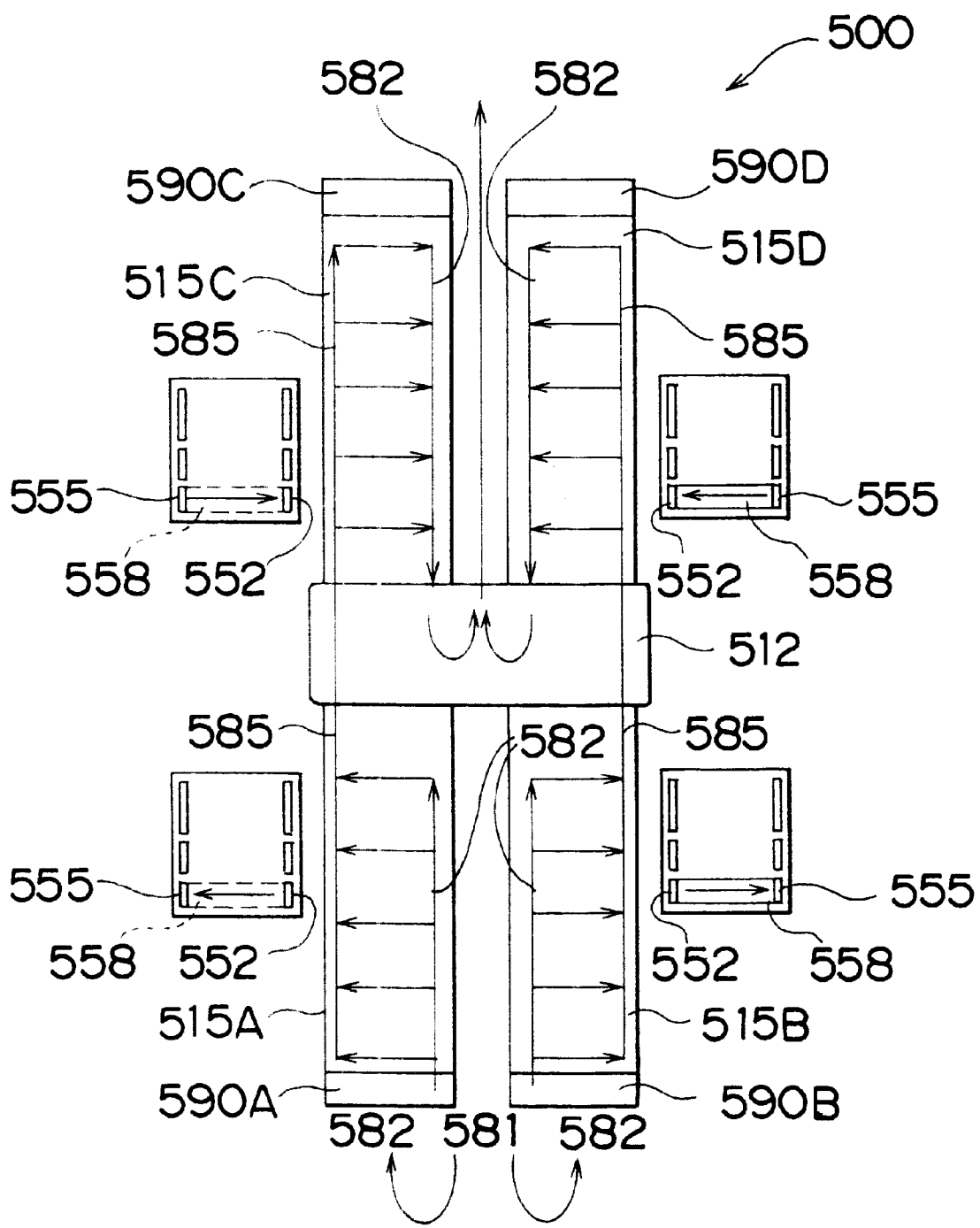

The flow of fuel gas in such a fuel cell 500 is described below. FIGS. 23 to 25 are explanatory diagrams showing the mode of flow of fuel gas in the fuel cell 500. In FIGS. 23 to 25, while showing the mode of flow of fuel gas in the entire fuel cell 500, the flow of fuel gas in the unit cell inside fuel gas passage formed in each stack structure is also shown near each stack structure. As the flow of fuel gas in the entire fuel cell 500, the view of the fuel cell 500 from the same direction as in FIG. 17 is given. The mode of flow of fuel gas in the unit cell inside fuel gas passage shows the separator 530 provided in each stack structure, from the surface of disposing the return plates 590A, 590B, to the surface of disposing the return plates 590C, 590D. When the separator 530 is observed in such direction, the surface forming the recesses 556 to 558 relating to the flow of fuel gas is the face surface in the stack structures 515B, 515D (the surface shown in FIGS. 23 to 25), but is the back surface in the stack structures 515A, 515C (the surface not shown in FIG. 23 to FIG. 25). Therefore, in FIGS. 23 to 25, to express the flow of fuel gas in the unit cells in the stack structures 515B, 515D, recesses 556 to 558 are indicated by a solid line, and to express the flow of fuel gas in the unit cells in the stack structures 515A, 515C, recesses 556 to 558 are indicated by a broken line. Herein, such recesses 556 to 558 shown in FIGS. 23 to 25 are indicated by the solid line and the broken line, only for those relating to the explanation in the drawings. Further, in FIGS. 23 to 25, for the convenience of expressing the mode of flow of fuel gas in the unit cell inside fuel gas passages, holes relating to the flow of oxidizing gas provided in the separator 530 are not shown.

The fuel gas supplied into the feed and discharge box 512 from outside is distributed into the stack structures 515A, 515B through the passages in the feed and discharge box 512. At this time, the fuel gas supplied from an outside fuel gas feed device is divided into two sections along the shape of the passage formed in the feed and discharge box 512, and is guided into the fuel gas manifold provided at the center of the fuel cell 500, at the upstream surface of the stack structures 515A, 515B, without changing the gas flow direction. That is, the fuel gas supplied from the outside is led into the fuel gas manifold 580 formed by the hole 550 provided in the separator 530 of the stack structures 515A, 515B (see FIG. 23). As mentioned above, since the laminating direction of the unit cells 20 is different between the stack structures 515A and 515B, the manifold in which the fuel gas is first introduced in the fuel gas manifold 580 formed by the hole 550 in either stack structure. In the stack structures 515A, 515B, the fuel gas fed into the fuel gas manifold 580 formed by the hole 550 is distributed into the unit cell inside fuel gas passage formed by the hole 556 communicating with the hole 550, and is then merged in the fuel gas manifold 583 formed by the hole 553. That is, in the stack structures 515A, 515B, the fuel gas manifold 583 functions as the fuel gas exhaust manifold.

Herein, in each one of the stack structures 515A, 515B, the fuel gas manifold 583 formed by the hole 553 and the fuel gas manifold 583 formed by the hole 553 in the stack structures 515C and 515D are connected through the feed and discharge box 512. Therefore, the fuel gas passing through the fuel gas manifold 583 formed by the hole 553 in the stack structures 515A and 515B is guided into the stack structures 515C and 515D through the feed and discharge box 512, and is led into the fuel gas manifold 583 formed by the hole 553. In the case of such connection, meanwhile, the gas exhaust manifolds formed in the stack structures 515A, 515B are connected to the gas manifolds formed at the corresponding positions in the stack structures 515C, 515D. Therefore, in the stack structures 515A, 515B, the fuel gas manifold 580 functions as fuel gas feed manifold, and the fuel gas manifold 583 as fuel gas exhaust manifold, while in the stack structures 515C and 515D, the relation is inverted, and the fuel gas manifold 580 functions as fuel gas exhaust manifold, and the fuel gas manifold 583 as fuel gas feed manifold.

In the stack structures 515C, 515D, the fuel gas is distributed from the fuel gas manifold 583 formed by the hole 553 into the unit cell inside fuel gas passages formed by the recess 556, and the fuel gas passing through these unit cell inside fuel gas passages is merged in the fuel gas manifold 580 formed by the hole 550, and reaches the return plates 590C, 590D disposed at the end of the pressure holding mechanism 514. Herein, the recesses 574, 579 of the return plates 590C, 590D (see FIGS. 21 and 22) overlap with the holes 550 and 551 of the adjacent separator 530, and the fuel gas manifold 580 formed by the hole 550 and the fuel gas manifold 581 formed by the hole 551 communicate with each other. Therefore, the fuel gas passing through the fuel gas manifold 580 is guided into the fuel gas manifold 581 formed by the hole 551 in the same stack structure, by the recesses 574, 579, at the return plates 590C, 590D, respectively (see FIG. 24).

In the stack structures 515C, 515D, the fuel gas manifold 581 functions as the fuel gas feed manifold, and the fuel gas introduced into the fuel gas manifold 581 is distributed into the unit cell inside fuel gas passages formed by the recess 557, and after passing through these unit cell inside fuel gas passages, it is merged in the fuel gas manifold 584 formed by the hole 554. That is, in the stack structures 515C, 515D, the fuel gas manifold 584 functions as fuel gas exhaust manifold.

Herein, in each one of the stack structures 515C and 515D, the fuel gas manifold 584 formed by the hole 554, and the fuel gas manifold 584 formed by the hole 554 in each of the stack structures 515A and 515B are connected through the feed and discharge box 512. Therefore, in the stack structures 515C and 515D, the fuel gas passing through the fuel gas manifold which is the fuel gas exhaust manifold passes through the feed and discharge box 512 and is guided into the fuel gas manifold 584 formed by the hole 554 in the stack structures 515A and 515B. That is, in the stack structures 515A and 515B, the fuel gas manifold 584 functions as the fuel gas feed manifold (see FIG. 24).

In the stack structures 515A, 515B, from the fuel gas manifold 584 formed by the hole 554, the fuel gas is distributed into the unit cell inside fuel gas passages formed by the recess 557, and the fuel gas passing through these unit cell inside fuel gas passages is merged in the fuel gas manifold 581 formed by the hole 551, and reaches the return plates 590A, 590B formed by the hole 551. That is, in the stack structure 515A, 515B, the fuel gas manifold 581 functions as the fuel gas exhaust manifold.

Herein, the recesses 571, 572 of the return plates 590A, 590B (see FIGS. 19 and 20) overlap with the holes 551 and 552 of the adjacent separator 530 as mentioned above, and the fuel gas manifold 581 formed by the hole 551 and the fuel gas manifold 582 formed by the hole 552 communicate with each other. Therefore, the fuel gas passing through the fuel gas manifold 581 is guided into the fuel gas manifold 582 formed by the hole 552 in the same stack structure, by the recesses 571, 572, at the return plates 590A, 590B, respectively (see FIG. 25). In the stack structures 515A, 515B, the fuel gas manifold 582 functions as the fuel gas feed manifold, and the fuel gas passing through the fuel gas manifold 582 is distributed into unit cell inside fuel gas passages formed by the recess 558, and after passing through these unit cell inside fuel gas passages, it is merged in the fuel gas manifold 585 formed by the hole 555. That is, in the stack structures 515A, 515B, the fuel gas manifold 585 functions as fuel gas exhaust manifold.

Herein, in each one of the stack structures 515A and 515B, the fuel gas manifold 585 formed by the hole 555, and the fuel gas manifold 585 formed by the hole 555 in each of the stack structures 515C and 515D are connected through the feed and discharge box 512. Therefore, in the stack structures 515A and 515B, the fuel gas passing through the fuel gas manifold which is the fuel gas exhaust manifold passes through the feed and discharge box 512 and is guided into the fuel gas manifold 585 formed by the hole 555 in the stack structures 515C and 515D. That is, in the stack structures 515C and 515D, the fuel gas manifold 585 functions as the fuel gas feed manifold (see FIG. 25).

In the stack structures 515C, 515D, from the fuel gas manifold 585 formed by the hole 555, the fuel gas is distributed into the unit cell inside fuel gas passages formed by the recess 558, and the fuel gas passing through these unit cell inside fuel gas passages is merged in the fuel gas manifold 582 formed by the hole 552, and reaches again the feed and discharge box 512.

That is, in the stack structure 515C, 515D, the fuel gas manifold 582 functions as the fuel gas exhaust manifold. As mentioned above, the feed and discharge box 512 is connected to an outside fuel gas discharge device, and the fuel gas passing through the fuel gas manifold 582 is discharged outside through the feed and discharge box 512.

Figure 26:
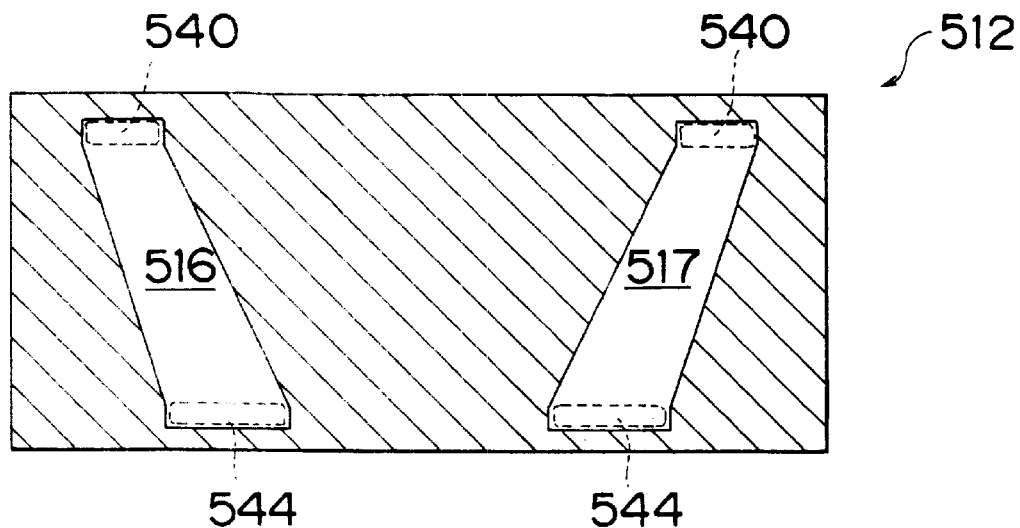
FIG. 26 is a sectional view showing a shape of passage of oxidizing gas formed in a feed and discharge box.
Figure 27:
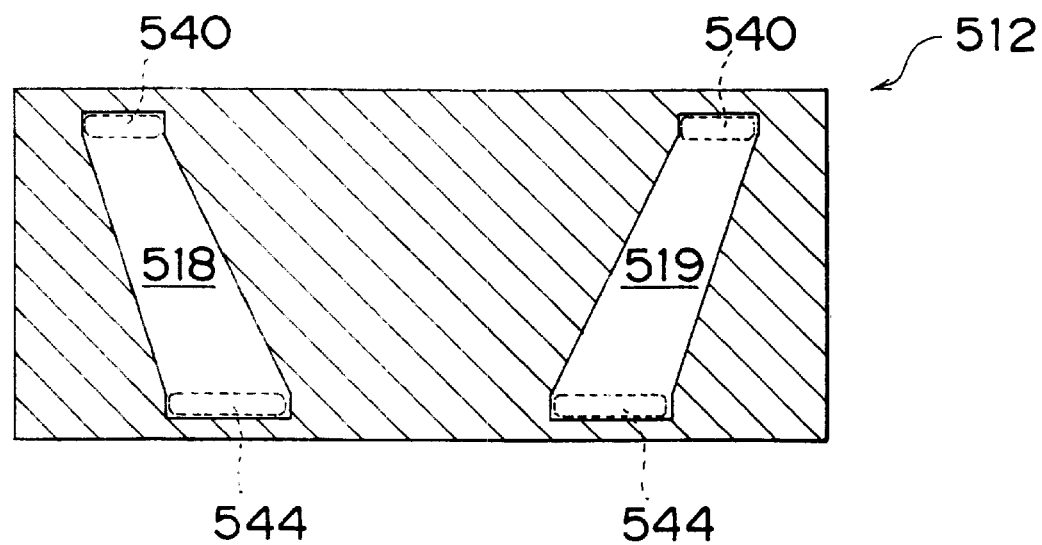
FIG. 27 is a sectional view showing a shape of passage of oxidizing gas formed in a feed and discharge box.

So far is explained the mode of flow of fuel gas in the fuel cell 500, and prior to explanation of the mode of flow of oxidizing gas in the fuel cell 500, the passage of oxidizing gas formed in the feed and discharge box 512 which functions like the return plate is described. This oxidizing gas passage is formed near the region contacting with each stack structure in the feed and discharge box 512. FIG. 26 is a schematic diagram showing a section of cutting off the feed and discharge box 512 taken along line 26—26 in FIG. 17, and FIG. 27 is a schematic diagram showing a section of cutting off the feed and discharge box 512 taken along line 27—27 in FIG. 17. As shown in FIGS. 26 and 27, the feed and discharge box 512 is provided with passages 516 to 519, and these passages function for communicating between specified oxidizing gas manifolds in the individual stack structures.

In FIGS. 26 and 27, in addition to the passages 516 to 519, the corresponding positions of the holes (holes provided in the separator 530) for forming the oxidizing gas manifolds communicating through these passages are also shown. Herein, the positions of the holes of the separator 530 are indicated by the broken line in FIGS. 26 and 27. As shown in FIG. 26, the passage 516 communicates, in the stack structure 515A, between the oxidizing gas manifold 560 formed by the hole 540 and the oxidizing gas manifold 564 formed by the hole 544. The passage 517 communicates, in the stack structure 515B, between the oxidizing gas manifold 560 formed by the hole 540 and the oxidizing gas manifold 564 formed by the hole 544. Similarly, as shown in FIG. 27, the passage 518 communicates, in the stack structure 515D, between the oxidizing gas manifold 560 formed by the hole 540 and the oxidizing gas manifold 564 formed by the hole 544, and the passage 517 communicates, in the stack structure 515C, between the oxidizing gas manifold 560 formed by the hole 540 and the oxidizing gas manifold 564 formed by the hole 544.

Figure 28:
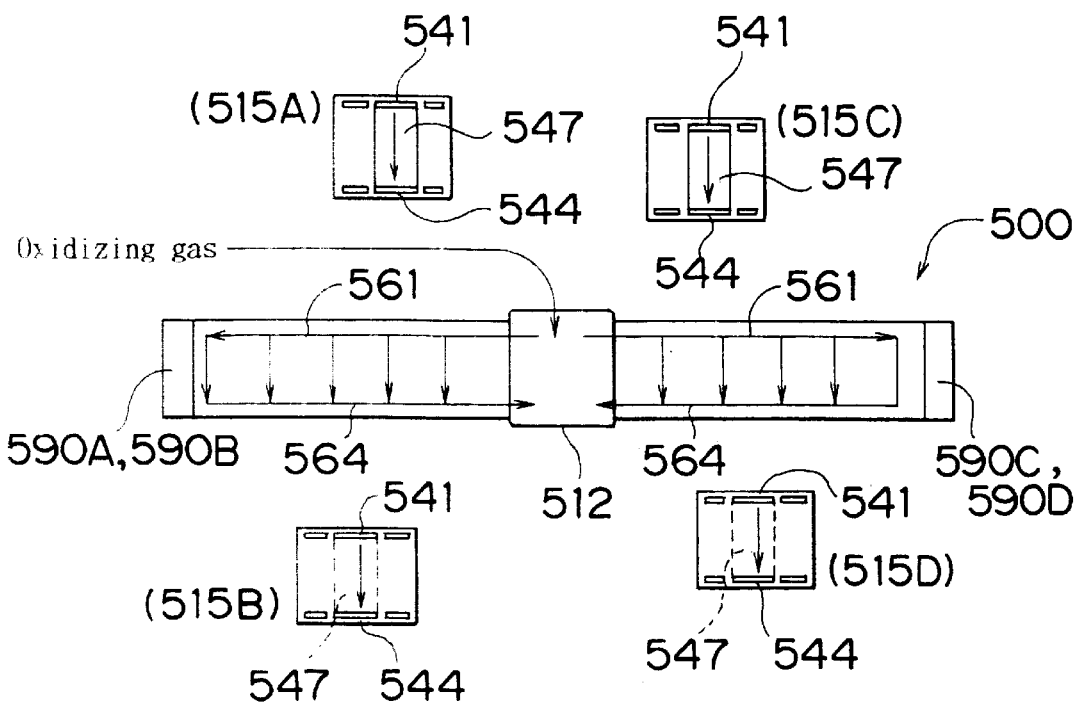
FIG. 28 to FIG. 30 are explanatory diagrams showing a flow mode of oxidizing gas in a fuel cell.
Figure 29:
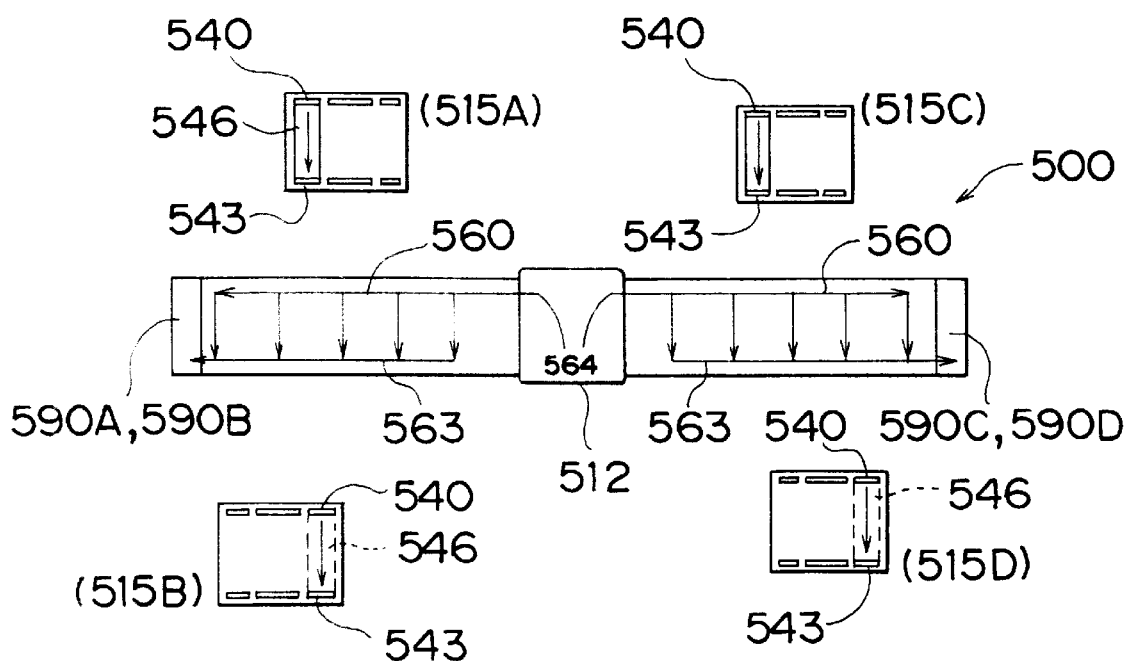
Figure 30:
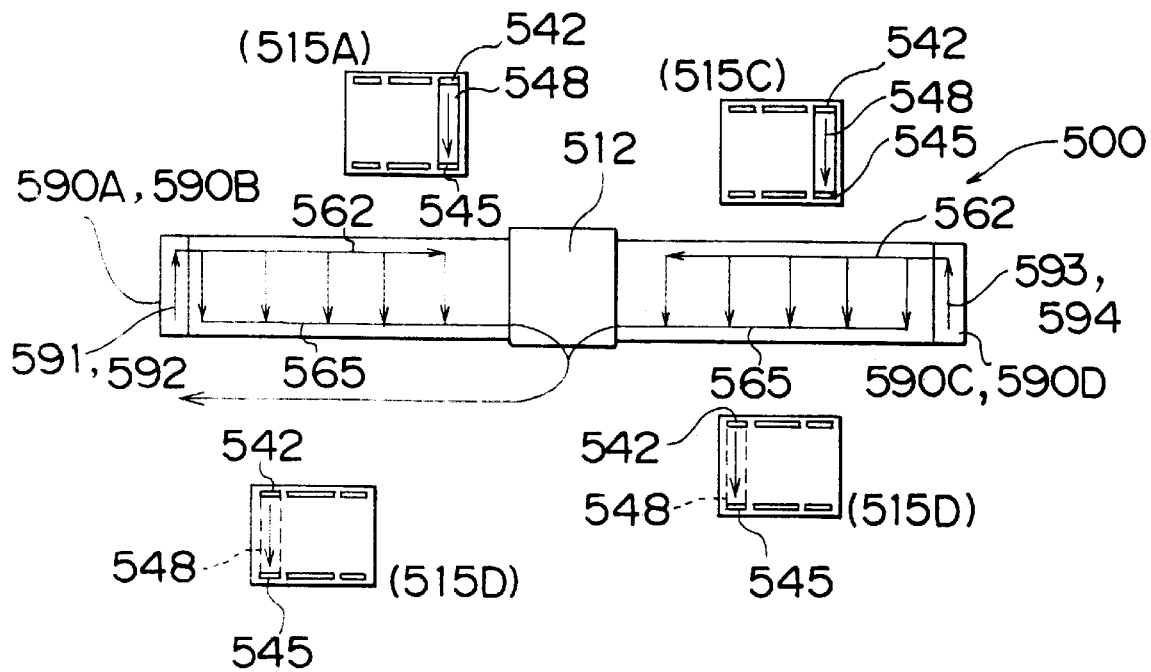

In such a fuel cell 500, the mode of flow of oxidizing gas is described below. FIG. 28 to FIG. 30 are explanatory diagrams showing the mode of flow of oxidizing gas in the fuel cell 500. In FIG. 28 to FIG. 30, while showing the mode of flow of oxidizing gas in the entire fuel cell 500, the mode of flow of oxidizing gas in the unit cell inside oxidizing gas passages in the stack structures is also shown. The mode of flow of oxidizing gas in the entire fuel cell 500 shows the fuel cell 500 as seen from the surface of disposing the stack structures 515B, 515D, to the surface of disposing the stack structures 515A, 515C. The mode of flow of oxidizing gas in the unit cell inside oxidizing gas passage shows the separator 530 of each stack structure, as seen from the surface of disposing the return plates 590A, 590B to the surface of disposing the return plates 590C, 590D. Incidentally, when the separator 530 is seen from such direction, the surface of forming the recesses 546 to 548 relating to the flow of oxidizing gas is the face surface in the stack structures 515A, 515C (the surface shown in FIGS. 29 to 30), but in the stack structures 515B, 515D, it is the back surface (the surface not shown in FIGS. 28 to 30). Therefore, in FIGS. 28 to 30, to express the flow of oxidizing gas in the unit cells in the stack structures 515A, 515C, recesses 546 to 548 are indicated by solid line, and to express the flow of oxidizing gas in the unit cells in the stack structures 515B, 515D, recesses 546 to 548 are indicated by broken line. Herein, such recesses 546 to 548 shown in FIGS. 28 to 30 are indicated by solid line and broken line, only for those relating to the explanation in the drawings. Further, in FIGS. 28 to 30, for the convenience of expressing the mode of flow of oxidizing gas in the unit cell inside fuel gas passages, holes relating to the flow of fuel gas provided in the separator 530 are not shown.

The oxidizing gas supplied into the feed and discharge box 512 from outside is distributed into four stack structures (stack structures 515A to 515D) through the passages in the feed and discharge box 512. The oxidizing gas distributed from the feed and discharge box 512 is guided into the oxidizing gas manifold 561 formed by the hole 541 provided in the separator 530 of the stack structures 515A to 515D (see FIG. 28). That is, in the stack structures 515A to 515D, the oxidizing gas manifold 561 functions as oxidizing gas feed manifold. The oxidizing gas introduced into the oxidizing gas manifold 561 is distributed into the unit cell inside oxidizing gas passages formed by the recess 547, and flows through the unit cell inside oxidizing gas passages in the downward direction, and is then merged in the oxidizing gas manifold 564 formed by the hole 544. That is, in the stack structures 515A to 515D, the oxidizing gas manifold 564 function as oxidizing gas exhaust manifold.

Herein, the oxidizing gas merged in the oxidizing gas manifold 564 return again to the feed and discharge box 512. In the feed and discharge box 512, as mentioned above, there are passages 516 to 519 for connecting the oxidizing gas manifold 564 formed by the hole 544 and the oxidizing gas manifold 560 formed by the hole 540, in the same stack structure. Therefore, in each stack structure, the oxidizing gas passing through the oxidizing gas manifold 564 passes through the passages 516 to 519 of the feed and discharge box 512, and is fed into the oxidizing gas manifold 560 formed by the hole 540 in the same stack structure (see FIG. 29). That is, in the stack structures 515A to 515D, the oxidizing gas manifold 560 functions as oxidizing gas feed manifold. In each stack structure, the oxidizing gas passing through the oxidizing gas manifold 560 is distributed into the unit cell inside oxidizing gas passages formed by the recess 546, and then merged in the oxidizing gas manifold 563 formed by the hole 543. That is, in the stack structures 515A to 515D, the oxidizing gas manifold 563 functions as oxidizing gas exhaust manifold.

The oxidizing gas merged in the oxidizing gas manifold 563 formed by the hole 543 reaches, in each stack structure, the return plates 590A to 590D disposed at the end of the pressure holding mechanism 514. Herein, the recesses 591 to 594 provided in the return plates 590A to 590D (see FIG. 19 to FIG. 22) overlap, as mentioned above, with the holes 543 and 542 provided in the separator 530 in each stack structure, so that the oxidizing gas manifold 563 formed by the hole 543 and the oxidizing gas manifold 562 formed by the hole 542 communicate with each other. Therefore, in each one of the return plates 590A to 590D, the oxidizing gas passing through the oxidizing gas manifold 563 is introduced into the oxidizing gas manifold 562 formed by the hole 542, in the same stack structure, through the recesses 591 to 594 (see FIG. 30). In the stack structures 515A to 515D, the oxidizing gas manifold 562 functions as oxidizing gas feed manifold, and the oxidizing gas fed into the oxidizing gas manifold 562 is distributed into the unit cell inside oxidizing gas passages formed by the recess 548, and after passing through these unit cell inside oxidizing gas passages, it is merged in the oxidizing gas manifold 565 formed by the hole 545. That is, in the stack structures 515A to 515D, the oxidizing gas manifold 565 functions as oxidizing gas exhaust manifold. The oxidizing gas merged in the oxidizing gas manifold 565 reaches again the feed and discharge box 512. As mentioned above, the feed and discharge box 512 is connected to an outside oxidizing gas discharge device, and the oxidizing gas passing through the oxidizing gas manifold 565 is discharged outside through the feed and discharge box 512.

Although the explanation is omitted in the above embodiment relating to the fuel cell 500, each stack structure for composing the fuel cell 500 also includes the passage for circulating the cooling water for keeping the internal temperature below a specified temperature. Such cooling water is also supplied from outside through the feed and discharge box 512, and is distributed into four stack structures by the feed and discharge box 512, and after passing through each stack structure, it is discharged outside through the feed and discharge box 512.

In the separator 530 provided in the fuel cell 500 of this embodiment, same as in the separator 530 of the fuel cell of the fourth embodiment, the passage sectional area is smaller in the recess for forming the unit cell inside gas passages at the further downstream side. That is, at the passage surface of the fuel gas, the passage sectional area becomes smaller in the sequence of the recesses 556, 557, 558, and at the passage surface of oxidizing gas, the passage sectional area becomes smaller in the sequence of the recesses 547, 546, 548. As a result, also at the downstream surface smaller in the total amount of supplied gas, the gas flow rate per unit passage sectional area is maintained, and a sufficiently fast flow velocity is maintained.

According to thus constituted fuel cell 500 of the fifth embodiment, the gas flow passage in each stack structure is divided into plural sections, and the gas is sequentially supplied into the divided gas passages, and therefore the gas flow rate passing through unit sectional area of passage is increased, and the gas utility rate is enhanced, and hence same effects as in the foregoing embodiments are obtained. In particular, the fuel cell of the embodiment as plural stack structures, and the entire fuel cell includes many unit cells, so that the effect of enhancing the gas utility rate by accelerating the gas flow velocity may be prominently obtained. Usually, if the fuel cell includes many unit cells, if the gas feed amount from the gas feed device into the fuel cell is increased in order to raise the flow velocity and enhance the gas utility rate, the increment of gas flow rate in the individual unit cell inside gas flow passages is slight, and the fuel consumption and the amount of energy consumed for pressurizing the gas are increased, but it is hard to obtain a sufficient effect of enhancing the gas utility rate. More specifically, in the fuel cell including four stack structures composed of 100 unit cells each, if the feed gas amount is increased, the increment of amount of gas in each unit cell inside gas passage is, theoretically, only $\frac{1}{400}$ of the amount of gas increased in the gas feed device. By contrast, in the fuel cell of the embodiment, by forming plural recesses on the separator, the passage in each stack structure is divided into plural sections, and the gas is sequentially supplied into the divided gas passages, and therefore in spite of many unit cells being provided, the amount of gas passing through the unit cell inside gas passage is increased without increasing the feed gas amount from the gas feed device, so that the gas utility rate may be notably enhanced.

Moreover, in addition to the above effects, the fuel cell of the embodiment has the following features. The fuel gas supplied from outside is first distributed only into the stack structures 515A and 515B, and after passing through the divided fuel gas passages formed in the stack structures 515A and 515B, and is then supplied into the stack structures 515C and 515D, and therefore as compared with the constitution for distributing fuel gas simultaneously into four stack structures, the flow rate of the fuel gas supplied into one stack structure is increased, and the gas flow velocity in the passage is faster, so that the utility rate of fuel gas can be enhanced.

That is, when distributing fuel gas simultaneously into four stack structures, in each stack structure, $\frac{1}{4}$ each of the fuel gas supplied from the fuel gas feed device is supplied, but in the fuel cell 500 of the embodiment, $\frac{1}{2}$ each of the fuel gas supplied from the fuel gas feed device is supplied into each stack structure. Thus, the flow rate of fuel gas in the passage is increased and the gas utility rate is enhanced, so that the total amount of fuel gas supplied into the fuel cell can be saved. Usually, in order to promote the electrochemical reaction sufficiently in the entire fuel cell, an excess amount of gas more than the theoretically required amount of gas is supplied, but as the gas utility rate in the fuel cell is enhanced, the electrochemical reaction can be sufficiently promoted if the supply gas amount is decreased. Such effects are advantageous, in particular, when a fuel cell is used as a driving power for an electric vehicle. That is, by decreasing the fuel gas supplied into the fuel cell, the consumption of the fuel contained in the electric vehicle is decreased, so that a longer distance can be traveled by one refueling.

In the case of feeding gas into plural stack structures, if feeding gas first into some stack structures and then feeding the gas passing through these upstream surface stack structures into the remaining downstream surface stack structures, the concentration of the electrode active material is higher or the total amount of supplied gas is larger in the gas supplied into the upstream surface stack structures, and therefore the upstream surface stack structures are provided with a sufficient voltage and are hence advantageous. However, in the fuel cell 500 of the embodiment, since the divided passages in each stack structure are mutually connected between stack structures and the gas is exchanged between the stack structures, some of the stack structures are not disposed always at the downstream side, and therefore the output of the entire fuel cell may be further uniform.

According to the fuel cell 500 of the embodiment, when dividing the fuel gas supplied from the fuel gas feed device, by using the feed and discharge box 512, since the gas is divided into two flows without changing the gas direction and is supplied into the stack structures 515A, 515B, the amount of gas supplied into each stack structure is further uniform. That is, to divide the gas amount into two flows precisely without changing the direction of gas flow is far easier technically than to divide the gas into four different directions, so that the amount of gas supplied into each stack structure becomes further uniform, when the output of the entire fuel cell has more uniformity.

Incidentally, in the fuel cell 500 of the embodiment, as mentioned above, the oxidizing gas is divided into four sections in the feed and discharge box 512, and is supplied independently into each stack structure. Herein, when using reformed gas obtained by reforming methanol or the like as the fuel gas, the hydrogen concentration in the fuel gas is about 60%, but when using air as the oxidizing gas, the oxygen concentration in the oxidizing gas is about 20%, and therefore in order to supply a sufficient oxygen at the cathode side, more oxidizing gas as compared with the fuel gas has to be supplied into the fuel cell. In the case of connecting the passages divided in the stack structure mutually between two stack structures and passing the fuel gas alternately in both stack structures, as in the case of the passages of the fuel gas in the fuel cell of the embodiment, the length of the gas passage is longer and the passage resistance increases, and the pressure loss is larger when the gas passes through the passage. Therefore, as compared with the case of supplying the gas independently into each stack structure, the amount of energy spent for pressurizing the oxidizing gas when feeding the oxidizing gas increases, and the energy efficiency of the entire fuel cell drops. In the fuel cell 500 of the present embodiment, in the passage of oxidizing gas where more amount of gas supply is needed, to avoid drop of energy efficiency due to extension of passage length, the oxidizing gas is supplied independently in each stack structure.

Yet, as far as the degree of drop in the energy efficiency is within an allowable range, at the oxidizing gas passage side, like the fuel gas passage side, the passages divided within the stack structure may be mutually connected between two stack structures, and the oxidizing gas may be alternately supplied in both stack structures. In such a case, also at the oxidizing gas passage side, the gas flow rate and gas flow velocity in the gas passage can be increased, and the gas utility rate can be enhanced.

Further according to the fuel cell 500 of the embodiment, since plural stack structures are contained in one case, the entire constitution may be compact. In particular, the feed and discharge box 512 is provided in the center, and the gas is supplied from outside and the gas is discharged to outside through this feed and discharge box 512, and the gas can be exchanged between stack structures through the feed and discharge box 512, so that the gas piping structure may be extremely compact.

Also in the embodiment, plural recesses are formed in the separator surface, and each recess forms a unit cell inside gas passage independently, and the divided gas passages corresponding to the individual unit cell inside gas passages are mutually connected, so that the gas is passed sequentially among them, and therefore it is not necessary to pass the gas sequentially from the unit cell inside gas passage formed by the recess provided at the end of the separator. In the embodiment, the oxidizing gas is passed from the unit cell inside oxidizing gas passage formed by the recess 547 provided in the center of the separator 530. In the gas passage, the gas pressure is higher at the upstream side, and in the passage having a high gas pressure, slight gas leak may be considered in a surrounding region through the gas diffusion electrode, but as the unit cell inside gas passage formed by the recess provided in the center of the separator is set at the upstream side, the gas leaking from the unit cell inside gas passage of the upstream surface can be utilized in the region corresponding to the unit cell inside gas passage of the further downstream surface disposed at both sides. Herein, in each unit cell inside oxidizing gas passage, since the oxidizing gas always flows in the downward direction, the water produced in the passage is guided into the lower oxidizing gas exhaust manifold by the flow of gas, so that the passage is not closed. The water guided into the oxidizing gas exhaust manifold can be removed by attaching a drain valve or the like to each oxidizing gas exhaust manifold.

In the embodiment, the passage of the fuel gas is designed to pass sequentially from the unit cell inside gas passage formed by the recess provided at the end of the separator. That is, the unit cell inside fuel gas passage formed by the recess 556 at the upper end is the utmost upstream side, and the unit cell inside fuel gas passages formed by the lower recesses are designed to be at the downstream side. In each unit cell inside fuel gas passage, since the fuel gas flows in the horizontal direction, in such a constitution, the water produced in the passage is gradually guided into the downstream surface unit cell inside fuel gas passages by the flow of gas, and is collected finally in the utmost downstream surface fuel gas exhaust manifold (the fuel gas manifold 585 in the stack structures 515A, 515B, or the fuel gas manifold 582 in the stack structures 515C, 515D). Therefore, by attaching a drain valve or the like to this fuel gas exhaust manifold, the water can be easily removed.

Moreover, in the fuel cell 500 of the fifth embodiment, the oxidizing gas passage of specified shape is formed in the feed and discharge box 512, and through this passage, the oxidizing gas is introduced into the gas passages divided at the further downstream side, but instead of forming the passage in the feed and discharge box 512, a return plate may be disposed at the end of each stack structure. That is, in each stack structure, aside from the return plates 590A to 590D provided at the end of the pressure holding mechanism 514 side, return plates may be also disposed at the end of the feed and discharge box 512 side, and the same operation as in the passages 516 to 519 provided in the feed and discharge box 512 may be realized by these return plates. Each stack structure is connected in series in the sequence of stack structures 515A, 515C, 515D, 515B, but a different method of connection is also possible. For example, these stack structures may be connected in parallel mutually.

As described herein, in the fuel cell 500 of the fifth embodiment, by forming plural recesses on the separator, the passage in each stack structure is divided into plural sections, and the gas is sequentially supplied into the divided gas passages, and therefore, in spite of many unit cells being disposed, it is not necessary to increase the amount of gas supplied from the gas feed device, and the amount of gas passing through the unit cell inside gas passages is increased, and the gas utility rate can be enhanced substantially. On the basis of such effect, by using the separator having plural recesses as in the fifth embodiment, a fuel cell having a smaller number of stack structures may be composed. Herein, as the number of unit cells provided in one stack structure is increased, the gas flow rate in individual unit cell inside gas passages decreases, and the gas utility rate drops. In order to increase the number of cells per unit stack structure while maintaining the gas flow rate in the unit cell inside gas passages, it is necessary to increase greatly the gas amount to be supplied into the stack structure, and it is accompanied by increase of fuel consumption and increase of energy spent for pressurizing the gas, and hence it was hitherto difficult to increase the number of unit cells per unit stack structure. Like the fifth embodiment, by using the separator having plural recesses, when the passage in each stack structure is divided into plural sections, and the gas is sequentially supplied into the divided gas passages, the number of unit cells per unit stack structure can be increased without being accompanied by such inconvenience.

Figure 31:
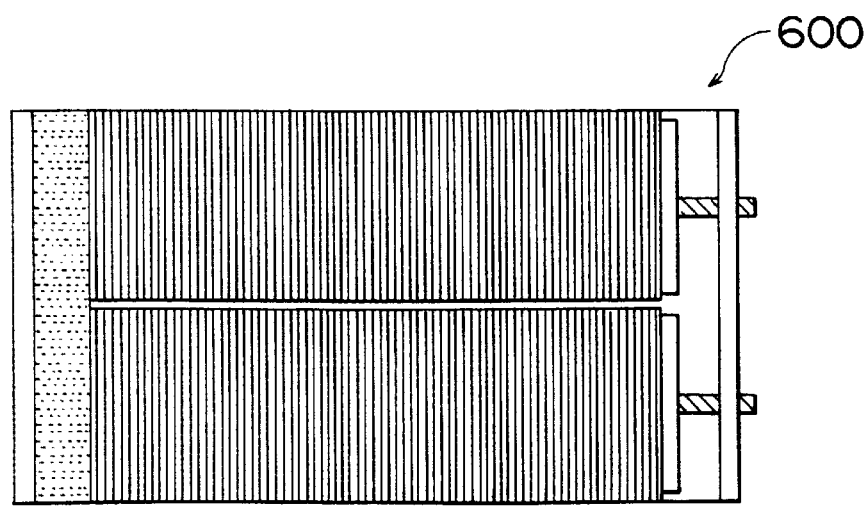
FIG. 31 is an explanatory diagram showing a constitution of a fuel cell having two stack structure.

FIG. 31 shows a fuel cell having two stack structures, being an explanatory diagram showing a constitution of a fuel cell 600 having the same number of unit cells as in the fuel cell 500 shown in FIG. 17. The fuel cell 600, like the fuel cell 500, is composed by using the separator 530, and the passage in the stack structure is divided into three sections, and therefore if the number of unit cells per unit stack structure is increased, a sufficient gas flow rate is maintained in the unit cell inside gas passage. Thus, by increasing the number of unit cells per unit stack structure and decreasing the number of stack structures, the dead space required for containing plural stack structures in the case is curtailed, and the entire fuel cell may be further reduced in size.

In the foregoing embodiments, the polymer electrolyte fuel cell is explained, but the constitution of the invention may also be applied to different types of fuel cell. For example, when applied in the phosphate type fuel cell or solid electrolyte type fuel cell, the gas utility can be enhanced, water discharge performance is improved, and other similar effects are obtained.

The invention is described herein relating to illustrated embodiments, but it should be noted that the invention is not limited to these embodiments alone, but may be changed or modified in various forms within the scope and spirit of the invention.

What is claimed is:

1. A separator for a fuel cell, the fuel cell being formed of an electrolyte layer and an electrode forming member laminated together to form a gas passage inside the fuel cell, the separator comprising:
    a plurality of first holes extending through the separator in a thickness direction thereof;
    a plurality of first cell inside passage forming structures extending along a first surface of the separator, each first cell inside passage forming structure forming, when the separator is installed in a fuel cell, a first cell inside passage fluidly connecting two of the first holes, each of the first cell inside passage forming structures having a concave section, wherein the first cell inside passage forming structures are formed so that the first cell inside passages are fluidly sealed from one another;
    wherein all of the first cell inside passages are disposed adjacent to one another,
    wherein at least two of the first holes extend along a first side of the separator and at least two of the first holes extend along an opposite side of the separator,
    wherein at least one first cell inside passage extends along the first surface of the separator away from an upstream one of the two first holes on the first side of the separator toward an upstream one of the two first holes on the opposite side of the separator,
    wherein the upstream one of the two first holes on the opposite side of the separator is coupled to a downstream one of the two first holes on the opposite side of the separator, and
    further wherein at least one first cell inside passage returns from the downstream one of the two first holes on the opposite side of the separator to a downstream one of the two first holes on the first side of the separator.

2. A separator according to claim 1, further comprising a plurality of second holes extending through the separator and a plurality of second cell inside passage forming structures provided on a second surface of the separator, each second cell inside passage forming structure forming, when the separator is installed in a fuel cell, a second cell inside passage fluidly connecting two of the second holes, each of the second cell inside passage forming structures having a concave section, wherein the second cell inside passage forming structures are formed so that the second cell inside passages are fluidly sealed from one another.

3. A separator according to claim 1, wherein all of the first cell inside passages are disposed adjacent to one another with the first holes extending along a first side of the separator, and wherein each of the first cell inside passage forming structures extends along the first surface of the separator from an upstream one of the two first holes away from the first side of the separator and then return toward the first side to couple to a downstream one of the two first holes.

4. A separator according to claim 3, further comprising a plurality of second holes extending through the separator and a plurality of second cell inside passage forming structures provided on a second surface of the separator, each second cell inside passage forming structure forming, when the separator is installed in a fuel cell, a second cell inside passage fluidly connecting two of the second holes, each of the second cell inside passage forming structures having a concave section, wherein the second cell inside passage forming structures are formed so that the second cell inside passages are fluidly sealed from one another, wherein the second holes are provided along a second side of the separator opposite the first side and wherein all of the second cell inside passages are disposed adjacent to one another with each of the second cell inside passage forming structures extending along the second surface of the separator from an upstream one of the two second holes away from the second side of the separator and then returning toward the second side to couple to a downstream one of the two second.

5. A fuel cell for providing an electromotive force by electrochemical reaction upon supply of reaction gas, the fuel cell being composed of a plurality of unit cells laminated together in a stack structure, wherein each of the unit cells includes an electrolyte layer, an electrode and a separator, the fuel cell comprising:
    plural dividing passage forming parts provided in the stack structure in a laminating direction for passing the supplied reaction gas therethrough, comprising:
        a plurality of gas feed manifolds for distributing the reaction gas into the individual unit cells;
        a plurality of gas exhaust manifolds for collecting the reaction gas discharged from the individual unit cells; and
        a unit cell inside gas passage within each of the unit cells, each unit cell inside gas passage including a concave section for communicating between one of the gas feed manifolds and one of the gas exhaust manifolds and for supplying and discharging the reaction gas in at least a part of the electrolyte layer and the electrode;

a passage linkage for linking an end portion of at least one of the gas exhaust manifolds provided in one of the plural dividing passage forming parts and an end portion of at least one of the gas feed manifolds provided in another one of the plural dividing passage forming parts at an end portion of the stack structure, wherein at least on one surface of the gas separators of at least one of the unit cells, a plurality of inside gas passages are provided which are fluidly sealed from one another.

6. A fuel cell according to claim 5, wherein the reaction gas is an oxidizing gas containing oxygen, and wherein a flowing direction of the oxidizing gas within the unit cell inside gas passages is the same as a working direction of gravity.

7. A fuel cell according to claim 5, wherein the gas feed manifold supplies reaction gas simultaneously into all the unit cell inside gas passages, and wherein the gas exhaust manifold collects the reaction gas discharged from all the unit cell inside gas passages.

8. A fuel cell according to claim 5, wherein the gas feed manifold and the gas exhaust manifold are formed in a tubular structure individually having shielding parts inside for cutting off the flow of the gas therethrough, and wherein the tubular structure inverts the functions of the gas feed manifold and the gas exhaust manifold at the upstream and downstream ends of the shielding parts.

9. A fuel cell according to claim 5, wherein a plurality of stack structures are provided, and the reaction gas supplied into the fuel cell is divided before being supplied into the stack structures.

10. A fuel cell according to claim 5, wherein a plurality of stack structures are provided, and the reaction gas supplied into one of the stack structures passes through the plural dividing passages provided in at least one other stack structure in the process of passing through the plural dividing passage forming parts.

11. A fuel cell according to claim 5, wherein the inside gas passage forming structures formed on the surface of the separator are U shaped, and the inside gas passages of each unit cell are disposed adjacent to one another, facing the same direction, and wherein the individual unit cell inside gas passages connect the gas feed manifold and the gas exhaust manifold at both ends of the U-form, and wherein the gas feed manifold and the gas exhaust manifold are disposed adjacent to one another along one surface of the stack structure.

12. A fuel cell according to claim 11, further comprising:

a refrigerant passage extending through the fuel cell for passing a refrigerant therethrough; and a refrigerant manifold formed in the laminating direction of the stack structure for one of distributing the refrigerant to the refrigerant passage and collecting the refrigerant passing through the refrigerant passage, wherein the refrigerant manifold is provided adjacent to the gas feed manifold and the gas exhaust manifold, and is separated from the unit cell inside gas passages by a distance greater than that between the gas feed manifold and the gas exhaust manifold.

13. A fuel cell according to claim 5, wherein the dividing passages are U-shaped, are disposed on opposite sides of each separator, and are disposed so that their U-forms face reverse directions, and wherein the gas feed manifold is connected to the unit cell inside gas passages at locations adjacent to one another along a first surface of the stack structure, and wherein the gas exhaust manifold is connected to the unit cell inside gas passages at locations adjacent to one another along a second surface of the stack structure, the second surface of the stack structure being opposite the first surface thereof.

14. A structure of gas passages in a fuel cell stack having an electrolyte layer, an electrode and a separator, the structure comprising:

a plurality of gas feed manifolds extending through the separator in a thickness direction thereof;

a plurality of gas exhaust manifolds extending through the separator in a thickness direction thereof;

a plurality of gas passages that communicate at least one of the gas feed manifolds with at least one of the gas exhaust manifolds, wherein the gas passages are formed so that the gas passages are fluidly sealed from one another on a surface of the separator; and a linkage passage that communicates at least one of the gas exhaust manifolds located downstream of one of the gas passages with at least one of the gas feed manifolds located upstream of another gas passage.

* * * * *